(12) United States Patent
Hinata et al.

(10) Patent No.: US 6,927,818 B2
(45) Date of Patent: Aug. 9, 2005

(54) TRANSFLECTIVE LIQUID CRYSTAL DEVICE HAVING LIGHT-TRANSMITTING FILMS OVERLAPPING LIGHT REFLECTIVE FILMS AND METHOD OF MANUFACTURING SUCH A DEVICE

(75) Inventors: Shoji Hinata, Matsumoto (JP); Manabu Hanakawa, Matsumoto (JP); Takeshi Hagiwara, Matsumoto (JP)

(73) Assignee: Seiko Epson Corporation (JP)

( * ) Notice: Subject to any disclaimer, the term of this patent is extended or adjusted under 35 U.S.C. 154(b) by 67 days.

(21) Appl. No.: 10/068,304

(22) Filed: Feb. 5, 2002

(65) Prior Publication Data

US 2002/0118325 A1 Aug. 29, 2002

(30) Foreign Application Priority Data

Feb. 6, 2001 (JP) .................................. 2001-029747
Nov. 22, 2001 (JP) .................................. 2001-357706

(51) Int. Cl.[7] ................. G02F 1/1335; G02F 1/1343
(52) U.S. Cl. ................. 349/114; 349/110; 349/113; 349/138; 349/139; 349/147
(58) Field of Search ................. 349/110, 111, 349/113, 114, 138, 139, 147

(56) References Cited

U.S. PATENT DOCUMENTS

| | | | | |
|---|---|---|---|---|
| 5,151,803 A | * | 9/1992 | Wakita et al. | 345/97 |
| 5,327,001 A | * | 7/1994 | Wakai et al. | 257/350 |
| 5,734,448 A | | 3/1998 | Cheng | |
| 5,736,278 A | * | 4/1998 | Nakazawa et al. | 430/7 |
| 5,990,995 A | * | 11/1999 | Ebihara et al. | 349/113 |
| 6,084,650 A | * | 7/2000 | Sekiguchi | 349/106 |
| 6,452,654 B2 | * | 9/2002 | Kubo et al. | 349/114 |
| 6,466,280 B1 | * | 10/2002 | Park et al. | 349/43 |
| 6,628,360 B2 | * | 9/2003 | Yamada et al. | 349/132 |
| 6,686,981 B2 | * | 2/2004 | Noritake et al. | 349/113 |
| 6,704,081 B2 | * | 3/2004 | Ha et al. | 349/114 |
| 2002/0005928 A1 | * | 1/2002 | Hanakawa et al. | 349/149 |
| 2002/0008815 A1 | * | 1/2002 | Hanakawa et al. | 349/113 |
| 2002/0171792 A1 | * | 11/2002 | Kubota et al. | 349/114 |
| 2002/0191134 A1 | * | 12/2002 | Funahata et al. | 349/113 |

FOREIGN PATENT DOCUMENTS

| | | |
|---|---|---|
| JP | 8-43839 | 2/1996 |
| JP | 9-251161 | 9/1997 |
| JP | 11-52352 | 2/1999 |
| JP | 2000-66199 | 3/2000 |
| JP | 2000-122096 | 4/2000 |

* cited by examiner

*Primary Examiner*—Tarifur R. Chowdhury
(74) *Attorney, Agent, or Firm*—Harness, Dickey & Pierce, P.L.C.

(57) ABSTRACT

A liquid crystal device 1 includes a liquid crystal 23 arranged between a first substrate 2 and a second substrate 3. The liquid crystal device has a reflecting conductive film 18 formed on the first substrate 2, a light transmitting metal oxide film 19 laminated on the reflective conductive film 18 so that the edges 34 thereof are in contact with an underlying film 35 or the first substrate 2, and an illumination device 25 for irradiating the liquid crystal 23 with light from outside the first substrate 2. Since the edges are present around the reflective conductive film 18, the area of a light reflecting region contributing to reflection is not changed even when the position of the reflective conductive film 18 is deviated in the transverse direction.

20 Claims, 40 Drawing Sheets (a) DEPOSITION OF UNDERLYING FILM (SECTION)

(b) DEPOSITION OF FIRST METAL FILM (c) PATTERNING OF FIRST METAL FILM (d) FORMATION OF INSULATING FILM BY ANODIZATION (PLANE)

(e) ELEMENT SEPARATION (f) DEPOSITION OF SECOND METAL FILM (SILVER ALLOY)

(SECTION)

(g) PATTERNING OF SECOND METAL FILM (PLANE)

(h) DEPOSITION OF ITO (SECTION)

(i) PATTERNING OF ITO

TRANSFLECTIVE LIQUID CRYSTAL DEVICE HAVING LIGHT-TRANSMITTING FILMS OVERLAPPING LIGHT REFLECTIVE FILMS AND METHOD OF MANUFACTURING SUCH A DEVICE

BACKGROUND OF THE INVENTION

1. Technical Field of the Invention

The present invention relates to a liquid crystal device and a manufacturing method therefore, and an electronic apparatus comprising the liquid crystal device.

2. Description of the Related Art

Recently, liquid crystal devices have been widely used as display sections of electronic apparatuses such as cell phones, portable information terminal devices, wristwatches, etc. Such a liquid crystal device comprises a plurality of display dots arranged, for example, in a matrix form so that the voltage applied to a liquid crystal is controlled for each display dot to modulate light transmitted through the liquid crystal for each display dot, thereby displaying an image such as a character, a numerical character, a figure, or the like on the outside.

As the liquid crystal device having the above-described construction, a reflective liquid crystal device and a transmissive liquid crystal device are known according to the system for supplying light to a liquid crystal. The reflective liquid crystal device is a liquid crystal device having a structure in which a display is performed by utilizing light incident on the liquid crystal device from the observation side and then reflected by the back of the liquid crystal. On the other hand, the transmissive liquid crystal device is a liquid crystal device having a structure in which a display is performed by utilizing light from an illumination device provided on the back of the liquid crystal.

The reflective liquid crystal device does not use an illumination device such as a back light or the like, and thus consumes little electric power, and is conventionally used as the display section for various electronic apparatuses. However, the reflective liquid crystal device performs a display by utilizing external light such as natural light, illumination light, or the like, and thus has the problem of the display being difficult to be seen in dark places.

Therefore, a liquid crystal device has been proposed, in which it utilizes external light in a bright place like the reflective liquid crystal device, while it utilizes an internal light source for making the display visible in a dark place.

Namely, the liquid crystal device uses a display system including a reflective system and a transmissive system, and the display system is switched between the reflective and the transmissive display systems according to surrounding brightness, thereby permitting a clear display even in a dark environment while decreasing power consumption. In the specification of this application, this type of liquid crystal device is referred to as a "transflective liquid crystal device".

As the transflective liquid crystal device, a liquid crystal device comprising a transflective film, i.e., a so-called half mirror, is conventionally known. This transflective film is formed by optimizing the thickness of a metal film of aluminum or the like, which is generally used as a reflecting film in the optical field, so that light is transmitted to some extent, and at the same time, light is reflected to some extent. However, a deposition technique such as mask sputtering or the like is required for forming the transflective film, complicating the process and causing the fault that variations in transmittance and reflectance are increased due to a large variation in thickness.

Therefore, in order to overcome the fault of the transflective film, a liquid crystal device has been proposed having a structure in which a light transmission slit, i.e., an aperture, is formed in a reflecting film. FIG. 6 shows a simple matrix system transflective color liquid crystal device as an example of the liquid crystal device having this structure. In the liquid crystal device 70 shown in FIG. 6, a liquid crystal 73 is held between a pair of transparent substrates 71 and 72. Also, a reflecting film 74, a color filter 75, an overcoat film 76, a silicon oxide film 77 and a segment electrode 78 are laminated in turn on the liquid crystal-side surface of the lower substrate 71. Furthermore, a common electrode 79 is formed on the liquid crystal-side surface of the upper substrate 72.

The color filter 75 formed on the lower substrate 71 comprises colorant layers 75r, 75g and 75b having different colors including red (R), green (G) and blue (B), respectively, which are arranged in a predetermined planar pattern, for example, a stripe pattern, as viewed from the direction of arrow A. The segment electrode 78 comprises a transparent conductive film of ITO (Indium Tin Oxide), and is formed in stripes, as viewed from the direction of arrow A. On the other hand, the common electrode 79 comprises a transparent conductive film of ITO (Indium Tin Oxide), and is formed in stripes perpendicular to the segment electrode 78.

The reflecting film 74 formed on the lower substrate 71 comprises a metal film of aluminum or the like, which has high reflectance. The reflecting film 74 also has a light transmission slit 80 formed for every display dot. Furthermore, polarizer plates 82a and 82b are provided on the outsides of the upper and lower substrates 71 and 72, respectively, and an illumination device 83 such as a back light is disposed on the lower side of the lower substrate 71, i.e., on the back opposite to the observation side.

When the liquid crystal display device 70 having the above construction is used in a reflective display state in a bright place, external light incident on the upper substrate 72 is transmitted through the liquid crystal 73, reflected by the surface of the reflecting film 74, again transmitted through the liquid crystal 73 and then emitted from the upper substrate 72, as shown by arrow R. On the other hand, when the liquid crystal display device 70 is used in a transmissive state in a dark place, light emitted from the illumination device 83 provided outside the lower substrate 71 is transmitted through the slits 80 of the reflecting film 74, transmitted through the liquid crystal 73 and then emitted from the upper substrate 72. The light contributes to a display in each of the display states.

In the above-described transflective liquid crystal device, a metal film of aluminum or the like is conventionally used as the reflecting film. However, a brighter screen has been demanded recently, and thus an APC alloy having higher reflectance than aluminum, i.e., a silver-palladium-copper (Ag—Pd—Cu) alloy, has been used.

However, APC has the property that it has low water resistance in the production process, and thus an APC pattern is eluted by electrical ionization, thereby causing electromigration and electrolytic corrosion (i.e., corrosion) due to the electromigration. There is thus the problem of reliability. In this way, it is difficult to use APC singly, and it has been thus proposed that ITO is laminated above or below APC to form a laminated film used as a transflective film.

FIG. 7 shows an example of a transflective color liquid crystal device having a structure in which light transmission slits are formed in a reflecting film comprising a laminated film of APC and ITO. In the liquid crystal device 60 shown in FIG. 7, a liquid crystal 63 is held between a pair of transparent substrates 61 and 62. A segment electrode 67 having a laminated structure comprising an APC film 65 having slits 64, and an ITO film 66 formed thereon is formed in stripes on the liquid crystal-side surface of the lower substrate 61, as viewed from the direction of arrow A. Furthermore, an alignment film 68 is formed on the segment electrode 67.

On the other hand, a color filter 59 comprising colorant layers 59r, 59g and 59b having R, G and B colors, an overcoat film 58, a common electrode 57 comprising an ITO film formed in stripes as viewed from the direction of arrow A, and an alignment film 56 are formed in turn on the upper substrate 62. Furthermore, polarizer plates 82a and 82b are provided on the outer surfaces of the lower and upper substrates 61 and 62, respectively, and an illumination device 83 such as a back light is disposed on the lower side of the lower substrate 61, i.e., on the back opposite to the observation side.

In the above-described construction, the laminated film comprising the APC film 65 and the ITO film 66 formed on the lower substrate 61 functions as a transflective film, and at the same time, functions as an electrode for driving the liquid crystal. Therefore, the color filter cannot be formed on the lower substrate 61, and the color filter 59 is formed on the upper substrate 62.

Also, APC has the property that it has not only high reflectance but also lower resistivity than ITO or the like, and is thus suitable as an electrode material and wiring material. Particularly, in comparison with ITO, APC has a resistivity of $3.9 \times 10^{-6}$ $\Omega$m, which is about $\frac{1}{50}$ of the resistivity of $2 \times 10^{-4}$ $\Omega$m of ITO. Namely, with the same thickness, the width of APC wiring required for obtaining the same resistance value is $\frac{1}{50}$ of the width of ITO wiring.

Therefore, in the liquid crystal device shown in FIG. 7 in which APC is used for lead wiring between electrodes and driver ICs, lead wiring can be made fine, as compared with the liquid crystal device shown in FIG. 6 in which ITO is used for lead wiring. Therefore, the area of a non-display area around an effective display area, i.e., a frame area, can be decreased, and thus the frame can be narrowed. Particularly, the liquid crystal device having the narrow frame can be contained in a restricted space in a casing of an electronic apparatus, and the quantity of information which can be displayed can be increased relative to the area of the liquid crystal device contained in the electronic apparatus. Therefore, the liquid crystal device is suitable for use for portable small electronic apparatus such as cell phones or the like.

However, in the conventional liquid crystal device shown in FIG. 7, APC constituting the segment electrode 67 and lead wiring causes electromigration in repeated use, possibly causing the defect that the electrode and wiring are narrowed or broken according to circumstances. There is thus the problem of low reliability.

In order to solve the problem, the applicant proposed a liquid crystal device having the construction shown in FIGS. 8 and 9, which has not been known yet. In these figures, the same members as those of the liquid crystal device 60 shown in FIG. 7 are denoted by the same reference numerals, and a description of these members is omitted. In the liquid crystal device shown in FIGS. 8 and 9, all the upper and side surfaces of the APC film 65, which constitutes the segment electrode 67, are coated with the ITO film 66. Also, all the upper and side surfaces of an APC film 54, which constitutes wiring 55, are coated with an ITO film 53. In FIGS. 8 and 9, reference numeral 52 denotes a black mask, and reference numeral 51 denotes a light shielding layer formed in the periphery of the display area.

As described above, when all the surfaces of the APC film are coated with the ITO film, the occurrence of electromigration in APC can be prevented even when the electrodes and wiring are formed by using APC, thereby forming a transflective liquid crystal device having high reliability.

In the above-described liquid crystal device, an aperture, i.e., a slit 64, is provided corresponding to each display dot in the internal region of the reflecting film 65 formed on the back-side substrate 61 shown in FIG. 9, and the illumination device 83 is disposed on the back of the liquid crystal device. In this construction, light emitted from the illumination device 83 is incident on the back-side substrate 61, transmitted through the slits 64 provided in the reflecting film 65, and then emitted from the observation side to realize a transmissive display.

In the liquid crystal device, in some cases, the ratio of the area of the region in which light is reflected for a reflective display to the area of the region in which light is transmitted for a transmissive display deviates from a desired ratio, i.e., a design ratio, due to errors produced in various steps such as that of forming the reflecting layer 65, that of bonding a pair of substrates 61 and 62 together, etc. For example, when the area of the light transmitting region is smaller than the desired area, and the area of the light reflecting region is larger than the desired area, the brightness of a transmissive display is lower than that in a reflective display. There is thus the problem of causing variations in display quality according to the display system.

The present invention has been achieved in consideration of the above problem, and an object of the present invention is to suppress the occurrence of variations in the area ratio of the light transmitting region to the light reflecting region of a transflective film even when various errors occur in manufacturing a liquid crystal device, thereby preventing the occurrence of variations in display quality even when the display system of the liquid crystal device is changed.

SUMMARY OF THE INVENTION (1) In order to achieve the object, in a first aspect of the present invention, a liquid crystal device comprises a liquid crystal arranged between first and second substrates, a reflective conductive film formed on the first substrate, a light transmitting metal oxide film laminated on the reflective conductive film so that the edge thereof contacts the first substrate, and an illumination means for irradiating the liquid crystal with light from outside the first substrate.

In the liquid crystal device, when light is supplied to the liquid crystal from the illumination means, a part of the light which reaches the edge of the transmitting metal oxide film, for example, an ITO film, is transmitted through the edge, reaches the liquid crystal, and is then modulated according to the orientation of the liquid crystal.

As a result, a transmissive display is realized. In the liquid crystal device having the above-described construction, the transmissive display is performed by using a light transmitting region formed at the edge of the metal oxide film, not by using light transmitted through apertures, i.e., slits, formed in the reflecting film.

In this construction, when an error occurs to deviate the reflective conductive film in the transverse direction of the edge of the metal oxide film, the ratio of the area of the light transmitting region to the area of the light reflecting region in one display dot is not changed as long as the error is less than the width dimension of the edge. Therefore, in the liquid crystal device, the occurrence of variations in display quality can be prevented even when the display system is changed.

(2) In a second aspect of the present invention, a liquid crystal device comprises a liquid crystal arranged between first and second substrates, an underlying film provided on the first substrate, a reflective conductive film formed on the underlying film, a light transmitting metal oxide film laminated on the reflective conductive film so that the edge thereof contacts the underlying film, and an illumination means for irradiating the liquid crystal with light from outside the first substrate.

The liquid crystal device of the second aspect is different from the liquid crystal device of the first aspect in that the underlying film is formed below the reflective conductive film, and thus the edge of the metal oxide film is in contact with the underlying film, not with the first substrate. In the liquid crystal device having this construction comprising the underlying film, the reflective conductive film can be securely shielded from the external atmosphere by the metal oxide film, thereby securely preventing the occurrence of defects such as electromigration and the like in the reflective conductive film.

(3) In the liquid crystal device having each of the above constructions, the edge in contact with the first substrate or the edge in contact with the underlying film can constitute a light transmitting region in one display dot in a transflective system liquid crystal display. The term "one display dot" means the minimum display unit within the display area for display of an image such as a character, a numerical character, or the like. More specifically, "one display dot" means a dot area corresponding to one of the colorant films of R (red), G (green) and B (blue) in a full-color display using the three primary colors including R (red), G (green) and B (blue) or C (cyan), M (magenta), and Y (yellow), etc, or a pixel area where a pair of electrodes overlap each other in a monochromatic display. In a full-color display using the three primary colors R, G and B, a unit of three display dots corresponding to the respective colors forms one pixel.

In the liquid crystal device having the above construction, the underlying film can contain a metal oxide. As the metal oxide, for example, ITO can be used.

In the liquid crystal device having the above construction, a reflecting layer which reflects blue component light can be provided on the reflective conductive film. When APC is used for the reflective conductive film, in some cases, reflection of light at a wavelength corresponding to the blue component of light reflected by the APC is weakened. In this case, by providing the reflecting layer which reflects blue component light on the reflective conductive film, a decrease in the blue component on a display screen can be compensated for.

In the liquid crystal device having the above construction, the reflective conductive film and the metal oxide film can form a first electrode for applying a voltage to the liquid crystal. In this construction, the electrode also functions as the light reflecting film to simplify the construction of the liquid crystal device and permit the simple manufacture of the liquid crystal device, as compared with a case in which the light reflecting film and the electrode are separately formed.

The liquid crystal device having the above construction can be further provided with a second electrode formed on the second substrate opposite to the first electrode, and a color layer provided corresponding to the crossing regions between the first and second electrodes. This permits a color display by the liquid crystal device. Even when the display system is changed between the reflective type and the transmissive type, the occurrence of variations in display quality of the color display can be prevented. When the color layer contains the three primary colors R, G and B or C, M and Y, a full-color display can be realized.

The liquid crystal device of the present invention can be formed as a simple matrix system liquid crystal device. In this case, the stripe electrodes crossing each other are respectively formed on the pair of the substrates. The liquid crystal device of the present invention can be formed as an active matrix system liquid crystal device. In this case, the first electrode is formed as dot-shaped electrodes.

The liquid crystal device having the above construction can be further provided with a second electrode formed on the second substrate opposite to the first electrode, wiring connected to the first electrode, and wiring connected to the second electrode. In this case, the display area may comprise a collection of the crossing regions of the first and second electrodes, the wiring connected to the first electrode and the wiring connected to the second electrode may be present outside the display area, and at least one of the wirings may comprise a metal oxide to eliminate the reflective conductive film.

In many cases, wiring is generally formed in an area other than the display area, i.e., an area where the liquid crystal is absent. In this case, when the reflective conductive film of APC or the like is contained in wiring, electromigration is highly likely to occur in the APC. On the other hand, when the reflective conductive film is not contained in wiring, the probability of electromigration can be prevented from being increased.

In the liquid crystal device of the above construction, the reflective conductive film may be made of a single silver material or an alloy containing silver. As the alloy containing silver, for example, a silver-palladium-copper alloy, i.e., APC, can be used. By forming the reflective conductive film by using this material, high reflectance can be obtained, and the resistance can be significantly decreased, as compared with the use of only a metal oxide film of ITO or the like.

In the liquid crystal device having the above construction, the metal oxide film can be made of ITO, and coating the reflective conductive film with the metal oxide film can securely prevent the occurrence of deterioration in the reflective conductive film.

In the liquid crystal device having the above construction, the area of the edge in contact with the first substrate or the underlying film is preferably 10 to 70%, more preferably 30 to 50%, of the area of one display dot to which the edge belongs. According to experiment conducted by the inventors, by setting the ratio of the area of the edge as described above, display quality can be securely prevented from changing with changes between the reflective and the transmissive displays.

(4) In the first aspect of the present invention, a method of manufacturing a liquid crystal device comprising a liquid crystal arranged between first and second substrate comprises the step of forming a reflective conductive film on the first substrate, the step of forming a light transmitting metal oxide film on the reflective conductive film so that the edge thereof contacts the first substrate, the step of providing an illumination means outside the first substrate, for light irradiation. The method of manufacturing a liquid crystal device having this construction can securely manufacture a liquid crystal having the above-described construction.

(5) In the second aspect of the present invention, a method of manufacturing a liquid crystal device comprising a liquid crystal arranged between first and second substrates comprises the step of forming an underlying film on the first substrate, the step of forming a reflective conductive film on the underlying film, the step of forming a light transmitting metal oxide film on the reflective conductive film so that the edge thereof contacts the underlying film, the step of providing an illumination means outside the first substrate, for light irradiation. The method of manufacturing a liquid crystal device having this construction can securely manufacture a liquid crystal device having the above-described construction.

The method of manufacturing a liquid crystal device of the second aspect is different from the method of manufacturing a liquid crystal device of the first aspect in that the underlying film is formed below the reflective conductive film, and the edge of the metal oxide film is in contact with the underlying film, not with the first substrate. By providing the underlying film, the metal oxide film can more securely shield the reflective conductive film from the external environment, thereby more securely preventing the occurrence of defects such as electromigration in the reflective conductive film.

(6) An electronic apparatus of the present invention comprises the liquid crystal device having the above construction. In this electronic apparatus, even when the display system of the liquid crystal device is changed, for example, when the display system is changed between reflective display and transmissive display, the occurrence of variations in display quality can be prevented.

DETAILED DESCRIPTION OF THE PREFERRED EMBODIMENTS

Figure 1:
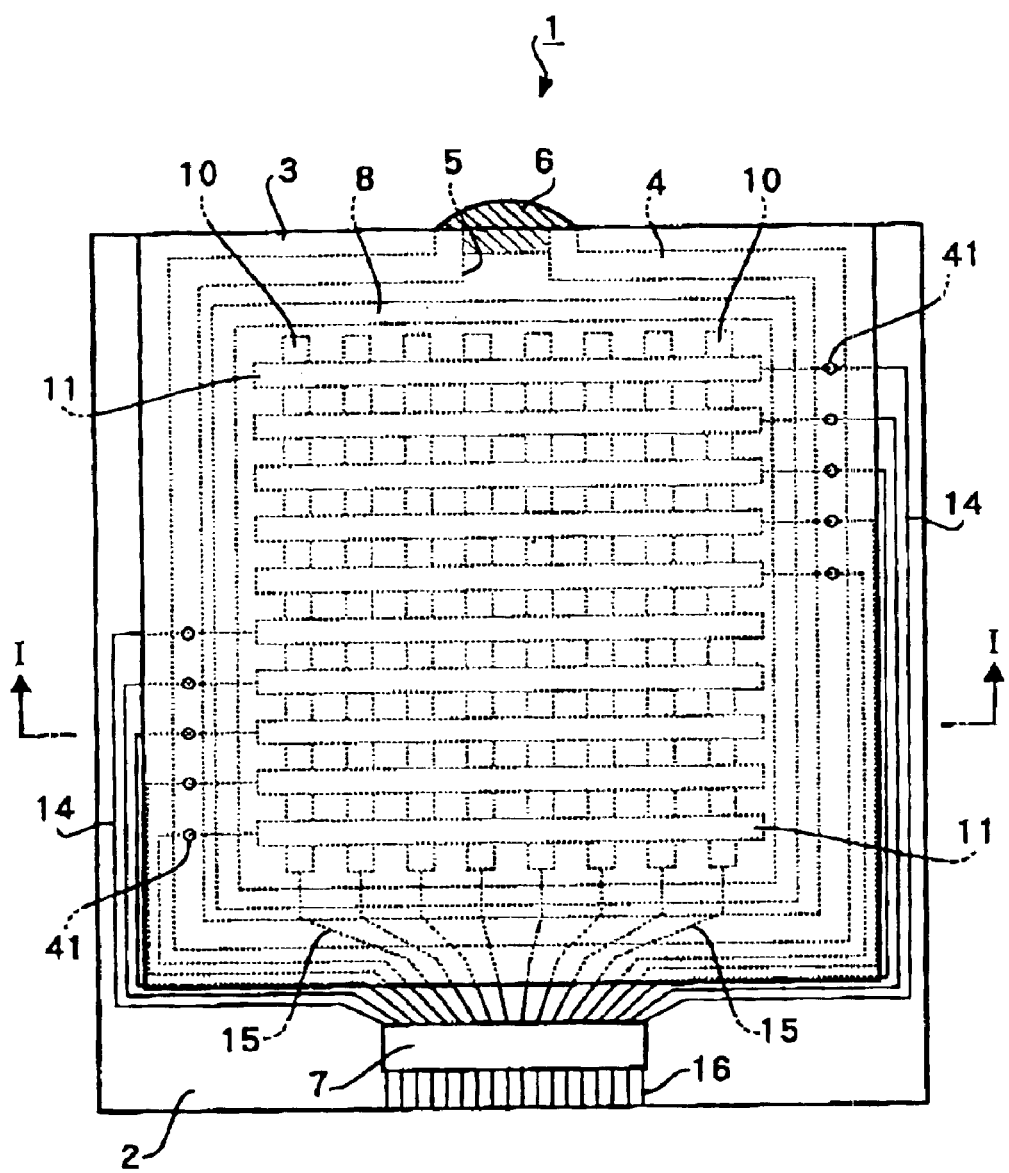
FIG. 1 is a plan view of a liquid crystal device according to an embodiment of the present invention.
Figure 2:
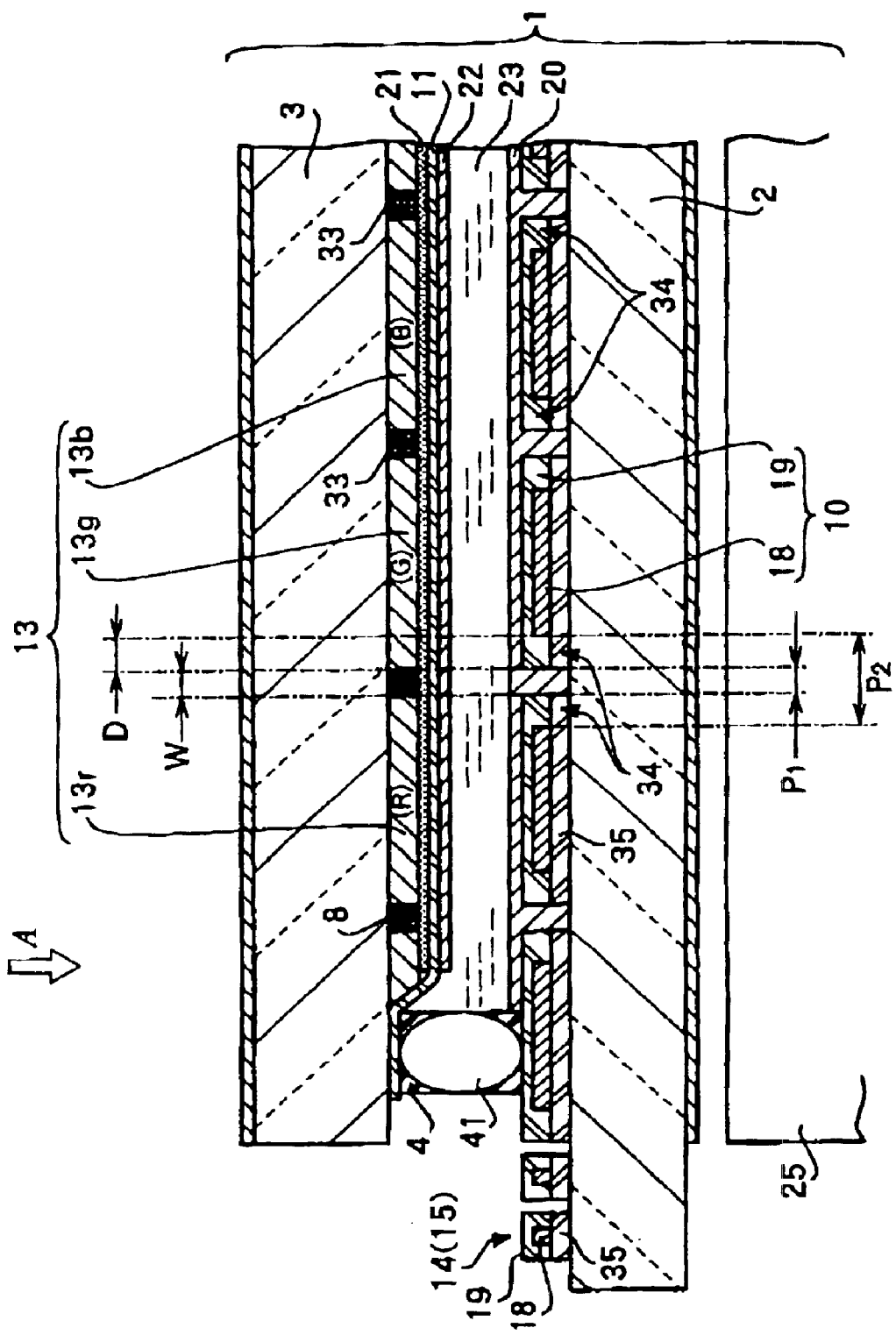
FIG. 2 is a sectional side view showing the sectional structure of the liquid crystal device taken along line I—I in FIG. 1.
Figure 3:
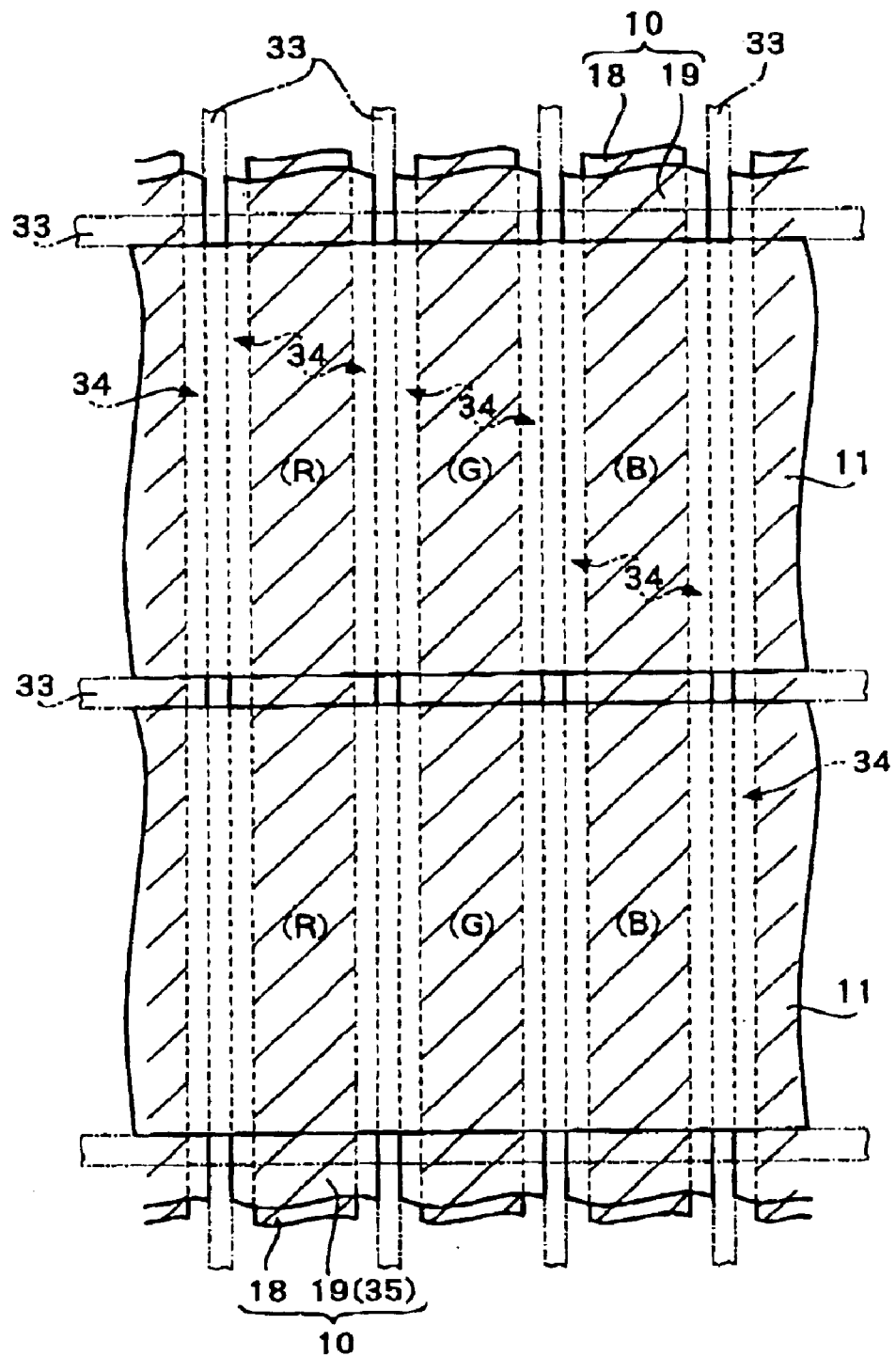
FIG. 3 is a plan view showing the planar structure of the principal portion of the liquid crystal device shown in FIG. 1.
Figure 4:
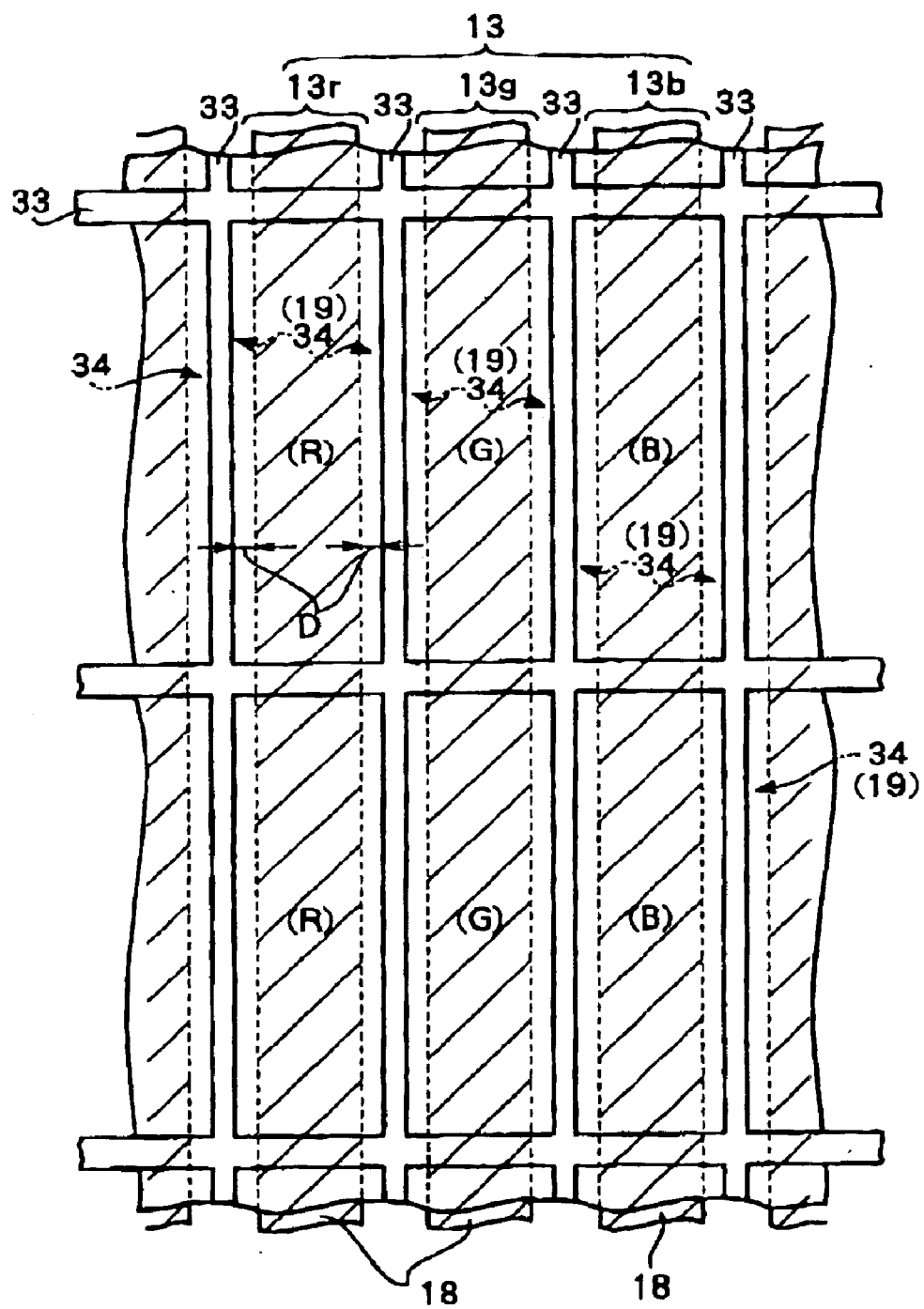
FIG. 4 is a plan view showing other components present in the same portion as FIG. 3.

FIG. 1 shows a liquid crystal device according to an embodiment of the present invention. In this embodiment, the present invention is applied to a liquid crystal device which can perform a color display in a simple matrix system and a COG (Chip On Glass) system. FIG. 2 shows a sectional structure taken along line I—I in FIG. 1. FIG. 3 shows the planar structure of an electrode in one pixel portion of the liquid crystal device shown in FIG. 1. FIG. 4 shows the planar positional relation between a reflective conductive film and a color filter in one pixel portion of the liquid crystal device shown in FIG. 1. In each of the figures, in order to facilitate understanding of the structure, the thickness and the dimension ratio of each of components are different from actual values.

In FIG. 1, the liquid crystal device 1 of this embodiment comprises a lower substrate 2 having a rectangular planar shape, and an upper substrate 3 having the same rectangular shape are bonded together with a circular sealing material 4 in the peripheries thereof to be opposed to each other. Each of the lower substrate 2 and the upper substrate 3 comprises a transparent substrate of, for example, glass, plastic, or the like.

A portion of the sealing material 4 is open on one side (the upper side shown in FIG. 1) of each of the substrates 2 and 3 to form a liquid crystal injection port 5. As shown in FIG. 2, a liquid crystal 23, for example, a STN (Super Twisted Nematic) liquid crystal, is sealed in the gap surrounded by both substrates 2 and 3 and the sealing material 4, and the liquid crystal injection port 5 shown in FIG. 1 is sealed with a sealant 6 with the liquid crystal 23 being sealed.

In FIG. 1, the outside dimensions of the lower substrate 2 are larger than the upper substrate 3.

The upper substrate 3 and the lower substrate 2 are bonded together so that the edges thereof coincide with each other on one side (the upper side shown in FIG. 1), and the edge of the lower substrate 2 overhangs outward from the upper substrate 3 on the other three sides (i.e., the lower side, the right side, and the left side shown in FIG. 1). In addition, a driver IC 7 is mounted on the overhang on the lower side of the lower substrate 2, for driving the electrodes of both the upper substrate 3 and the lower substrate 2 by the driver IC 7. In FIG. 1, reference numeral 8 denotes a circular light shielding layer for shielding the effective display area from ambient light.

In FIG. 1, a plurality of linear segment electrodes 10 are formed in parallel with each other on the lower substrate 2 to extend in the longitudinal direction of the figure to form stripe electrodes as a whole. On the other hand, a plurality of linear common electrodes 11 are formed in parallel with each other on the upper substrate 3 to extend in the transverse direction of the figure to form stripe electrodes as a whole.

In FIG. 2, an illumination device 25 is disposed as a back light on the lower side of the lower substrate 2, i.e., on the side opposite to the observation side. Also, a color filter 13 is formed on the liquid crystal-side surface of the upper substrate 3. The color filer 13 comprises colorant layers 13r, 13g and 13b of R, G and B colors, which are arranged in an appropriate pattern, for example, the stripe arrangement as shown in FIG. 4. Besides the stripe arrangement, the arrangement of the colorant layers may be a delta arrangement, a mosaic arrangement, or the like, for example. The colorant layers 13r, 13g and 13b are partitioned by a black mask 33. The black mask 33 is made of, for example, resin black, a light shielding metal such as chromium having relatively low reflectance.

The colorant layers 13r, 13g and 13b are arranged corresponding to the extension direction (i.e., the direction perpendicular to the drawing of FIG. 2) of the segment electrodes 10, and the three display dots of R, G and B arranged in the transverse direction of FIG. 2 form one pixel. Furthermore, an underlying film 35 made of, for example, ITO is formed on the liquid crystal-side surface of the lower substrate 2, and a laminated structure comprising an APC film 18 serving as a reflective conductive film and an ITO film 19 serving as a metal oxide film is formed on the underlying film 35. Each of the segment electrodes 10 has the laminated structure. The APC film 18 constitutes each of the electrodes and functions as a reflecting film. Furthermore, an alignment film 20 made of polyimide or the like is formed on the segment electrodes 10. The alignment film 20 is subjected to alignment processing, for example, rubbing, before both substrates 2 and 3 are bonded together.

In FIG. 1, for the common electrodes 11 in the upper half of the plurality of common electrodes 11 shown in FIG. 1, lead wiring 14 is extended from the right ends of the common electrodes 11 to the sealing material 4. The lead wiring 14 is electrically connected between the upper substrate 3 and the lower substrate 2 through transfer materials 41 comprising conductor particles mixed in the sealing material 4, led to the peripheral portion of the lower substrate 2, and further connected to output terminals of the driver IC 7.

Similarly, for the common electrodes 11 in the lower half shown in FIG. 1, lead wiring 14 is extended from the left ends of the common electrodes 11 to the sealing material 4. The lead wiring 14 is electrically connected between the upper substrate 3 and the lower substrate 2 through transfer materials 41 comprising conductor particles mixed in the sealing material 4, led to the peripheral portion of the lower substrate 2, and further connected to output terminals of the driver IC 7. On the other hand, for the segment electrodes 10, lead wiring 15 is extended from the lower ends of the segment electrodes 10, and connected to output terminals of the driver IC 7.

In FIG. 2, like the segment electrodes 10, each of the lead wirings 14 and 15 comprises a laminated film composing the APC film 18 and the ITO film 19. In FIG. 1, input wiring 16 is provided to extend from the lower end of the lower substrate 2 to input terminals of the driver IC 7, for supplying various signals to the driver IC 7.

In the segment electrodes 10 and the lead wirings 14 and 15, the ITO films 19 respectively project outward from the APC films 18, and the bottoms of the edges are in contact with the upper surface of the underlying film 35. Therefore, the ITO films 19 are formed to be respectively laminated on the upper surfaces of the APC films 18 and coated on the sides of the APC films 18.

Furthermore, an overcoat film 21 is formed on the surface of the color filter 13 formed on the liquid crystal-side surface of the upper substrate 3, for planarizing the spaces between the respective colorant layers and protecting the surfaces of the colorant layers. The overcoat layer 21 may comprise an acrylic or polyimide resin film, an inorganic film such as a silicon oxide film, or the like. Furthermore, the common electrodes 11 each comprising an ITO single film are formed in stripes on the surface of the overcoat film 21 in the transverse direction of the drawing of FIG. 2, as viewed from the direction of arrow A, and an alignment film 22 made of polyimide or the like is formed on the surfaces of the common electrodes 11. The alignment film 22 is subjected to alignment treatment, for example, rubbing, before both substrates 2 and 3 are bonded together.

In FIG. 2, the width W of the black mask 33 is substantially the same as the spaces P1 between the ITO films 19 of the adjacent two display dots. When the substrates 2 and 3 are precisely aligned with each other, the positions of the side edges of the black mask 33 coincide with the positions of the side edges of the ITO films 19, as viewed from the direction of arrow A. This is shown in a plan view of FIG. 3. As shown in FIG. 3, the positions of the longitudinal sides of the black mask 33 coincide with the sides of the ITO films 19, which respectively constitute the segment electrodes 10, in the longitudinal direction of the drawing.

In FIG. 2, the edge portions 34 of the ITO films 19 in contact with the underlying film 35 are arranged on the surface of the lower substrate 2 corresponding to the positions on both sides of the black mask 33. The edge portions 34 constitute light transmitting regions for transmitting light emitted from the illumination device 25 and introducing the light to the liquid crystal 23. On the other hand, the APC films 18 constitute light reflecting regions for reflecting external light such as sunlight, room light, or the like, which is incident on the upper substrate 3. As shown in FIG. 3, the edge portions 34 of the ITO films 19, which are located outside the APC films 18, are located along the longitudinal extension direction of the black mask 33 within the respective display dots in the rectangular areas divided by the black mask 33.

In FIG. 2, each of the segment electrodes 10 and the wirings 14 and 15 has a two-layer structure comprising the APC film 18 and the ITO film 19. A reflective conductive film comprising the APC film 18 has the property that it has low water resistance, and easily causes electromigration during use. However, in this embodiment, in each of the segment electrodes 10 and the wirings 14 and 15, all the upper and side surfaces of the APC film 18 are completely coated with the ITO film 19 to avoid the problem of corrosion of the APC film 18 due to the adhesion of moisture during the manufacture process, and the occurrence of electromigration in the APC film 18 due to surface contamination of the APC film 18, and therefore a liquid crystal device with high reliability can be produced. Furthermore, since all surfaces of the APC films 18, which are provided in the display area to function as reflecting films, are coated with the ITO films 19, the reflectance of the APC films 18 can be prevented from decreasing during the manufacturing process, thereby manufacturing, with high yield, a liquid crystal device having the excellent property that a bright display can be achieved in a reflective display.

In the liquid crystal device of this embodiment, as shown in FIG. 2, the black mask 33 is formed in the color filter 13 formed on the upper substrate 3, thereby simplifying the manufacturing process, particularly, the process for producing the lower substrate 2. Also, each of the lead wirings 14 and 15 comprises the APC film 18 to decrease electric resistance, thereby achieving narrowing of the wirings. As a result, narrowing of the picture frame can be realized.

In this embodiment, in FIG. 1, the segment electrodes 10 and the common electrodes 11 are driven by the single driver IC 7 provided on the surface of the lower substrate 2 through the transfer materials 41, thereby narrowing the whole frame region. This also permits the achievement of narrowing of the frame. As a result, this embodiment can provide a liquid crystal device suitable for a portable small electronic apparatus.

In FIG. 2, the width W of the black mask 33 is set to be substantially the same as the space P1 between the ITO films 19 contained in the adjacent two display dots, and smaller than the space P2 between the adjacent two APC films 18. Furthermore, assuming that a deviation (for example, a possible maximum deviation) produced in alignment of the upper substrate 3 and the lower substrate 2 in the assembly process of the liquid crystal device of this embodiment is $\delta$, the dimension D between the edge of the black mask 33 and each APC film 18 is set to be larger than the deviation $\delta$, i.e., $D > \delta$. In this embodiment, the dimension D between the edges of the black mask 33 and each APC film 18 coincides with the dimension between the edges of the ITO film 19 and the APC film 18 in each of the segment electrodes 10.

Referring to FIG. 3, the border lines of the segment electrodes 10 coincide with the side edges of the ITO films 19, and the border lines of the black mask 33 coincide with the side edges of the ITO films 19. The side edges of the APC films 18 are located inside of the ITO films 19. Namely, in a plan view, the APC films 18 are absent from the long narrow portions at both edges of the segment electrodes 10, i.e., the edge portions 34, and only the ITO films 19 are present in these portions. Furthermore, the edge portions 34 are not coated with the black mask 33. Therefore, the edge portions 34 serve as the light transmitting regions in which light emitted from the back light 25 (refer to FIG. 2) is transmitted in a transmissive display.

Figure 8:
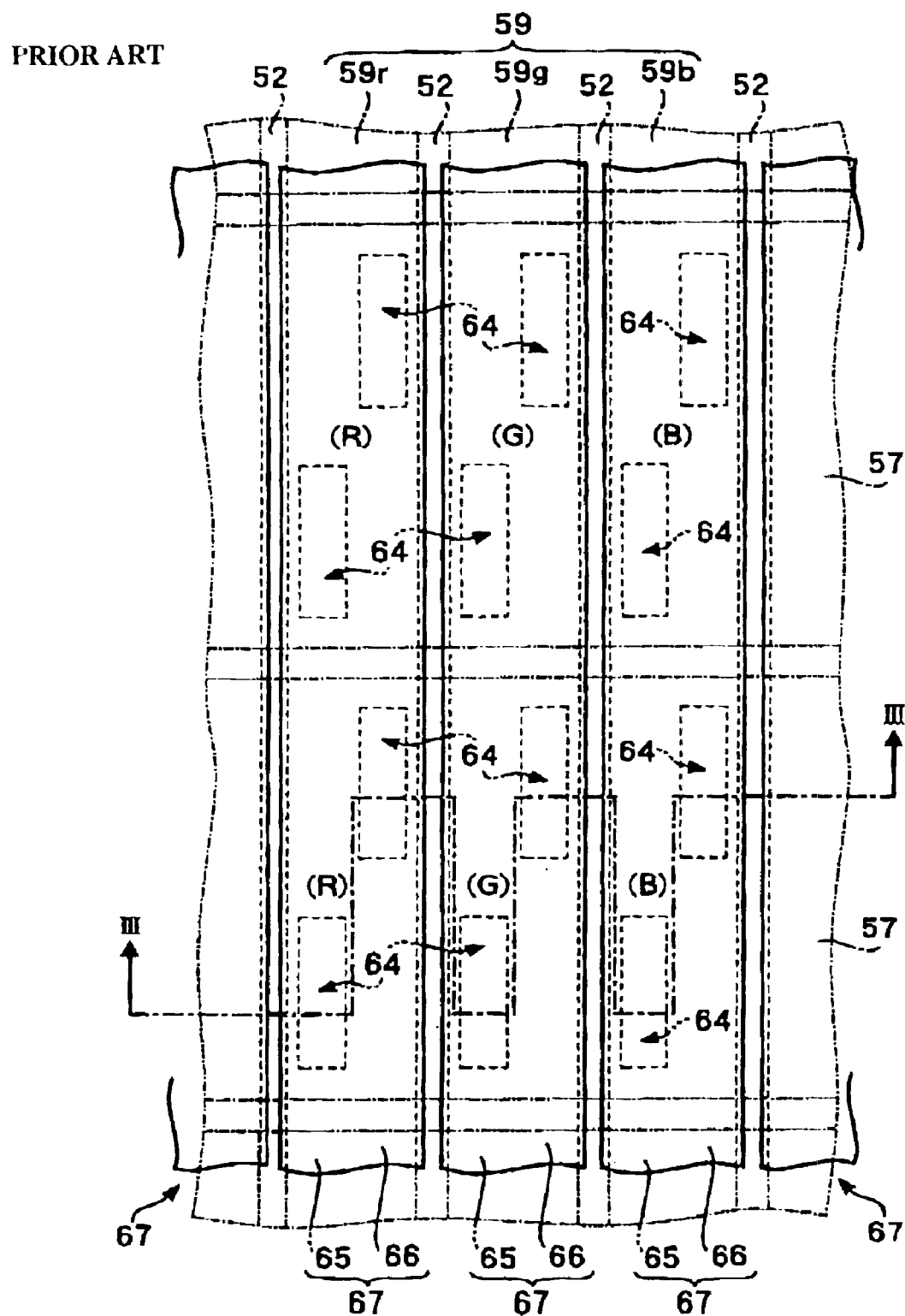
FIG. 8 is a plan view showing a principal portion of a liquid crystal device as a reference for the present invention.

The liquid crystal device of this embodiment uses the edge portions 34 shown in FIGS. 3 and 4 as the light transmitting regions, and thus can eliminate the light transmitting windows 64 of the liquid crystal device shown in FIG. 8. Accordingly, the APC films 18 can be narrowed, and the light transmitting regions, in which only the ITO films 19 are present, can be respectively provided in the edge portions 34 of the segment electrodes 10. Furthermore, each of the edge portions 34 functions as not only the light transmitting region but also a structure for preventing a decrease in luminance of a reflective display due to an alignment deviation.

Figure 9:
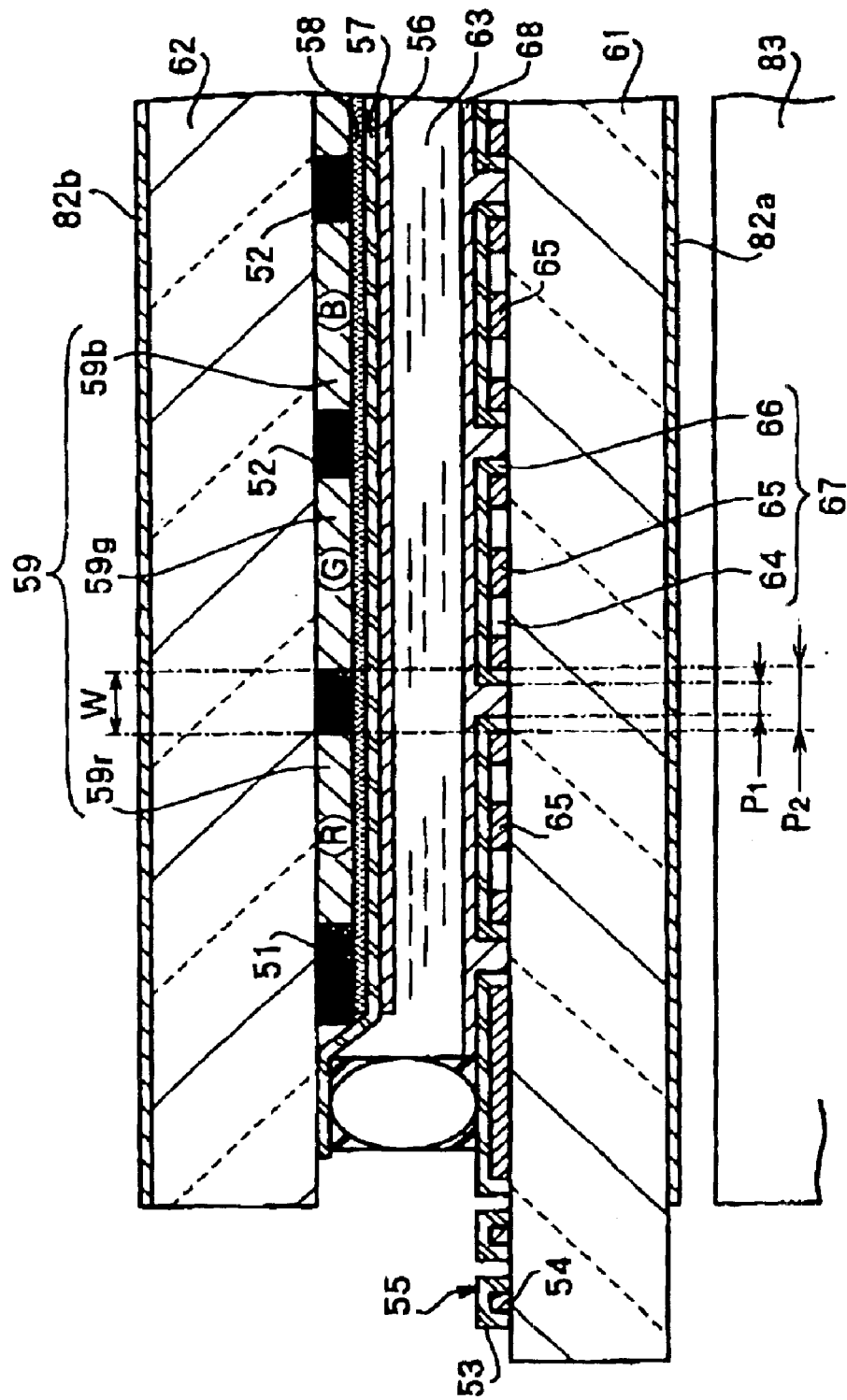
FIG. 9 is a sectional view taken along line III—III in FIG. 8.

Namely, in the liquid crystal device having the structure shown in FIG. 9, in which the width W of a black mask 52 coincides with the space P2 between respective APC films 65, and the edges of the black mask 52 overlap the edges of the APC films 65 in a plan view, even when only a small alignment deviation occurs, the black mask 52 is superposed on the APC films 65 to decrease the effective area of the APC films serving as reflecting films, thereby causing the defect that a reflective display becomes dark. However, if no alignment deviation occurs, there is no problem.

On the other hand, in the liquid crystal device of this embodiment shown in FIG. 2, the edge portions 34 are provided, and the width of the edge portions 34 (corresponding to the dimension D between the edges of the black mask 33 and each APC film 18) is set to be larger than an alignment deviation. Therefore, if an alignment deviation occurs, the black mask 33 is not superposed on the APC films 18.

When an alignment deviation occurs, one of the edge portions 34 of each display dot is partially hidden by the black mask 33, narrowing the edge portion 34. However, the opposite edge portion 34 is widened to keep the quantity of transmitted light of the whole display dots constant. Therefore, it is possible to provide a structure in which even when an alignment deviation occurs, the reflective display does not become dark, and no problem occurs while preventing color mixing of the color filter 13 by the black mask 33.

In this embodiment, all of the upper, lower and side surfaces of each of the APC films 18, which constitute the segment electrodes 10 and the lead wirings 14 and 15, are coated with the ITO films 19 and the underlying film 35. Therefore, the problem of corrosion due to the adhesion of moisture during the manufacturing process, and the problem of electromigration due to the surface contamination of the APC films 18 can be securely be avoided. Therefore, the liquid crystal device of this embodiment can obtain higher reliability.

Furthermore, the use of the APC films 18 can provide the effects of improving brightness of a reflective display, improving color chroma in a transmissive display, preventing complication of the manufacturing process for the lower substrate 2, achieving narrowing of the frame of the device, etc.

In the above-described embodiment, as shown in FIG. 2, the underlying film 35 is formed on the surface of the lower substrate 2, and the segment electrodes 10, i.e., the APC films 18 and the ITO films 19, are formed on the underlying film 35. However, the present invention can be applied to a liquid crystal device having the sectional structure shown in FIG. 9, i.e., a structure in which segment electrodes 67 each comprising an APC film 65 and an ITO film 66 are formed directly on a lower substrate 61 without an underlying film being formed on the surface of the lower substrate 61.

Figure 5:
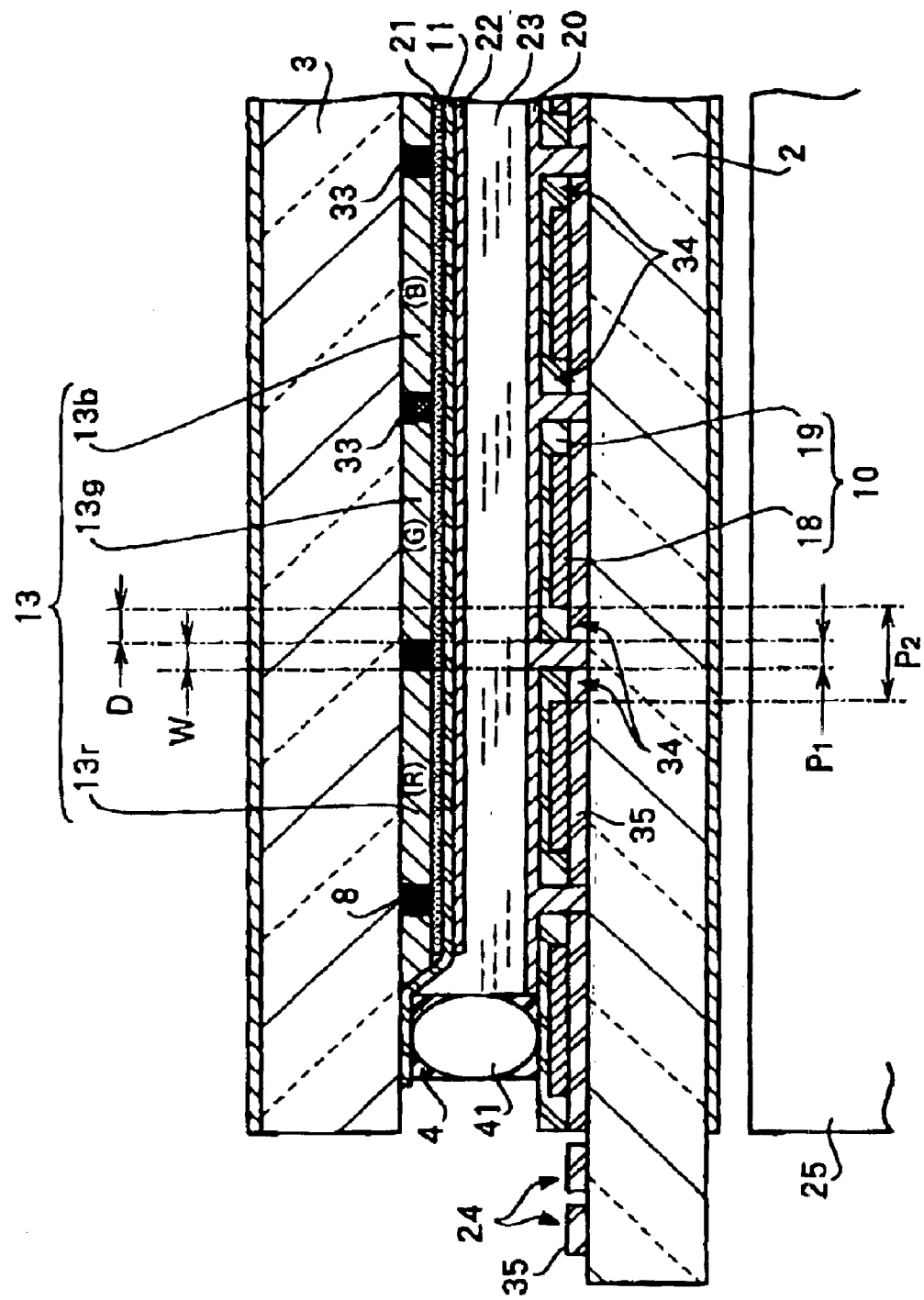
FIG. 5 is a sectional view showing the sectional structure of a principal portion of a liquid crystal device according to another embodiment of the present invention.
Figure 6:
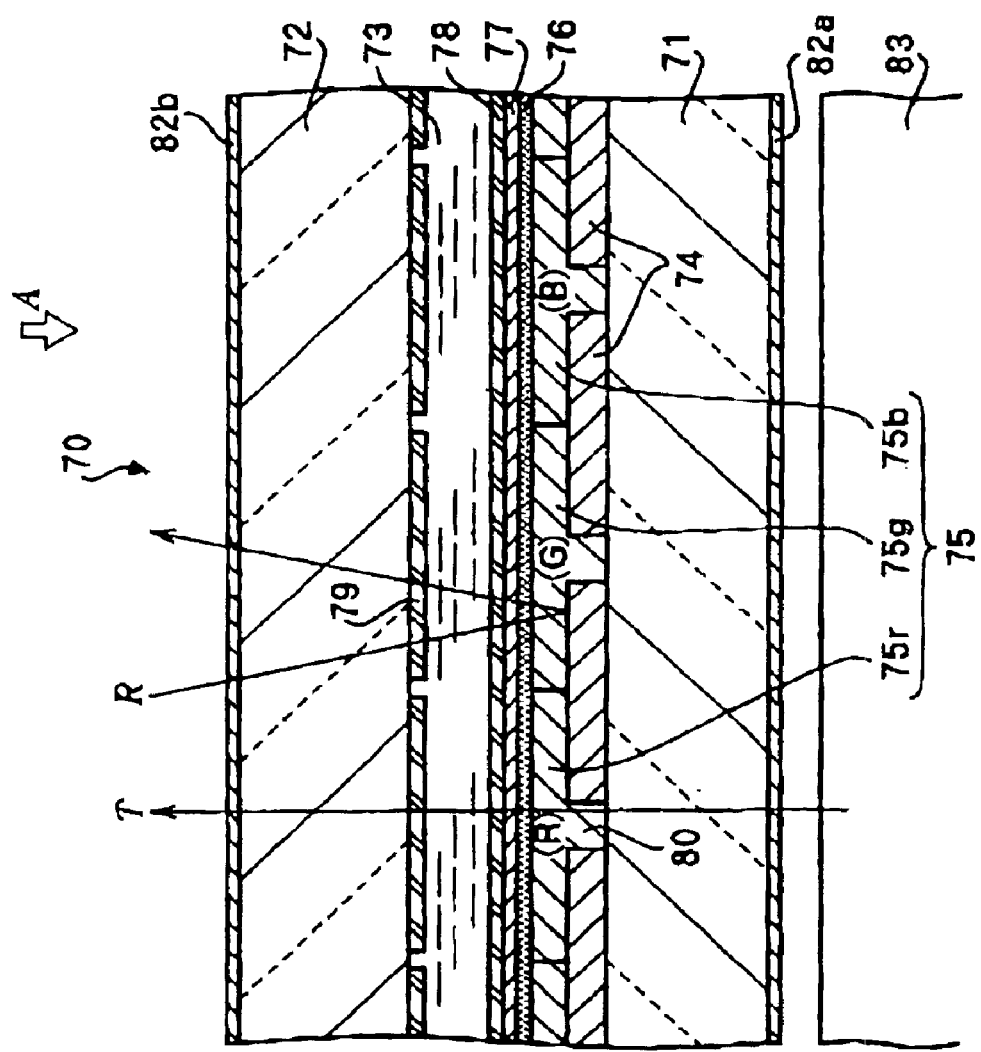
FIG. 6 is a sectional view showing the sectional structure of an example of conventional liquid crystal devices.
Figure 7:
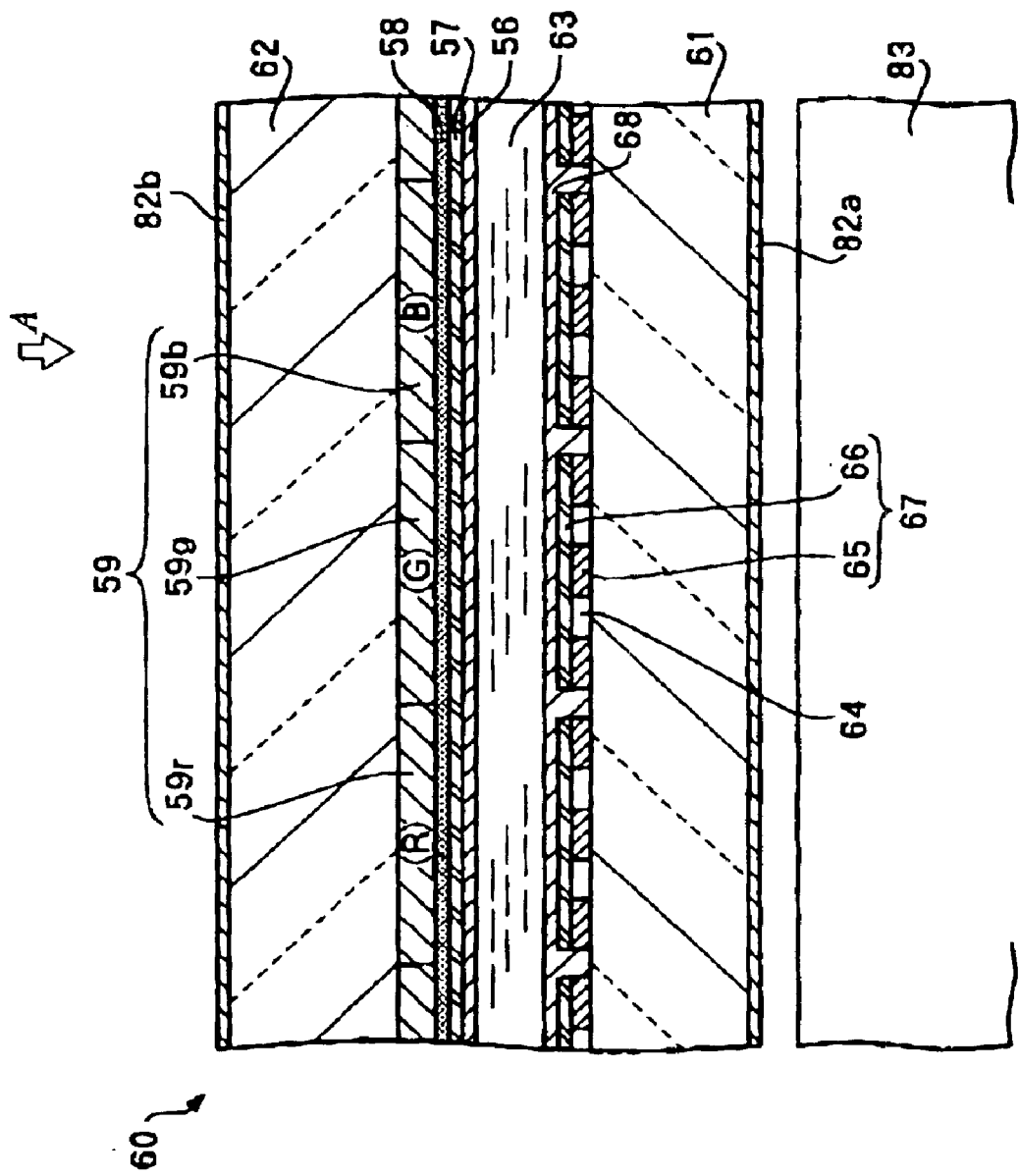
FIG. 7 is a sectional view showing the sectional structure of another example of conventional liquid crystal devices.

FIG. 5 shows a sectional structure of a principal portion of a liquid crystal device according to another embodiment of the present invention. The liquid crystal device of this embodiment is different from the above-described liquid crystal device of the embodiment shown in FIG. 2 in that lead wiring 24 has a single layer structure comprising only an ITO film 35. Since the other components are the same as the first embodiment shown in FIG. 2, the same components are denoted by the same reference numerals, and a detailed description thereof is omitted.

In the liquid crystal device shown in FIG. 2, each of the segment electrodes 10 and the lead wiring 14 has a two-layer structure comprising the APC film 18 and the ITO film 19. However, in the liquid crystal device shown in FIG. 5, the lead wiring 24 has a single layer structure comprising only the ITO film 35, and the APC films 18 are provided only in the display area on the surface of the lower substrate 2. Also, like in the embodiment shown in FIG. 2, all the upper and side surfaces of each of the APC films 18, which constitute the segment electrodes 10, are coated with the ITO films 19.

The lead wiring 24 is located outside the sealing material 4, and is easily contaminated. Therefore, when the lead wiring 24 contains an APC film, electromigration possibly occurs in the APC film due to surface contamination of the lead wiring 24. However, in this embodiment, as shown in FIG. 5, the lead wiring 24 has a single-layer structure comprising only the ITO film 35, i.e., a structure without the APC film, thereby causing no fear of the occurrence of electromigration even when the surface of the lead wiring 24 is contaminated.

In this embodiment, each of the segment electrodes 10 has a two-layer structure comprising the APC film 18 comprising a reflective conductive film, and the ITO film 19 comprising a metal oxide film, and all the upper and side surfaces of each APC film 18 are completely coated with the ITO films 19 which respectively constitutes the segment electrodes 10. It is thus possible to avoid the problem of corrosion due to moisture adhesion during the manufacturing process, and the problem of electromigration due to surface contamination of the APC films 18, thereby forming a liquid crystal device having high reliability.

Figure 10:
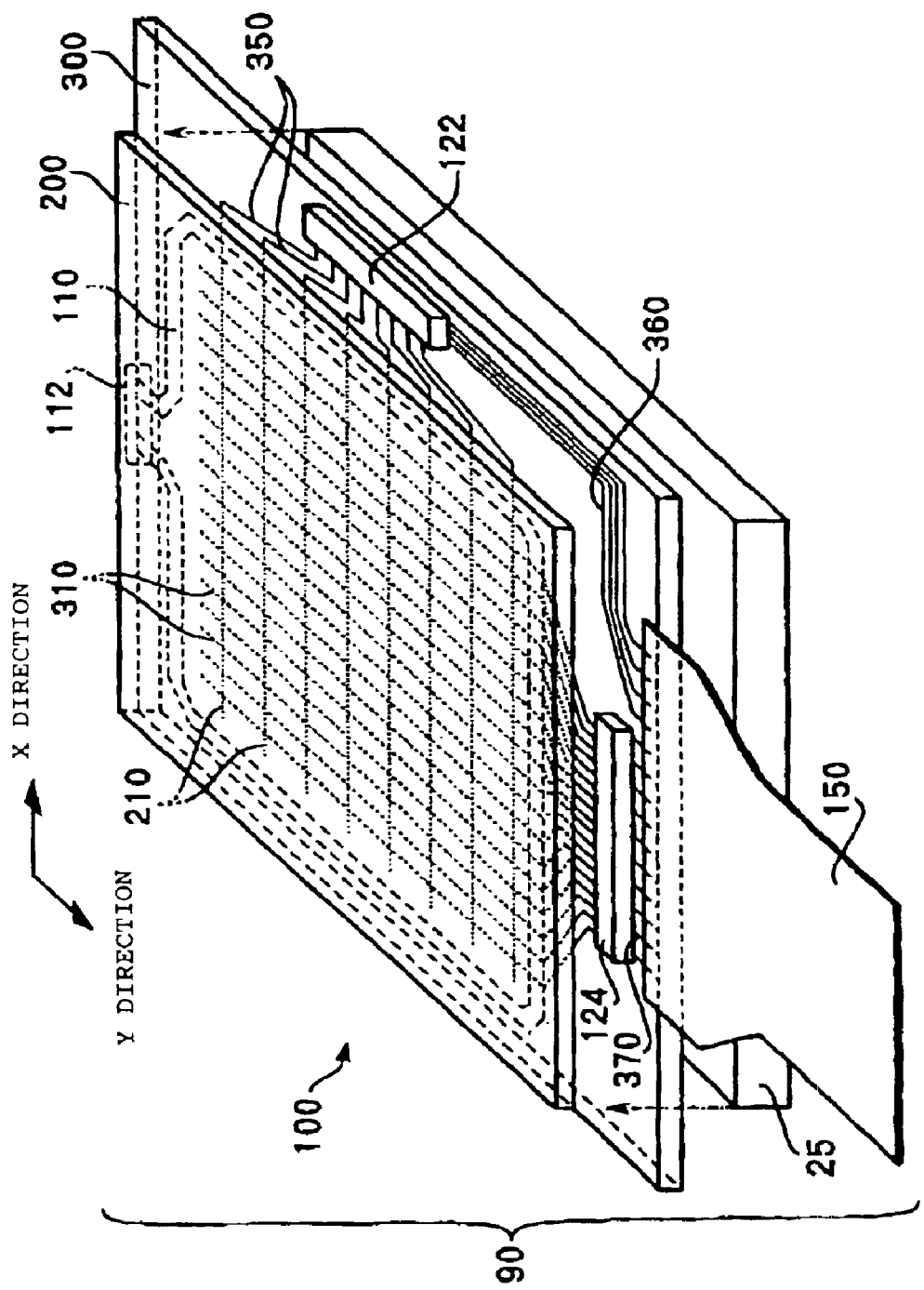
FIG. 10 is a perspective view showing a liquid crystal device according to still another embodiment of the present invention.
Figure 11:
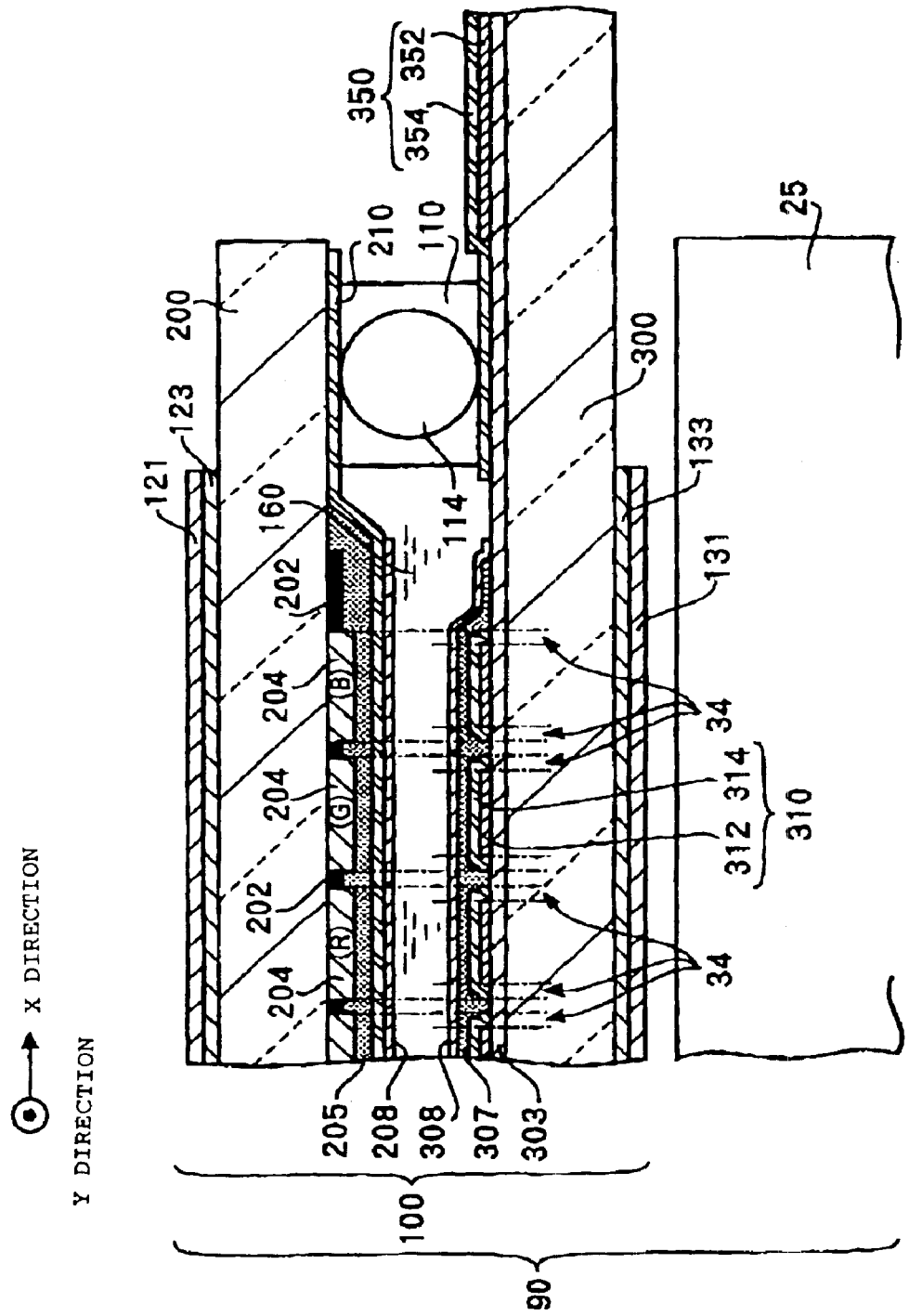
FIG. 11 is a sectional view showing the sectional structure of a principal portion of the liquid crystal device shown in FIG. 10.

FIG. 10 shows a liquid crystal device according to a further embodiment of the present invention. The liquid crystal device 90 shown in FIG. 10 is a transflective type which functions as a reflective type when sufficient external light is present, and functions as a transmissive type when a back light is turned on with insufficient external light. FIG. 11 is a partial sectional view showing the construction of the liquid crystal device 90 shown in FIG. 10, taken along the X direction.

In FIG. 10, the liquid crystal device 90 comprises an illumination device 25 provided as a back light on a liquid crystal panel 100. As shown in FIG. 11, the liquid crystal panel 100 comprises a front substrate 200 positioned on the observation side and a back substrate 300 positioned on the back side, both of which are aligned with each other with a constant gap maintained therebetween by a sealing material 110 containing conductive particles 114 serving as spacers, for example, a TN (Twisted Nematic) type liquid crystal 160 being sealed in the gap.

The sealing material 100 is formed on one of the substrates along the inner periphery of the front substrate 200, and has an opening formed for filling the liquid crystal 160.

Therefore, after the liquid crystal is filled, the opening is sealed with a sealant 112 shown in FIG. 10.

In addition, a plurality of scanning electrodes, i.e., common electrodes 210, are formed on the surface of the front substrate 200, which is opposed to the back substrate 300, so as to extend in the X direction in the line direction. On the other hand, a plurality of data electrodes, i.e., segment electrodes 310, are formed on the surface of the back substrate 300, which is opposed to the front substrate 200, so as to extend in the Y direction in the column direction. Therefore, in this embodiment, a voltage is applied to the liquid crystal 160 by both electrodes at the intersections of the common electrodes 210 and the segment electrodes 310 so that the intersections respectively function as display dots.

Furthermore, a driver IC 122 for driving the common electrodes 210 and a driver IC 124 for driving the segment electrodes 310 are amounted by a COG (Chip On Glass) technique on the two sides of the back substrate 300, which overhang from the front substrate 200, as described below. Of these two sides, a FPC (Flexible Printed Circuit) board 150 is connected to the outside of the region on which the driver IC 124 is mounted.

In FIG. 11, the common electrodes 210 formed on the front substrate 200 are connected to one terminal of wiring 350 formed on the back substrate 300 through conductive particles 114 mixed in the sealing material 110. On the other hand, the other end of the wiring 350 is connected to the output bumps (i.e., protrusion electrodes) of the driver IC 122 shown in FIG. 10. Namely, the driver IC 122 supplies common signals through the wiring 350, the conductive particles 114 and the common electrodes 210. The input bumps of the driver IC 122 are connected to the FPC board 150 serving as an external circuit board with wiring 360.

Also, the segment electrodes 310 formed on the back substrate 300 are connected directly to output bumps of the driver IC 124. Namely, the driver IC 124 supplies segment signals directly to the segment electrodes 310. The input bumps of the driver IC 124 are connected to the FPC board 150 with wiring 370.

As shown in FIG. 11, the liquid crystal 100 further comprises a polarizer plate 121 and a retardation plate 123 which are provided on the observation side (i.e., the upper side shown in the drawing) of the front substrate 200. Also, a polarizer plate 131 and a retardation plate 133 are provided on the back side (i.e., the lower side shown in the drawing) of the back substrate 300. In FIG. 10, the polarizer plates and the retardation plates are not shown. Furthermore, an illumination device 25 is provided as a back light on the back side of the back substrate 300 to be used as a transmissive light source in the case of insufficient external light.

The display area of the liquid crystal panel 100 will be described in detail below. First, the front substrate 200 is described in detail. As shown in FIG. 11, the retardation plate 123 and the polarizer plate 121 are provided on the outer surface of the substrate 200. On the other hand, a black mask 202 is formed as a light shielding film on the inner surface of the substrate 200 to function to prevent color mixing between a plurality of display dots, and function as a picture frame for defining the display area.

Furthermore, a color filter 204 is provided in a predetermined arrangement corresponding to the intersections of the common electrodes 210 and the segment electrodes 310, i.e., the apertures of the back mask 202. In this embodiment, the color filter 204 having R (red), G (green) and B (blue) colors is formed in a stripe arrangement suitable for data-system displays (refer to FIG. 12), and three display dots of R, G and B form a substantially square pixel. The present invention is not limited to this arrangement.

In FIG. 11, a planarizing film 205 made of an insulating material is formed for planarizing the black mask 202 and the color filter 204, and a transparent conductive material such as ITO or the like is patterned in stripes on the planarized surface to form the common electrodes 210. Furthermore, an alignment film 208 made of polyimide or the like is formed on the surfaces of the common electrodes 210. The alignment film 208 is rubbed in a predetermined direction before being bonded with the back substrate 300. Since the black mask 202, the color filter 204 and the planarizing film 205 are unnecessary in a region outside the display area, these components are not provided near the region of the sealing material 110.

Then, the construction of the back substrate 300 is described. The retardation plate 133 and the polarizer plate 131 are provided on the outer surface of the substrate 300. On the other hand, an underlying film 303 having insulation and light transmitting properties is formed over the entire inner surface of the substrate 300. Furthermore, a reflecting pattern 312 serving as a reflective conductive film, and a transparent conductive film 314 serving as a metal oxide film are laminated on the surface of the underlying film 303 to form the stripe segment electrodes 310. The purpose of providing the underlying film 303 on the surface of the substrate 300 is to improve adhesion of the reflecting pattern 312 formed on the surface of the substrate 300.

The reflecting pattern 312 is made of a silver alloy, for example, APC or the like, and is used for reflecting light incident on the front substrate 200 to return the light to the front substrate 200. At this time, the reflecting pattern 312 need not have a complete mirror surface, and rather preferably has a structure which appropriately causes diffused reflection. Therefore, the reflecting pattern 312 is preferably formed in a shape having an irregular surface to some extent.

The transparent conductive film 314 is formed to be larger than the reflecting pattern 312, and specifically, the edge portions 34 projecting from the reflecting pattern 312, i.e., the peripheral portions, contact the underlying film 303. Therefore, the surface of the reflecting pattern 312 is completely covered with the transparent conductive film 314, and, in this embodiment, thus the reflecting pattern 312 is not exposed to the outside. The edge portions 34 function as regions for transmitting light emitted from the illumination device 25 and introducing the light to the liquid crystal 160, i.e., light transmitting regions.

In addition, a protecting film 307 is provided on the surfaces of the segment electrodes 310. The protecting film 307 is made of, for example, $TiO_2$ or the like, and used as a protecting film for protecting the segment electrodes 310 comprising the reflecting pattern 312 and the transparent conductive film 314, and a layer for reflecting much blue component light. Furthermore, an alignment film 308 made of polyimide is formed on the surface of the protecting film 307. The alignment film 308 is rubbed in a predetermined direction before the front substrate 200 and the back substrate 300 are aligned with each other. The manufacturing process of the back substrate 300 is described after wirings 350, 360 and 370 are described for the sake of convenience.

Figure 12:
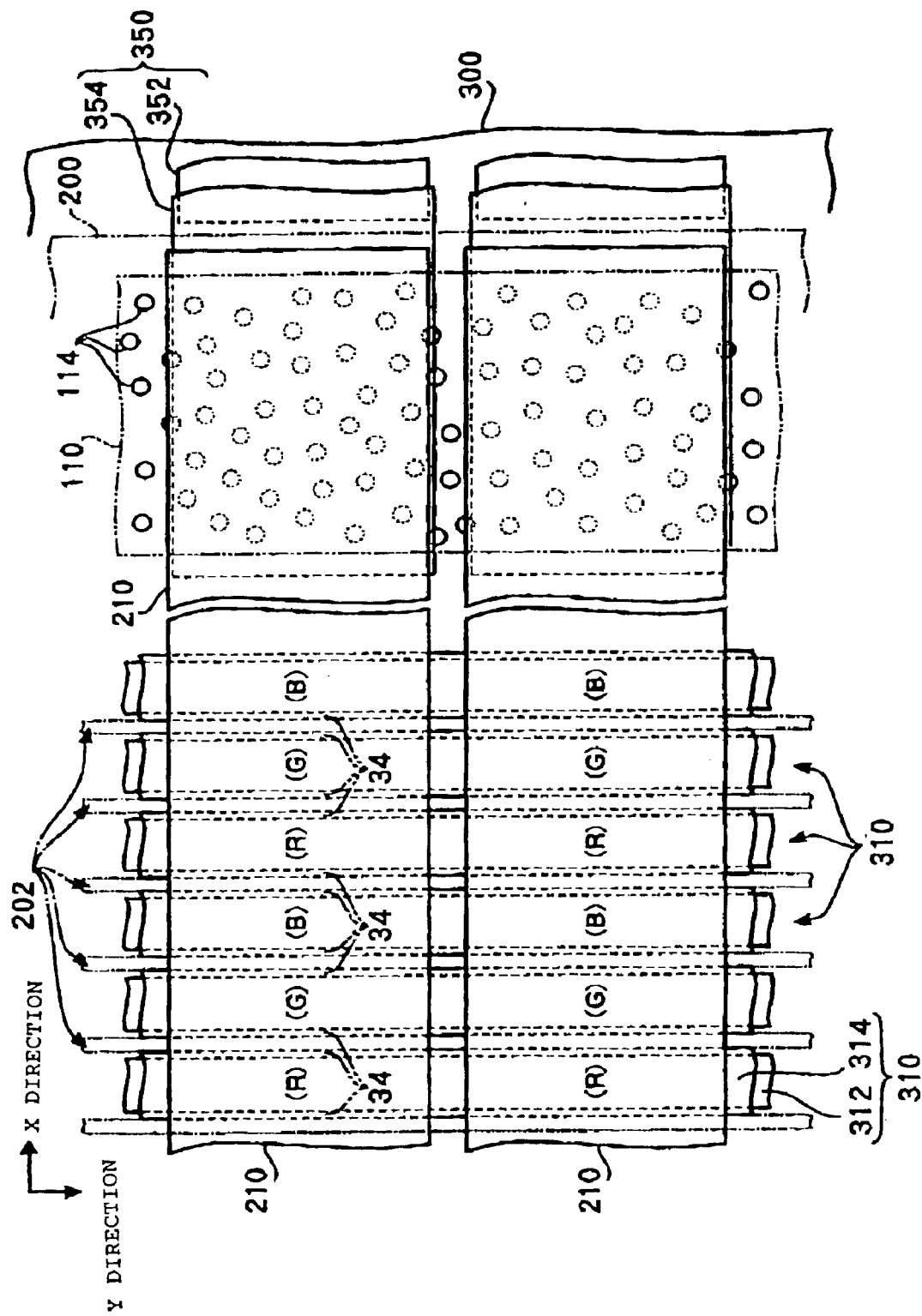
FIG. 12 is a plan view showing the planar structure of a principal portion of the liquid crystal device shown in FIG. 10.

The portion of the liquid crystal panel 100, which is near the region where the sealing material 110 is formed is described with reference to FIGS. 11 and 12. FIG. 12 is a plan view showing the detailed construction of the vicinity of the region.

As shown in these drawings, the common electrodes 210 on the front substrate 200 are extended to the region where the sealing material 110 is formed, while the transparent conductive film 354 which constitutes the wiring 350 is extended to the region where the sealing material 110 is formed, to be opposed to the common electrodes 210. Therefore, by dispersing spherical conductive particles 114 serving as spacers in the sealing material 110 at an appropriate ratio, the common electrodes 210 are electrically connected to the transparent conductive film 354 through the conductive particles 114.

As described above, the wiring 350 electrically connects the common electrodes 210 and the output bumps of the driver IC 122, and comprises a lamination of the reflective conductive film 352 and the transparent conductive film 354. The reflective conductive film 352 is formed by patterning the same conductive layer as the reflecting pattern 312. Similarly, the transparent conductive film 354 is formed by patterning the same conductive layer as the transparent conductive film 314 to be larger than the reflective conductive film 352, specifically, so that the edge portions projecting from the reflective conductive film 352 contact the underlying film 303. However, in the region where the sealing material 110 is formed, as shown in FIG. 11, the reflective conductive film 352 is not formed, but only the transparent conductive film 354 is provided. In other words, the reflective conductive film 352 is formed in the region except the region of connection with the common electrodes 210, where the sealing material 110 is formed.

In FIG. 11, the conductive particle 114 is shown with a significantly larger diameter than the actual diameter for the sake of convenience of description, and only one conductive particle 114 is shown in the width direction of the sealing material 110. However, many conductive particles 114 are randomly arranged in the width direction of the sealing material 110, as shown in FIG. 12.

Figure 13:
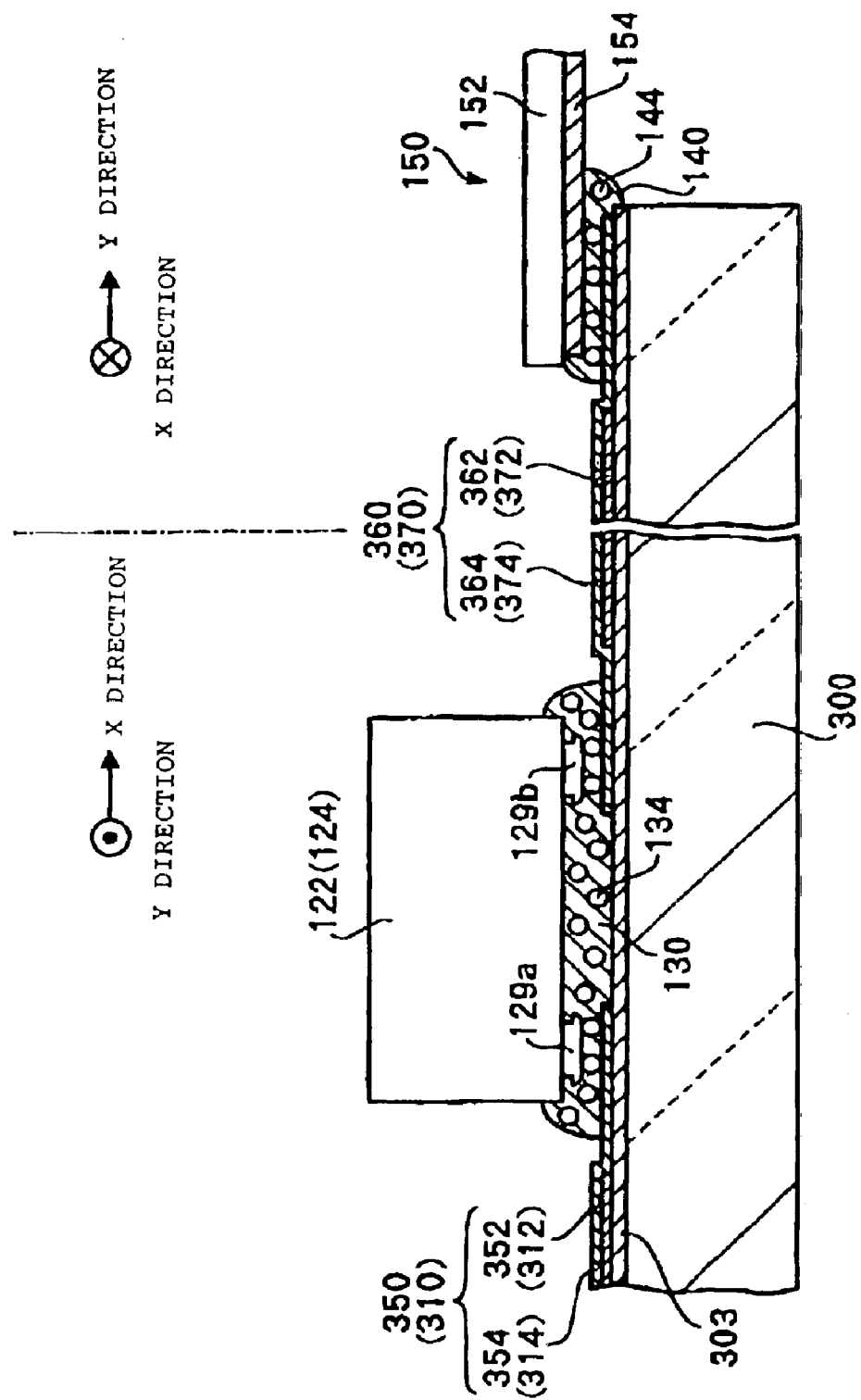
FIG. 13 is a sectional view showing the sectional structure of another principal portion of the liquid crystal device shown in FIG. 10.
Figure 14:
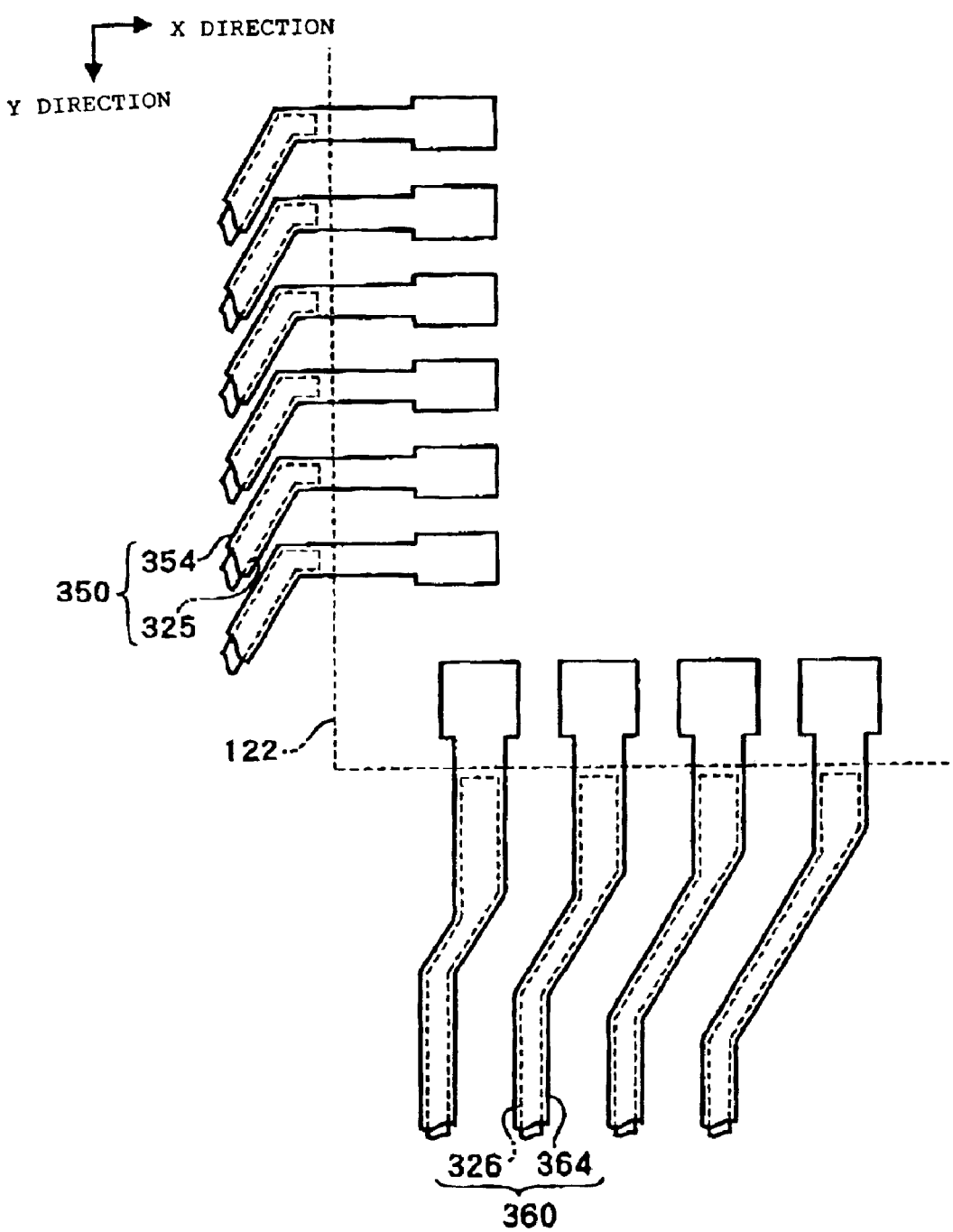
FIG. 14 is a plan view showing the planar structure of another principal portion of the liquid crystal device shown in FIG. 10.

Then, with respect to the back substrate 300, the regions where the driver ICs 122 and 124 are respectively mounted, and the vicinity of the junction region of the FPC board 150 are described below. FIG. 13 is a sectional view showing the constructions of those regions with wiring at the center. FIG. 14 is a plan view showing the construction of wiring in the region where the driver IC 122 is mounted. As described above, besides the segment electrodes 310, the wirings 350, 360 and 370 are provided on the back substrate 300. However, the wirings 350 and 360 related to the driver IC 122 are described as an example.

As shown in the drawings, as described above, the wiring 350 for supplying common signals output from the driver IC 122 to the common electrodes 210 comprises a lamination of the reflective conductive film 352 and the transparent conductive film 354. However, in the region where the driver IC 122 is mounted, as shown in FIG. 13, the reflective conductive film 352 is not provided, and only the transparent conductive film 354 is provided. In other words, the reflective conductive film 352 is formed in regions except the portion of junction with the driver IC 122.

Similarly, the wiring 360 for supplying various signals supplied from the FPC board 150 to the driver IC 122 comprises a lamination of the reflective conductive film 362 and the transparent conductive film 364. The reflective conductive film 362 is formed by patterning the same conductive layer as the reflecting pattern 312 and the reflective conductive film 352. Similarly, the transparent conductive film 364 is formed by patterning the same conductive layer as the transparent conductive films 314 and 354 to be wider than the reflective conductive film 362 so that the edge portions projecting from the reflective conductive film 362 contact the underlying film 303. However, in the region of the wiring 360, in which the driving IC 122 is mounted, and the region (not shown in FIG. 14) in which the FPC board 150 is connected, only the transparent conductive film 364 is provided without the reflective conductive film 362. In other words, the reflective conductive film 364 is formed to avoid the portion of connection with the driver IC 122 and the portion of connection with the FPC board 150.

For the wirings 350 and 360, the driver IC 122 is mounted by the COG technique, for example, as described below. First, a plurality of electrodes are provided in the inner periphery of one surface of the rectangular driver IC 122, and bumps 129a and 129b made of, for example, gold (Au) or the like are previously formed on each of the electrodes.

Then, processing is performed in the following order. First, a sheet-like anisotropic conductive film comprising an epoxy adhesive 130 and conductive particles 134 uniformly dispersed therein is placed on the region of the back substrate 300 where the driver IC 122 is to be mounted. Second, the anisotropic conductive film is held between the driver IC 122 with the electrodes facing downward and the back substrate 300. Thirdly, the driver IC 122 is positioned, pressed on the back substrate 300 with the anisotropic conductive film provided therebetween, and then heated.

As a result, in the driver IC 122, the output bumps 129a for supplying common signals are electrically connected to the transparent conductive film 354 constituting the wiring 350, and the input bumps 129b for inputting signals from the FPC board 150 are electrically connected to the transparent conductive film 364 constituting the wiring 360, through the conductive particles 134 contained in the adhesive 130. At the same time, the adhesive 130 also functions as a sealant for protecting the surface of the driver IC 122 where the electrodes are formed from moisture, contamination, stress, etc.

Although the wirings 350 and 360 related to the driver IC 122 are described as an example, the segment electrodes 310 related to the driver IC 124, and the wiring 370 for supplying various signals supplied from the FPC board 150 to the driver IC 124 have the same construction as the wirings 350 and 360, respectively as shown by parentheses in FIG. 13.

Namely, as described above, each of the segment electrodes 310 for supplying segment signals output from the driver IC 124 comprises a lamination of the reflecting pattern 312 and the transparent conductive film 314. However, in the region where the driver IC 124 is mounted, the reflecting pattern is not provided, and only the transparent conductive film 312 is provided. In other words, the reflecting pattern 312 is formed in regions except the portion of junction with the driver IC 124.

Similarly, the wiring 370 for supplying various signals supplied from the FPC board 150 to the driver IC 124 comprises a lamination of a reflective conductive film 372 and a transparent conductive film 374. The reflective conductive film 372 is formed by patterning the same conductive layer as the reflecting pattern 312 and the reflective conductive films 352 and 362. The transparent conductive film 374 is formed by patterning the same conductive layer as the transparent conductive films 314, 354 and 364 to be larger than the reflective conductive film 372 so that the edge portions projecting from the reflective conductive film 372 contact the underlying film 303. However, in the region where the driver IC 124 is mounted, and the region where the FPC board 150 is connected, the wiring 370 comprises only the transparent conductive film 374 without the reflective conductive film 372. In other words, the reflective conductive film 372 is formed in regions except the portions of junction with the driver IC 124 and the FPC board 150.

Like the driver IC 122, the driver IC 124 is connected to the segment electrodes 310 and the wiring 370 through an anisotropic conductive film.

In bonding the FPC board 150 to the wirings 360 and 370, similarly, an anisotropic conductive film is used. As a result, wiring 154 formed on a polyimide base material 152 of the FPC board 150 is electrically connected to the transparent conductive film 364 constituting the wiring 360 and the transparent conductive film 374 constituting the wiring 370 through the conductive particles 144 contained in the adhesive 140.

The process for manufacturing the above-described liquid crystal panel, particularly, the process for producing the back substrate, is described with reference to FIG. 15. A description will be mainly made of the display areas where the common electrodes 210 and the segment electrodes 310 intersect with each other.

As shown in FIG. 15(a), $Ta_2O_5$ or $SiO_2$ is first deposited over the entire inner surface of the substrate 300 by sputtering or the like to form the underlying film 303. As shown in FIG. 15(b), a reflective conductive layer 312' composed of a single silver material or mainly composed of silver is then deposited by sputtering. As the conductive layer 312', for example, an alloy containing 98% by weight of silver (Ag), platinum (Pt) and copper (Cu), a silver-copper-gold alloy, a silver-ruthenium (Ru)-copper alloy, or the like is preferably used.

As shown in FIG. 15(c), the conductive layer 312' is then patterned by photolithography and etching to form the reflecting pattern 312 in the display area, and the reflective conductive films 352, 362 and 372 in the region outside the display area.

As shown in FIG. 15(d), a conductive layer 314' of ITO or the like is then deposited by sputtering or the like. As shown in FIG. 15(e), the conductive layer 314' is then patterned by photolithography and etching to form the transparent conductive film 314 in the display area and the transparent conductive films 354, 364 and 374 in the region outside the display area. In this step, the peripheral portions of the transparent conductive films 314, 354, 364 and 374, i.e., the edge portions 34, are brought into contact with the underlying film 303 so as to avoid the reflecting pattern 312, and the reflective conductive films 352, 362 and 372 from being exposed. Therefore, after the conductive layer 314' is deposited, the surfaces of the reflecting pattern 312, and the reflective conductive films 352, 362 and 372 are not exposed, thereby preventing corrosion and peeling thereof. Since the transparent conductive film 314 is interposed between the liquid crystal 160 and the reflecting pattern 312, elution of impurities from the reflecting pattern 312 into the liquid crystal 160 can be prevented.

Although the subsequent processes are not shown in the drawings, these processes are briefly described below. The protecting film 307 and the alignment film 308 shown in FIG. 11 are formed in turn, and the alignment film 308 is rubbed. Then, the back substrate 300 is aligned with the front substrate 200, which comprises the alignment film 208 rubbed in the same manner, by using the sealing material 110 containing the conductive particles 114 appropriately dispersed therein.

Next, the liquid crystal 160 is added dropwise to the opening of the sealing material 110 in a near vacuum state. Then, the vacuum state is returned to atmospheric pressure to fill the whole panel with the liquid crystal 160. Then, the opening is sealed with the sealant 112. Then, as described above, the driver ICs 122 and 124 and the FPC board 150 are mounted to form the liquid crystal panel 100 shown in FIG. 10.

The display operation of the liquid crystal display device having the above construction is briefly described below. The driver IC 122 applies a selection voltage to the common electrodes 210 in the predetermined order for each horizontal scanning period, while the driver IC 124 supplies a segment signal, through the corresponding segment electrode 310, corresponding to the display contents of one display dot positioned at the common electrode 210 to which the selection voltage is applied. At this time, in the display area, the orientation state of the liquid crystal 160 is controlled for each display dot according to the difference between the voltages applied to the common electrodes 210 and the segment electrodes 310.

In FIG. 11, external light incident from the observer side passes through the polarizer plate 121 and the retardation plate 123 to be put into a predetermined polarized state, and then passes through the front substrate 200, the color filter 204, the common electrodes 210, the liquid crystal 160 and the segment electrodes 310 to reach the reflecting pattern 312. The light is reflected by the reflecting pattern 312, and then returns along the light path. Therefore, in the reflective type, the orientation state of the liquid crystal 160 changes according to the difference between the voltages applied to the common electrodes 210 and the segment electrodes 310 to control the quantity of external light finally seen by the observer after being reflected by the reflecting pattern 312 and passing through the polarizer plate for each display dot.

Figure 16:
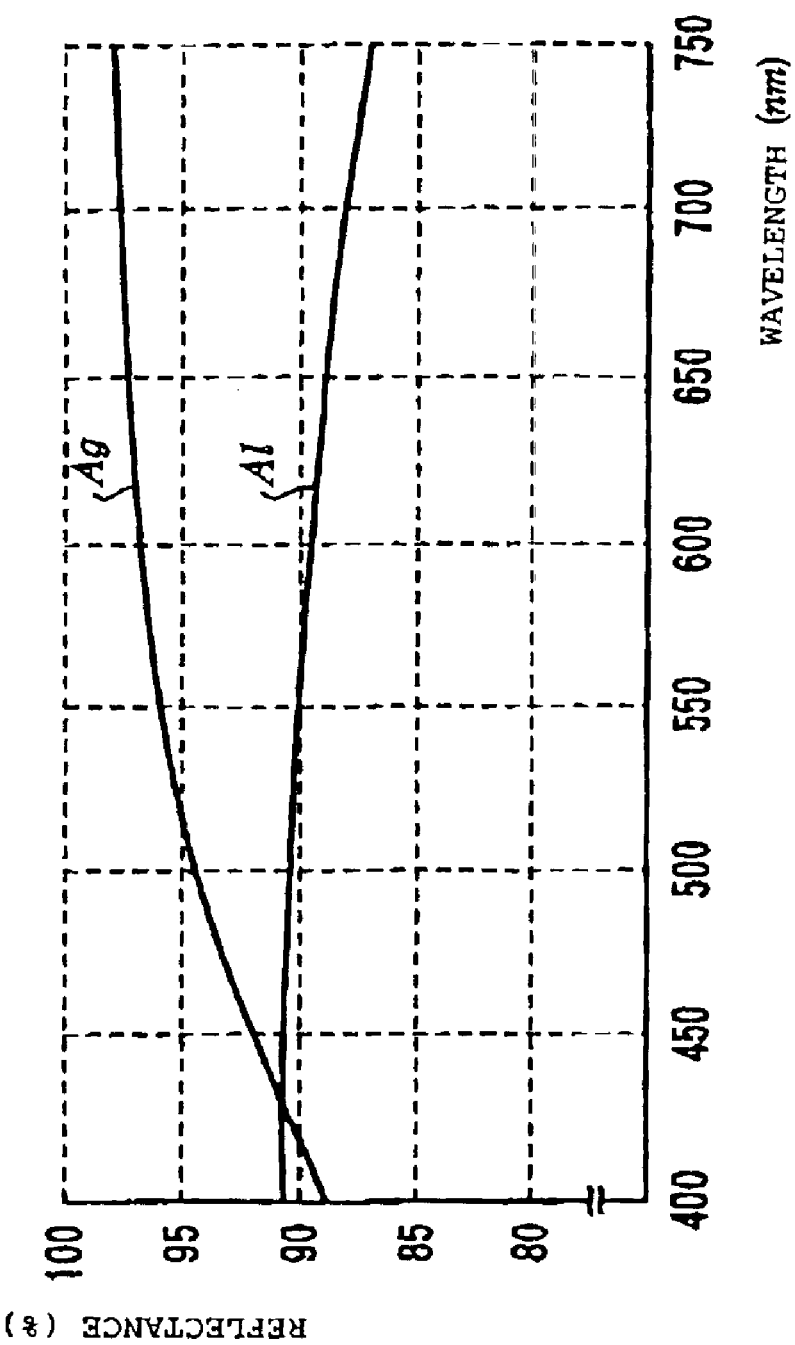
FIG. 16 is a graph explaining the characteristics of the reflective conductive films used in the liquid crystal device shown in FIG. 10.

In the reflective type, light on the low-wavelength side (i.e., the blue side) contains a large quantity of the component which is reflected by the protecting film 307 formed on the reflecting pattern 312, as compared with the component which is reflected by the reflecting pattern 312. The reason for providing the protecting film 307 is as follows. As shown in FIG. 16, the wavelength/reflectance properties of the reflecting pattern 312 containing silver is not so flat as it contains aluminum generally used, but has the tendency that reflectance decreases as the wavelength decreases. As a result, light reflected by the reflecting pattern 312 is liable to be tinged with yellow due to a decrease in quantity of the blue component, thereby adversely affecting color reproducibility, particularly, in a color display. Therefore, blue component light contains a large quantity of the component which is reflected by the protecting film 307, as compared with the component which is reflected by the reflecting pattern 312, to prevent light reflected by the protecting film 307 and the reflecting pattern 312 from being tinged with yellow.

On the other hand, in FIG. 11, when the illumination device 25 positioned on the back of the back substrate 300 is turned on, light emitted from the illumination device 25 passes through the polarizer plate 131 and the retardation plate 133 to be put into a predetermined polarized state, and then passes through the back substrate 300, the edge portions 34, the segment electrodes 310, the liquid crystal 160, the common electrodes 210, the front substrate 200 and the polarizer plate 201 to be emitted from the observer side. Therefore, in the transmissive type, the orientation state of the liquid crystal 160 changes according to the difference between the voltages applied to the common electrodes 210 and the segment electrodes 310 to control the quantity of light finally seen by the observer after being transmitted through the edge portions 34 and passing through the polarizer plate 121 for each display dot.

As a result, the liquid crystal device of this embodiment becomes the reflective type when external light is sufficiently present, and it becomes the transmissive type by lighting the back light 25 when external light is weak, and thus both display types can be realized. In this embodiment, the reflecting pattern 312 for reflecting light comprises silver or a silver alloy containing silver as a main component, and thus reflectance is increased to increase the quality of light returned to the observer side, thereby permitting a bright display. In this embodiment, the reflecting pattern 312 has no surface exposed to the outside after the conductive layer 312' for forming the transparent electrodes 310 is deposited, and thus corrosion and peeling of the reflecting pattern 312 can be prevented, thereby improving reliability.

Furthermore, the common electrodes 210 provided on the front substrate 200 are extended to the back substrate 300 through the conductive particles 114 and the wiring 350, and led, through the wiring 360, to the vicinity of the region where the driver IC 124 is mounted. Therefore, in this embodiment, the FPC board 150 is bonded to a position on one surface in spite of a simple matrix type. Therefore, simplification of the mounting process can be achieved.

On the other hand, each of the segment electrodes 310 has a laminated structure comprising the transparent conductive film 314 and the reflecting pattern 312 made of single silver or a silver alloy containing silver as a main component, decreasing resistance. Similarly, the wirings 350, 360 and 370 in the region outside the display area have laminated structures comprising the transparent conductive films 354, 364 and 374, and the reflective conductive films 352, 362 and 372, respectively, which comprise the same conductive layer as the reflecting pattern 312, thereby decreasing resistance.

Particularly, the wiring 360 extending from the FPC board 150 to the input bumps of the driver IC 122 includes a power supply line of the driver IC 122 for supplying common signals. Therefore, a relatively high voltage is applied to the wiring 360, and the wiring distance is longer than the wiring 370. When the wiring 360 has high resistance, thus the influence of a voltage drop cannot be neglected. However, in this embodiment, the resistance of the wiring 360 is decreased due to the laminated structure, and the influence of a voltage drop is decreased.

In the region where the driver IC 124 is mounted, each of the segment electrodes 310 comprises only the transparent conductive film 314 without the reflecting pattern 312. In the region included in the sealing material 110 and the region where the driver IC 122 is mounted, the wiring 350 comprises only the transparent conductive film 354 without the reflective conductive film 352.

Similarly, in the region where the driver IC 122 is mounted, and the region where the FPC board 150 is bonded, the wiring 360 comprises only the transparent conductive film 364 without the reflective conductive film 362. Also, in the region where the driver IC 124 is mounted, and the region where the FPC board 150 is bonded, the wiring 370 comprises only the transparent conductive film 374 without the reflective conductive film 372.

The reason for the above construction is that it is undesirable to provide a silver alloy or the like on a portion subjected to stress because of the low adhesion of a silver alloy. Namely, when the low resistance of wiring is given priority, a reflecting pattern or a reflective conductive film is preferably formed over the entire region below a transparent electrode or transparent conductive film. In this case, for example, a connection defect occurring in the step of mounting a driver IC possibly causes peeling of the reflective conductive film from the substrate due to low adhesion at the time of change of the chip. Therefore, in this embodiment, a portion easily subjected to stress comprises only a transparent electrode or transparent conductive film without a silver alloy or the like, thereby preventing peeling of the silver alloy or the like.

As described above, in this embodiment, as shown in FIG. 12, the edge portions 34 of the transparent conductive film 314 which constitutes each of the segment electrodes 310, i.e., the transparent portions where the reflecting pattern 312 is absent, are provided on both sides of the light shielding film 202 to extend in the Y direction. These edge portions 34 function as light transmitting regions in a transmissive display, while the reflecting pattern 312 functions as a light reflecting region in a reflective display.

As described above, this embodiment uses, as the light transmitting regions, the edge portions 34 of the transparent conductive films 314 positioned outside the light reflecting regions. Therefore, in FIG. 12, even when the positional relation between the reflecting pattern 312 and the light shielding film 202 deviates due to a manufacturing error or another cause, the area ratio of the light reflecting regions to the light transmitting regions is not changed as long as the deviation is less than the width dimension of the edge portions 34. Therefore, a change in display quality can be prevented even when the display system of the liquid crystal device is switched between the reflective type and the transmissive type.

In the embodiment shown in FIG. 10, the common electrodes 210 are driven by the driver IC 122, and the segment electrodes 310 are driven by the driver IC 124. The present invention is not limited to this, and for example, the present invention can be applied to a liquid crystal device having a construction in which the common electrodes 210 and the segment electrodes 310 are driven by a one-chip type driver IC 126, as shown in FIG. 17.

Figure 17:
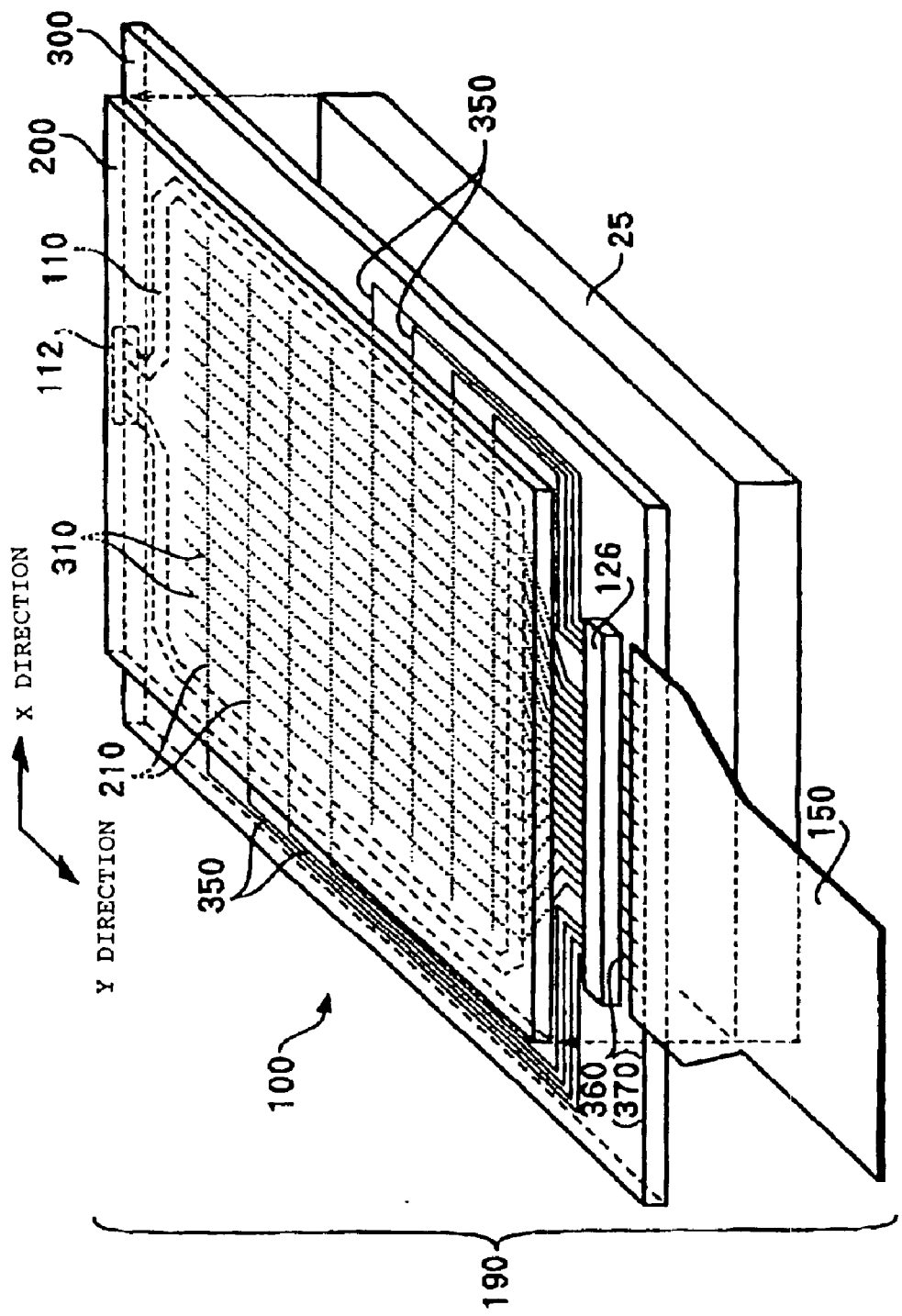
FIG. 17 is a perspective view of a liquid crystal device according to a further embodiment of the present invention.

The liquid crystal device 190 shown in FIG. 17 is common to the liquid crystal device 90 shown in FIG. 10 in that a plurality of common electrodes 210 are formed on the front substrate 200 to extend in the X direction. However, the liquid crystal device 190 is different from the liquid crystal device 90 in that the common electrodes 210 of the upper half, and the common electrodes 210 of the lower half are led out from the left side and the right side, respectively, and connected to the driver IC 126.

The driver IC 126 comprises a chip comprising the driver ICs 122 and 124 of the liquid crystal device 90 shown in FIG. 10. Therefore, the output side of the driver IC 126 is connected to the segment electrodes 310 and the common electrodes 210 through wiring 350. The FPC board 150 supplies, through wiring 360 (370), a signal output from an external circuit (not shown in the drawing), for controlling the driver IC 126.

Figure 18:
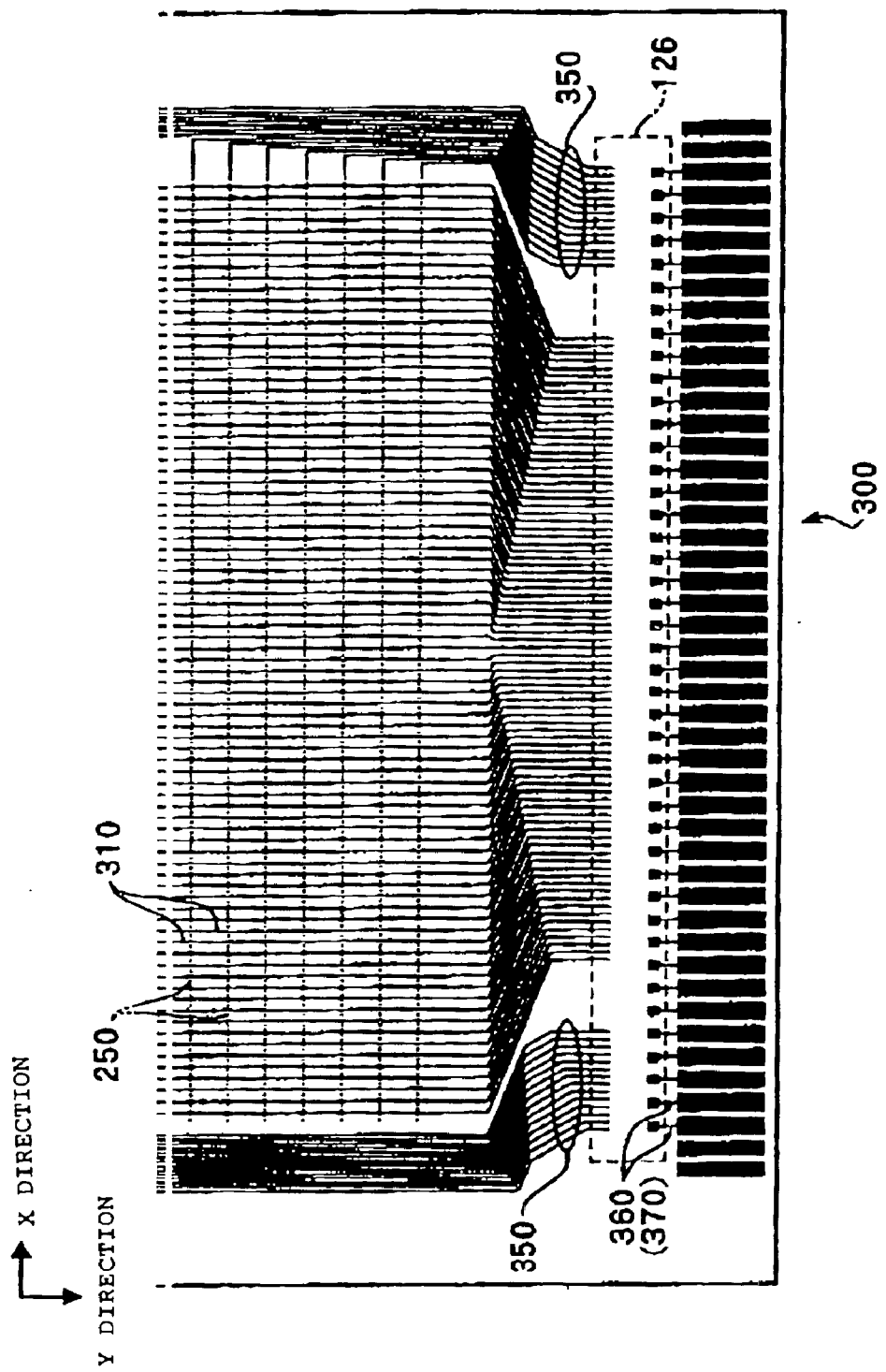
FIG. 18 is a plan view showing the planar structure of a principal portion of the liquid crystal device shown in FIG. 17.

A description will now be made of the actual wiring layout near the region where the driver IC 126 is mounted. FIG. 18 is a plan view showing an example of the wiring layout.

As shown in FIG. 18, the segment electrodes 310 are extended from the output side of the driver IC 126 to the display area with the pitch increased, while the wiring 350 and the common electrodes 210 are extended from the output side of the driver IC 126 along the Y direction with the pitch decreased, bent at an angle of 90° with the pitch increased, and extended to the display area.

The reason for decreasing the pitch of the wiring 350 in the region where the wiring 350 is extended from the output side of the driver IC 126 in the Y direction is that the region is a dead space not contributing to a display. If the region is wide, the number of substrates obtained from a large-size glass, i.e., a mother glass, is decreased to increase the cost. In order to bond the output bumps of the driver IC 126 to the wiring 350 by a COG technique, a certain pitch is required, and thus the pitch in the bonding region of the driving IC 126 is conversely increased.

In the liquid crystal device 190 shown in FIG. 17, when the number of the common electrodes 210 is small, the common electrodes 210 may be led out only from one side.

Figure 19:
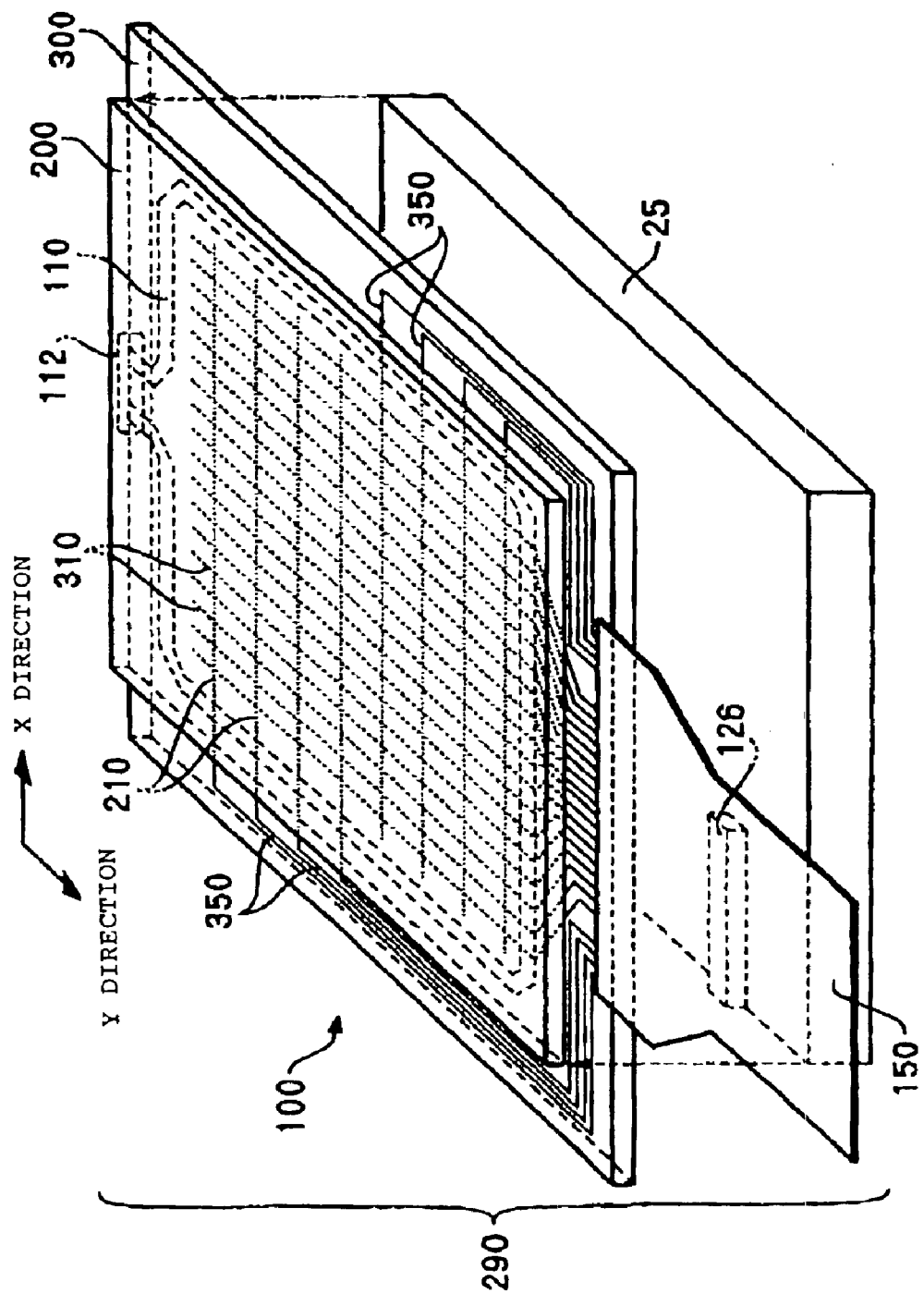
FIG. 19 is a perspective view of a liquid crystal device according to a still further embodiment of the present invention.

As shown in FIG. 19, the present invention can also be applied to a type in which a driver IC is not mounted on the liquid crystal panel 100. In the liquid crystal device 290 shown in FIG. 19, the driver IC 126 is mounted on the FPC board 150 by a flip chip technique. The driver IC 126 may be bonded with inner leads, and bonded to the liquid crystal panel 100 with outer leads by using a TAB (Tape Automated Bonding) technique. However, in this structure, the number of contact points with the FPC board 150 increases as the number of pixels increases.

In the liquid crystal device 90 shown in FIG. 11, an insulating material is used for the underlying film 303 made of a silver alloy or the like. However, the underlying film 303 is not limited to this, and a conductive material such as ITO, $Sn_2O_3$, or the like can also be used. Therefore, an embodiment using a conductive material for the underlying film 303 is described below. Since the liquid crystal device of this embodiment has the same appearance as the liquid crystal device 90 shown inn FIG. 10, the construction of internal electrodes and wiring is mainly described.

Figure 20:
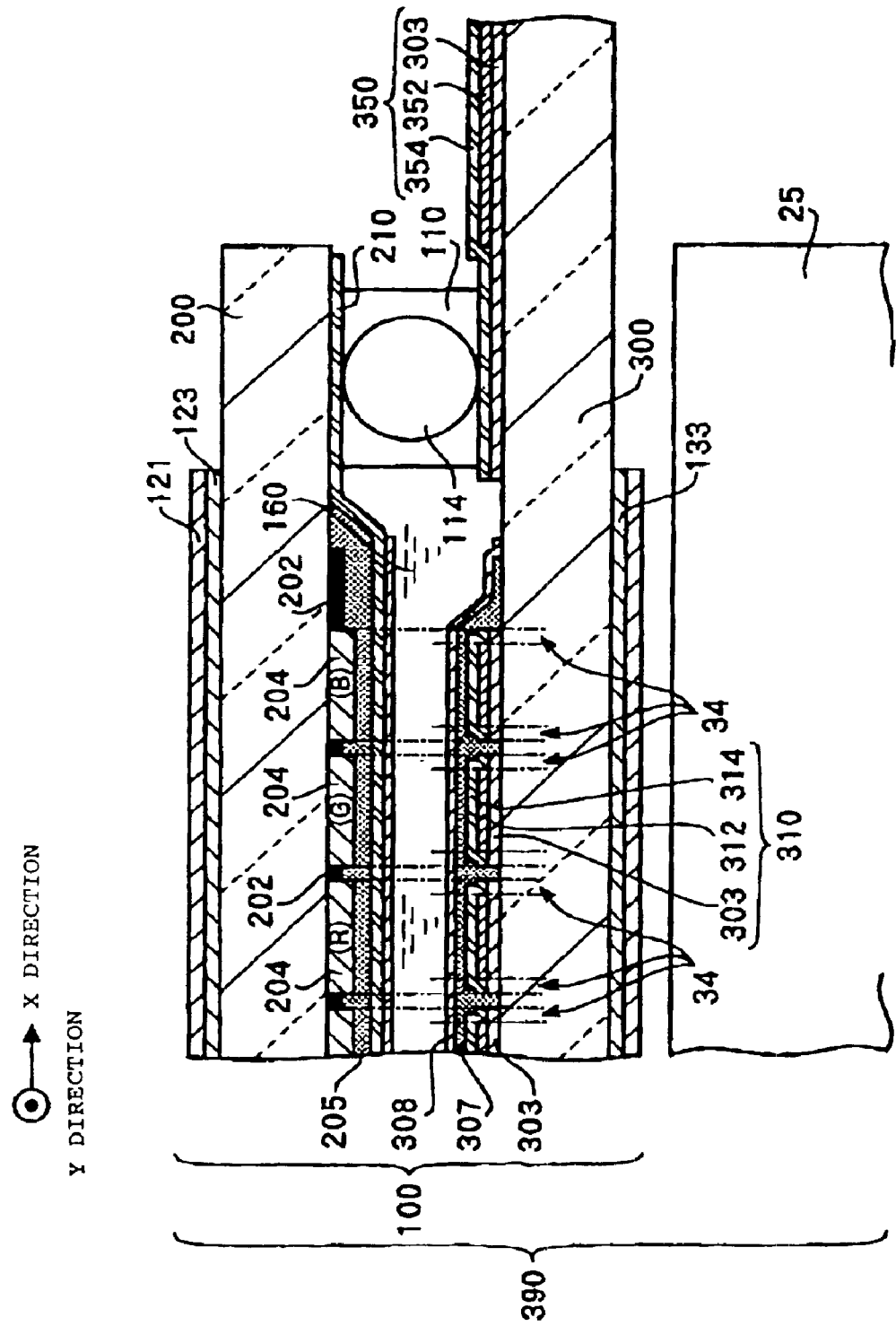
FIG. 20 is a sectional view showing the sectional structure of a principal portion of a liquid crystal device according to a further embodiment of the present invention.
Figure 21:
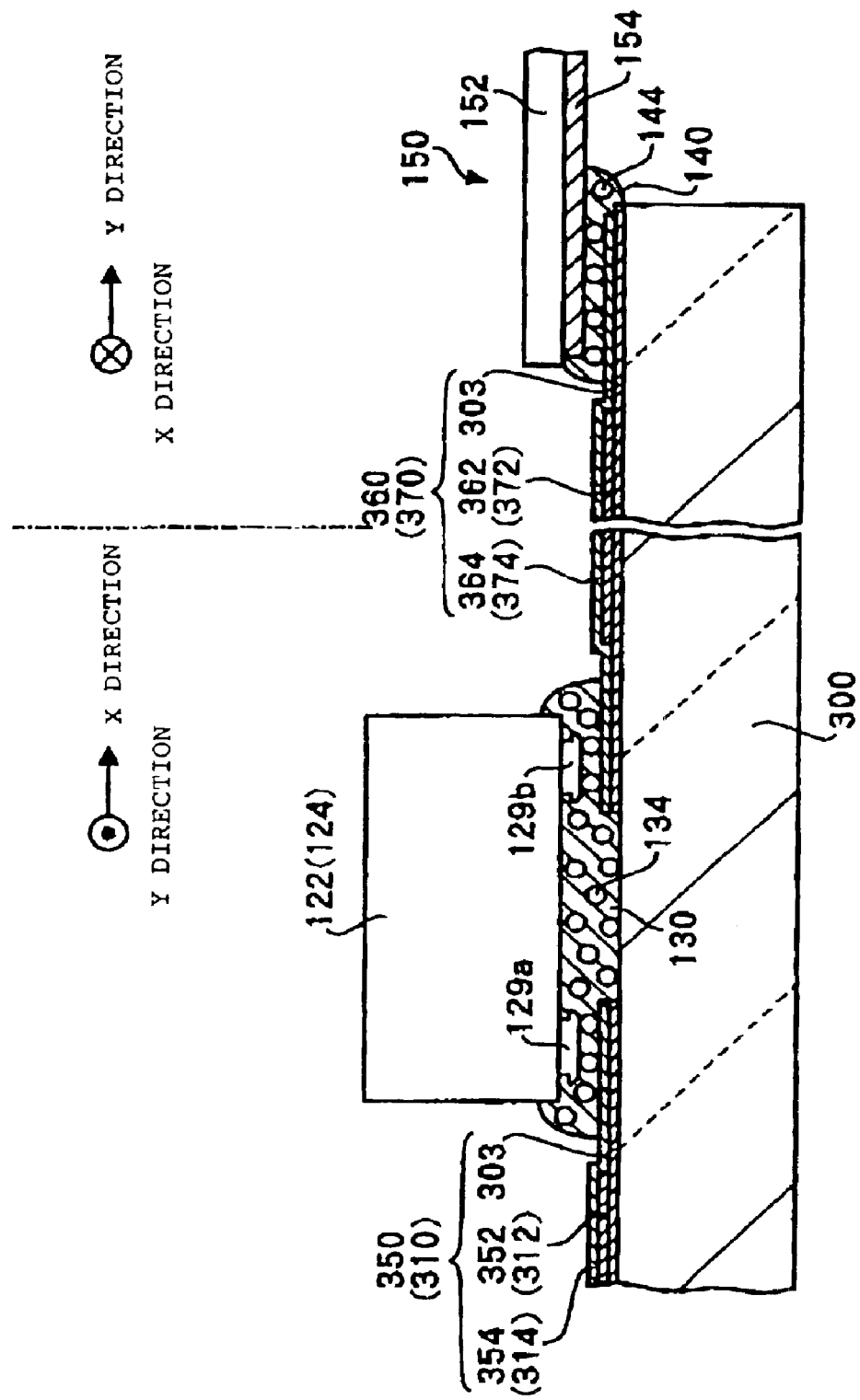
FIG. 21 is a sectional view showing the sectional structure of another principal portion of the liquid crystal device shown in FIG. 20.

FIG. 20 shows a sectional structure of a liquid crystal panel of a liquid crystal device 390 of this embodiment, taken along the X direction. FIG. 21 shows a sectional structure of a region of the back substrate 300 in which driver IC 122 or 124 is mounted, and a region in which the FPC board 150 is bonded.

In these drawings, the underlying layer 303 is the same as that of the embodiment shown in FIG. 11 in that the underlying layer 303 is provided for improving adhesion between the reflecting pattern 312 serving as a reflective conductive film and the reflective conductive films 352, 362 and 372. However, this embodiment is different from the embodiment shown in FIG. 11 in that the underlying film 303 is made of a material having conductivity and light transmitting properties, such as ITO, $Sn_2O_3$, or the like.

The underlying film 303 is patterned in substantially the same shape as the transparent conductive films 314, 354, 364 and 374 by the same process as these transparent conductive films, as described below.

The characteristics of the construction of this embodiment are described in detail below. In each of the segment electrodes 310, as shown in FIG. 20, the reflecting pattern 312 is sandwiched between the underlying film 303 and the transparent conductive film 314, and the edge portions 34 of the transparent conductive film 314, which project from the reflecting pattern 312, i.e., the peripheral portions, are formed in contact with the underlying film 303. Therefore, each of the segment electrodes 310 has a three-layer structure in which the underlying film 303 made of a conductive material, the reflecting pattern 312, and the transparent conductive film 314 are laminated in turn. However, the reflecting pattern 312 is formed to avoid the portion of bonding with the output bumps 129a of the driver IC 124, as shown by parentheses in FIG. 21. The edge portions 34 function as the light transmitting regions in a transmissive display.

Second, in the wiring 350 extended from the output bumps 129a of the driver IC 122 to the connection with common electrodes 210, as shown in FIGS. 20 and 21, the reflective conductive film 352 is sandwiched between the underlying film 303 and the transparent conductive film 354, and the edge portions of the transparent conductive film 354, which project from the reflective conductive film 352, are formed in contact with the underlying film 303. Therefore, the wiring 350 has a three-layer structure in which the underlying film 303, the reflective conductive film 352 and the transparent conductive film 354 are laminated in turn. However, the reflective conductive film 352 is formed to avoid the portion (refer to FIG. 20) of connection with the common electrodes 210 through the conductive particles 114, and the portion (refer to FIG. 21) of connection with the output bumps of the driver IC 122.

Third, in the wiring 360 extended from the connection terminals of the FPC board 150 to the input bumps 129b of the driver IC 122, as shown in FIG. 21, the reflective conductive film 362 is sandwiched between the underlying film 303 and the transparent conductive film 364, and the edge portions of the transparent conductive film 364, which project from the reflective conductive film 362, are formed in contact with the underlying film 303. Therefore, the wiring 360 has a three-layer structure in which the underlying film 303, the reflective conductive film 362 and the transparent conductive film 364 are laminated in turn. However, the reflective conductive film 362 is formed to avoid the portion of the connection with the FPC board 150 through the conductive particles 144, and the portion of the connection with the input bumps 129b of the driver IC 122.

Fourth, in the wiring 370 extended from the connection terminals of the FPC board 150 to the input bumps 129b of the driver IC 124, as shown by parenthesis in FIG. 21, the reflective conductive film 372 is sandwiched between the underlying film 303 and the transparent conductive film 374, and the edge portions of the transparent conductive film 374, which project from the reflective conductive film 372, are formed in contact with the underlying film 303. Therefore, the wiring 370 has a three-layer structure in which the underlying film 303, the reflective conductive film 372 and the transparent conductive film 374 are laminated in turn. However, the reflective conductive film 372 is formed to avoid the portion of the connection with the FPC board 150 through the conductive particles 144, and the portion of the connection with the input bumps 129b of the driver IC 124.

In FIGS. 20 and 21, each of the connection portions of the driving ICs 122 and 124, and the portion of the connection with the FPC board 150 comprises two layers including the underlying film 303 and the transparent conductive film 314, 354, 364 or 374. However, these portions may have a single layer structure of any one of the films.

In this embodiment, the underlying film 303 has the same planar shape as the transparent conductive films 314, 354, 364 and 374. Therefore, in this embodiment, the planar structure of display dots of the liquid crystal panel is the same as the above-described embodiment shown in FIG. 3. In the liquid crystal panel 100 of this embodiment shown in FIG. 20, the planar structure near the region where a driver IC is mounted is also the same as the embodiment shown in FIG. 5.

The process for manufacturing the liquid crystal panel 100 shown in FIG. 20, particularly, the process for producing the back substrate, is described with reference to FIG. 22. First, as shown in FIG. 22(a), a metal oxide material such as ITO, $Sn_2O_3$ or the like is deposited by sputtering over the entire inner surface of the substrate 300 to form the underlying film 303'. Then, as shown in FIG. 22(b), a reflective conductive layer 312' composed of single silver or silver as a main component is deposited by sputtering or the like. As the conductive layer 312', the same layer as the liquid crystal device 90 shown in FIG. 11 can be used.

Then, as shown in FIG. 22(c), only the conductive layer 312' formed on the underlying film 303' is patterned by photolithography and etching. By etching, the reflecting pattern 312 is formed in the display area, and the reflective conductive films 352, 362 and 372 are formed outside the display area.

Since the selection ratio of the underlying film 303' made of a metal oxide is different from that of the conductive layer 312' made of an alloy, and thus, specifically, the conductive layer 312' is more easily etched than the underlying film 303'. Therefore, only the conductive layer 312' can be selectively etched by using an appropriate etching solution. As such an etching solution, for example, a mixed solution containing phosphoric acid (54%), acetic acid (33%), nitric acid (0.6%) and water as the balance at a ratio by weight can be used.

Then, as shown in FIG. 22(d), a conductive layer 314' of ITO or the like is deposited by sputtering. As shown in FIG. 22(e), the underlying film 303' and the conductive layer 314' are simultaneously patterned by photolithography and etching to form the underlying film 303 and the transparent conductive films 314. As a result, the segment electrodes 310 are formed. In the region outside the display area, the underlying film 303' and the conductive layer 314' are patterned to form the underlying film 303 and the transparent conductive films 354, 364 and 374, respectively. As a result, the wirings 350, 360 and 370 are formed.

When the transparent conductive films 314, 354, 364 and 374, and the underlying film 303 are patterned to be larger than the reflecting pattern 312, and the reflective conductive films 352, 362 and 372, respectively, the edge portions of the transparent conductive films, which project from the reflecting pattern and the reflective conductive films, are brought into contact with the underlying film 303, thereby preventing the reflecting pattern and the reflective conductive films from being exposed.

Figure 15:
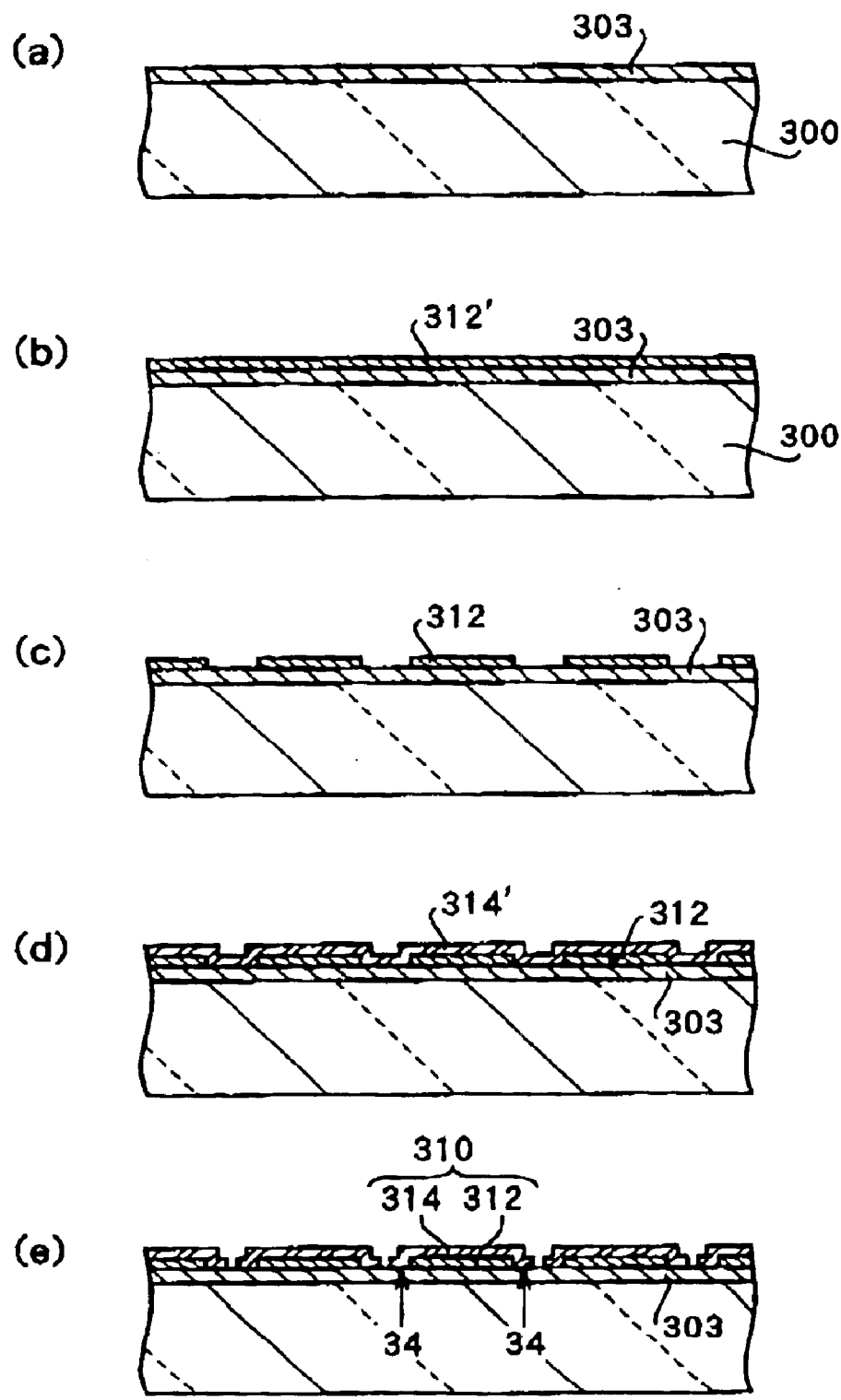
FIG. 15 is a drawing showing the steps of a method of manufacturing the liquid crystal device shown in FIG. 11 according to an embodiment.

The subsequent processes are the same as the above-described embodiment shown in FIG. 15. In FIG. 20, a protecting film 307 and an alignment film 308 are formed in turn, and then the alignment film 308 is rubbed. Then, the back substrate 300 is aligned with the front substrate 200, in which the alignment film 208 is rubbed, with the sealing material 110 containing the conductive particles 114 appropriately dispersed therein, and the liquid crystal 160 is added dropwise to the opening of the sealing material 110 in a near vacuum state. Then, the vacuum state is returned to the atmospheric pressure, and the opening is sealed with the sealant 112. Then, the driver ICs 122 and 124 and the FPC board 150 are mounted to obtain the liquid crystal panel 100 which is the same as the embodiment shown in FIG. 10.

In the embodiment shown in FIG. 20, the reflecting pattern made of a silver alloy, and the reflective conductive films 352, 362 and 372 are completely coated with the transparent conductive films 314, 354, 364, and 374, respectively, and the reflecting pattern and the reflective conductive films are held between the underlying film and the transparent conductive film, both of which are made of a metal oxide. Therefore, adhesion between the underlying film and the transparent conductive films is higher than the embodiment shown in FIG. 11 using an inorganic material and a metal oxide, thereby decreasing the entrance of moisture through interfaces.

Although, in the embodiment shown in FIG. 20, the underlying film 303 is added as a metal oxide film, the underlying film 303 can be patterned in the same step as the transparent conductive films 314, 354, 364, and 374, and thus the process is not complicated as compared with the embodiment shown in FIG. 11.

Furthermore, in the embodiment shown in FIG. 20, wiring also has the three-layer structure except the connection portions to decrease resistance, as compared with the embodiment shown in FIG. 11 using the two-layer structure. The other functions and effects are the same as the embodiment shown in FIG. 11.

Although, in each of the above embodiments, the simple matrix type liquid crystal device is described, the present invention can also be applied to an active matrix type liquid crystal device using active elements, i.e., switching elements. Therefore, a description will now be made of a case in which the present invention is applied to a liquid crystal device having a structure in which a liquid crystal is driven by active elements.

In this embodiment, TFD (Thin Filmed Diode) as a two-terminal active element is used as an example of the active elements. The liquid crystal device of this embodiment has the same appearance as the liquid crystal device shown in FIG. 1, and thus the structure of internal electrodes and wiring is mainly described below.

Figure 23:
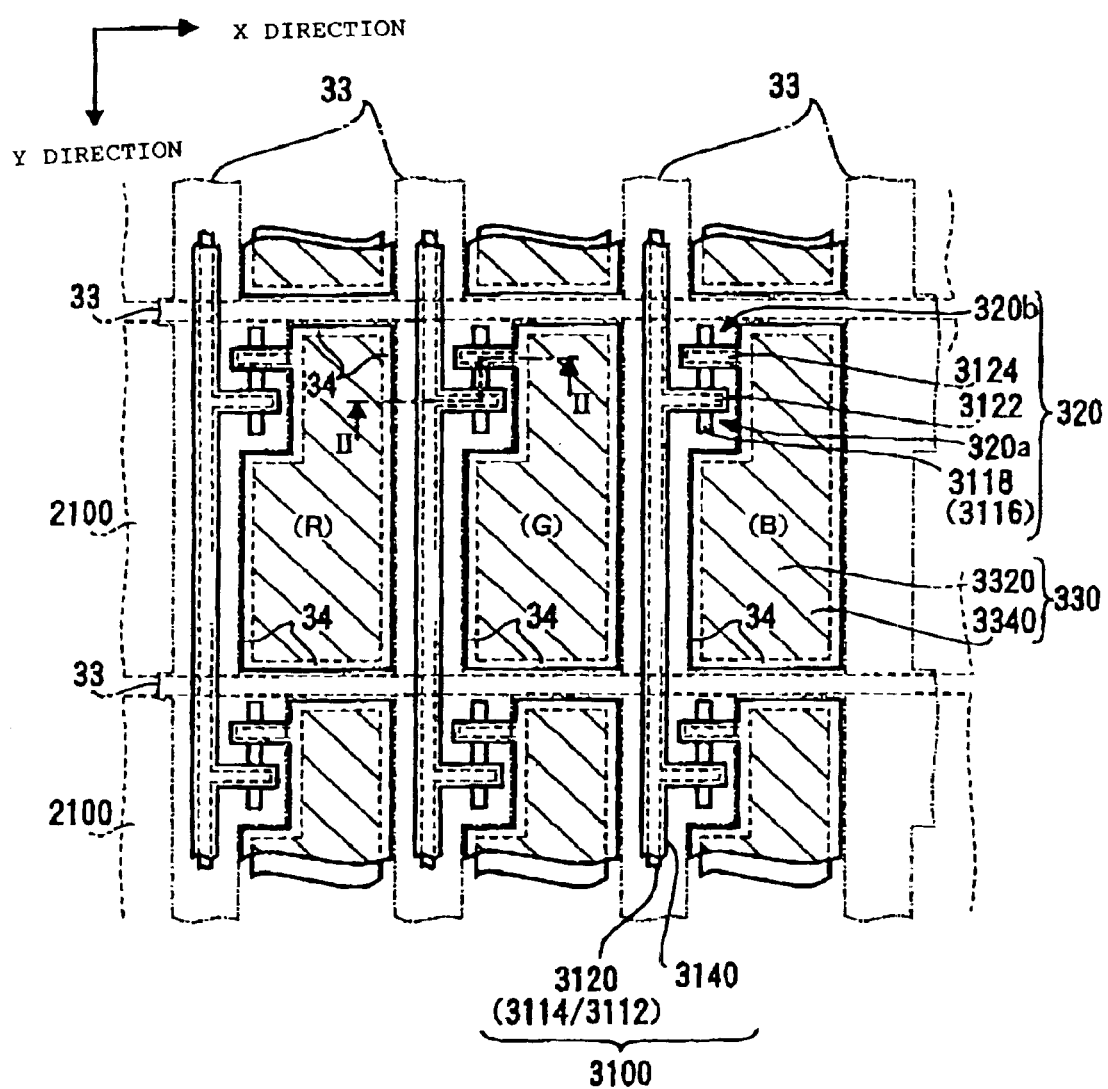
FIG. 23 is a plan view showing the planar structure of a principal portion of a liquid crystal device according to a further embodiment of the present invention.
Figure 24:
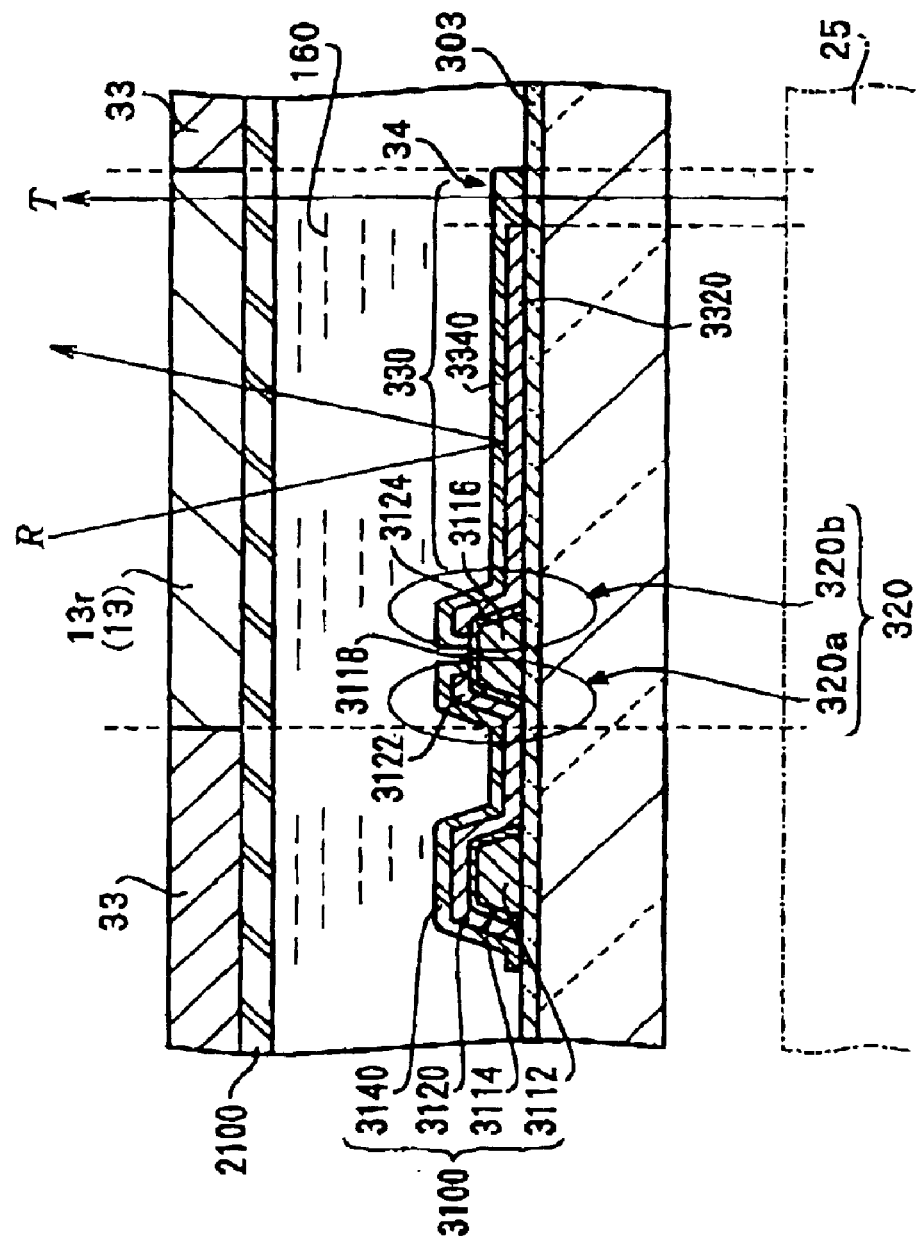
FIG. 24 is a sectional view taken along line II—II in FIG. 23.

FIG. 23 shows a planar structure of one pixel comprising a unit of three display dots corresponding to R, G and B colors in a liquid crystal panel of this embodiment. FIG. 24 shows a sectional structure taken along line II—II in FIG. 23. In the liquid crystal panel of this embodiment shown in FIG. 23, scanning lines 2100 are formed on a front substrate to extend in the X direction as the line direction, while data lines 3100, i.e., signal lines, are formed on a back substrate to extend in the Y direction as the column direction.

Furthermore, a plurality of rectangular pixel electrodes 330 are arranged in a matrix corresponding to the intersections of the scanning lines 2100 and the data lines 3100. Of the pixel electrodes 330, the pixel electrodes 330 arranged on the same line are connected to a common data line 3100 through TFDs 320. In this embodiment, the scanning lines 2100 and the data lines 3100 are driven by the driver IC 122 and the driver IC 124, respectively.

In this embodiment, the TFDs 320 are formed on the surface of the back substrate 300, and each have a first TFD 320a and a second TFD 320b. Also, the TFDs 320 are formed on the surface of the underlying film 303 having insulating and light transmitting properties, and each comprise a first metal film 3116 made of tantalum tungsten, or the like, an insulating film 3118 formed by anodizing the surface of the first metal film 3116, and second metal films 3122 and 3124 spaced on the surface of the insulating film 3118.

The second metal films 3122 and 3124 are reflective conductive films made of a silver alloy, and the second metal film 3122 constitutes a portion of each data line 3100, while the second metal film 3124 is a reflective conductive film 3320 constituting one pixel electrode 330.

In each of the TFDs 320, the first TFD 320a comprises the second metal film 3122, the insulating film 3118, and the first metal film 3116, which are formed in order from the data line 3100 side, to form a metal/insulator/metal structure, i.e., a MIM structure, thereby exhibiting a nonlinear current-voltage characteristic in both the positive and negative directions.

On the other hand, the second TFD 320b comprises the first metal film 3116, the insulating film 3118 and the second metal film 3124, which are formed in order from the data line side, thereby exhibiting a current-voltage characteristic opposite to the first TFD 320a. Therefore, each of the TFDs 320 has a shape in which two diode elements are connected in series opposite to each other, thereby symmetrizing the nonlinear current-voltage characteristics in both the positive and negative directions compared with the case where one element is used.

The reflective conductive films 3120 constituting parts of the data lines 3100, the second metal films 3122 and 3124, and the reflective conductive films 3320 of the pixel electrodes 330 are formed by patterning a same silver alloy layer. Therefore, in this embodiment, these films are coated with the transparent conductive films 3140 and 3340 made of ITO so as to be prevented from being exposed to the outside. On the other hand, each of the data lines 3100 comprises the metal film 3112, the insulating film 3114, the reflective conductive film 3120 and the transparent conductive film 3140, which are deposited in order from the underlying film 303.

In FIG. 23, a plurality of the pixel electrodes 330 arranged in the same column in the X direction are opposed to the scanning line 2100 on the same column. Like the common electrodes 210 of the embodiment shown in FIG. 12, the scanning lines 2100 are stripe transparent electrodes made of ITO. Therefore, the scanning lines 2100 function as counter electrodes for the pixel electrodes 330.

Therefore, the liquid crystal capacity of a display dot corresponding to a color comprises the scanning line 2100, the pixel electrode 330 and the liquid crystal 160 held therebetween at each of the intersections of the scanning lines 2100 and the data lines 3100.

In the liquid crystal panel of this embodiment having the above construction, when a selection voltage for turning on the TFDs 320 is applied to the scanning lines 2100, the TFDs 320 are at the intersections of the scanning lines 2100 and data lines 3100 are turned on regardless of the data voltage applied to the data lines 3100, and thus a charge corresponding to the difference between the selection voltage and the data voltage is stored in the liquid crystal capacities connected to the TFDs 320 turned on. Even when the TFDs 320 are turned off by applying a non-selection voltage to the scanning lines 2100 after the storage of charge, the storage of charge in the liquid crystal capacities is maintained.

Since the orientation state of the liquid crystal 160 changes according to the amount of the charge stored in the liquid crystal capacities, the quantity of light transmitted through the polarizer plate 121 (refer to FIGS. 11 and 20) also changes according to the amount of charge stored in either of the transmissive and reflective types. Therefore, the amount of the charge stored in the liquid crystal capacities can be controlled for each display dot by controlling the data voltage applied when the selection voltage is applied, thereby permitting a predetermined gray scale display.

Figure 25:
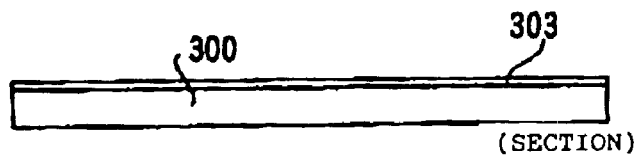
FIG. 25 is a drawing showing the steps of a method of producing the element structure shown in FIG. 24.
Figure 25:
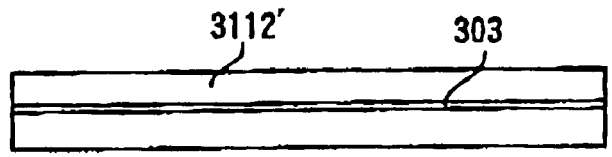
Figure 25:
Figure 25:
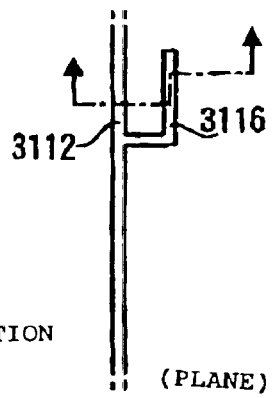
Figure 25:
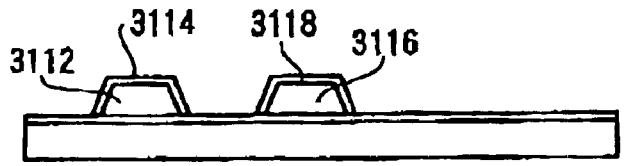
Figure 25:
Figure 25:
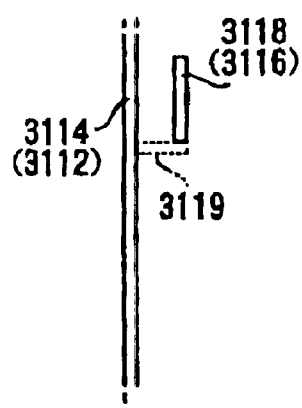
Figure 26:
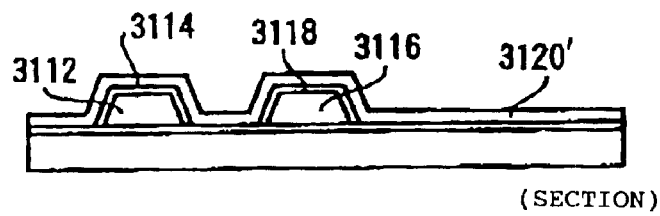
FIG. 26 is a drawing showing the steps after the steps shown in FIG. 25.
Figure 26:
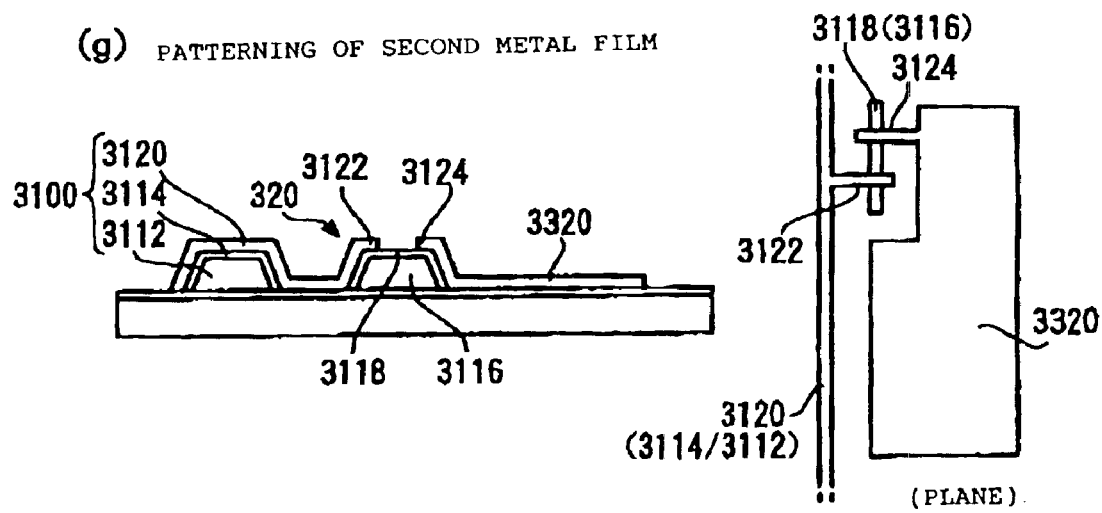
Figure 27:
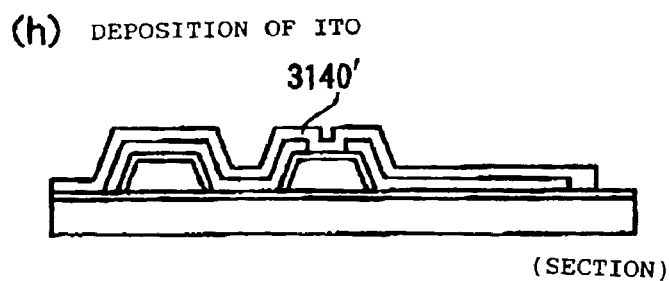
FIG. 27 is a drawing showing the steps after the steps shown in FIG. 26.
Figure 27:
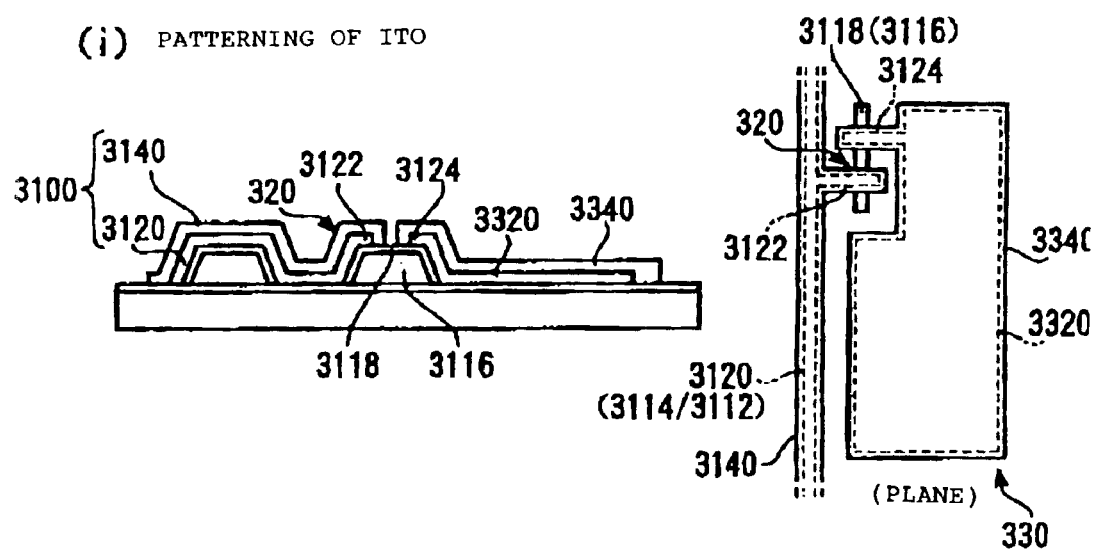

A description will now be made of the process for manufacturing the liquid crystal panel of this embodiment shown in FIG. 23, particularly, the process for manufacturing the TFDs 320 provided on the back substrate. FIGS. 25, 26 and 27 shows the manufacturing process.

First, as shown in FIG. 25(a), $Ta_2O_5$ or $SiO_2$ is deposited over the entire inner surface of the substrate 300 by sputtering or the like, and the tantalum (Ta) film deposited by sputtering is thermally oxidized to form the underlying film 303.

Then, as shown in FIG. 25(b), a first metal layer 3112' is deposited on the underlying film 303. The thickness of the first metal layer 3112' is an appropriate value selected according to application of the TFDs 320, and is generally about 100 to 500 nm. The composition of the first metal layer 3112' is made of, for example, a single tantalum material, or a tantalum alloy such as tantalum tungsten (TaW) or the like.

In use of the single tantalum material for the first metal layer 3112', the layer can be formed by sputtering, electron beam evaporation, or the like. In use of the tantalum alloy for the first metal layer 3112', the alloy contains tantalum as a main component, and tungsten or an element in the VI to VIII groups in the periodic table, for example, chromium, molybdenum, rhenium, yttrium, lanthanum, dysprosium, and the like.

As the additive element, as described above, tungsten is preferred, and the content of tungsten is preferably 0.1 to 6% by weight. In order to the first metal layer 3112' comprising the tantalum alloy, a sputtering method using a mixed target, a co-sputtering method, an electron beam evaporation method, or the like can be used.

Furthermore, as shown in FIG. 25(c), the conductive layer 3112' is patterned by photolithography and etching to form the metal films 3112 which constitute the bottom layers of the data lines 3100, and the first metal films 3116 branching from the metal films 3112.

Then, as shown in FIG. 25(d), the surfaces of the first metal films 3116 are oxidized by anodization to form insulating films 3118. At the same time, the surfaces of the metal films 3112 constituting the bottom layers of the data lines 3100 are also oxidized to form insulating films 3114.

The thickness of the insulating films 3118 is appropriately selected according to application, and in this embodiment, the thickness is, for example, about 10 to 35 nm.

In this embodiment, each of the TFDs 320 comprises the two TFDs including the first TFD 210a and the second TFD 320b, and thus the thickness of the insulating film 3118 is about half the thickness in the case in which one TFD is used for one display dot. Although the chemical conversion solution used for anodization is not limited, for example, a citric acid aqueous solution of 0.01 to 0.1% by weight can be used.

Next, as shown in FIG. 25(e), of the insulating films 3118 branching from the bases of the data lines 3100, i.e., the metal films 3112 coated with the insulating films 3114, the portions 3119 shown by broken lines are removed together with the first metal layers 3116 serving as the bases thereof. As a result, the first metal films 3116 used in common to the first TFDs 310a and the second TFDs 320b are electrically separated from the data lines 3100. In order to remove the portions 3119 shown by broken line, generally used photolithography and etching are used.

Then, as shown in FIG. 25(f), a reflective conductive layer 3120' comprising a single silver material or silver as a main component is deposited by sputtering or the like. For the conductive layer 3210', the same material as the conductive layer 312' in the embodiment shown in FIG. 22 can be used.

Furthermore, as shown in FIG. 26(g), the conductive layer 3120' is patterned by photolithography and etching techniques to form the reflective conductive films 3120 in the data lines 3100, the second metal films 3122 and 3124 of the TFDs 320, and the reflective conductive films 3320 in the pixel electrodes 330.

The second metal films 3122 of the TFDs 320 are respectively portions branching from the reflective conductive films 3120, and the second metal films 3124 are respectively portions projecting from the reflective conductive films 3320 of the pixel electrodes 330. In pattering the conductive layer 3120', the reflective conductive films 352, 362 and 372 (refer to FIG. 13) of wiring are also simultaneously formed. In this embodiment, the reflective conductive films 3120 are used as the reflective conductive films 312 in the embodiment shown in FIG. 11.

These reflective conductive films are formed to avoid the portions where wiring is connected to the drivers ICs and the FPC board, etc. This is the same as the embodiment shown in FIG. 11.

Next, as shown in FIG. 27(h), a conductive layer 3140' of ITO having transparency is deposited by sputtering. Then, as shown in FIG. 27(i), the conductive layer 3140' is patterned by photolithography and etching to form the transparent conductive films 3140 so as to completely cover the reflective conductive films 3120 and the second metal films 3122 made of a silver alloy or the like. Similarly, the transparent conductive films 3340 are formed to completely cover the reflective conductive films 3320 and the second metal films 3124.

In patterning the conductive layer 3140', the transparent conductive films 354, 364 and 374 of wiring are also formed to completely cover the reflective conductive films 352, 362 and 372, respectively.

Figure 22:
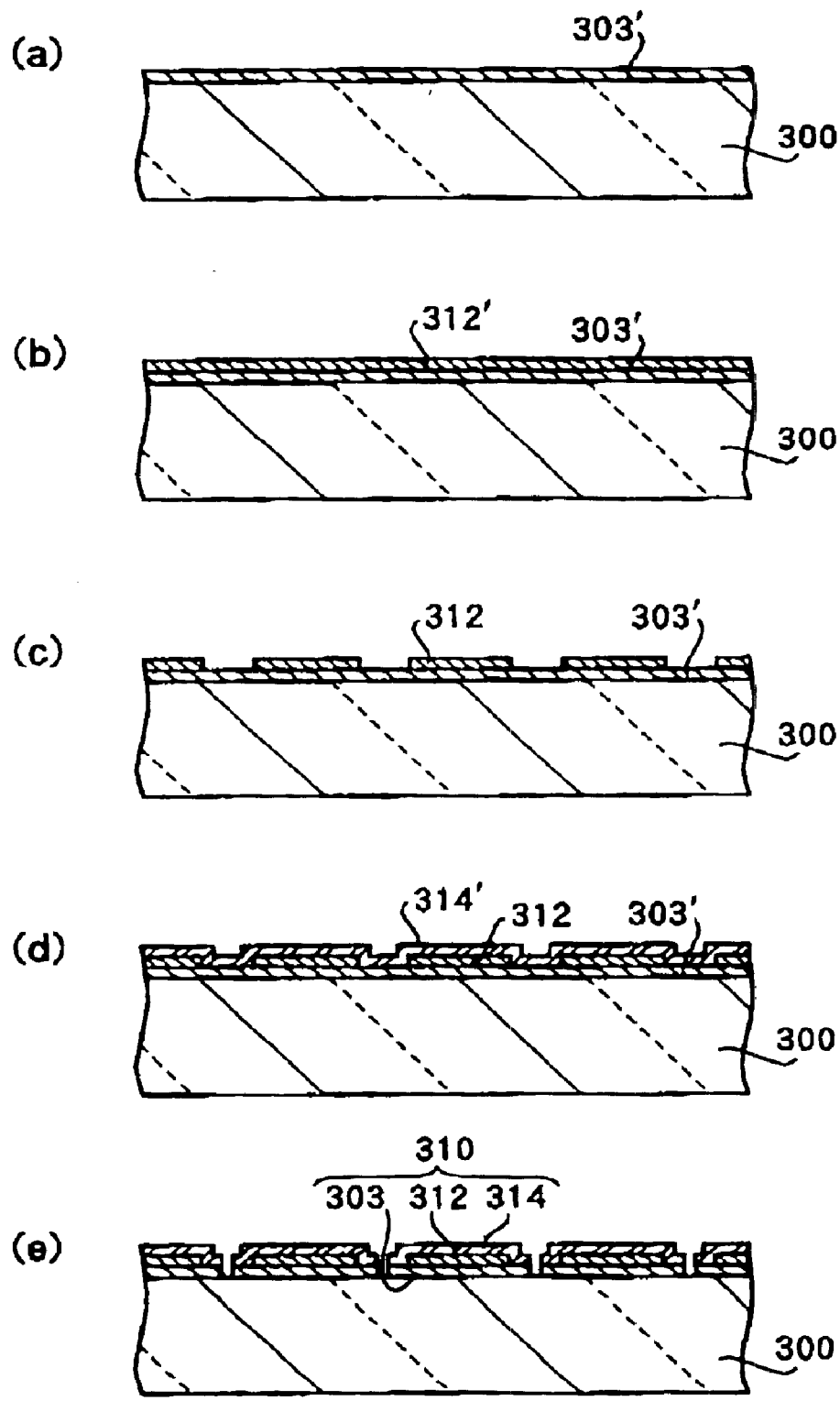
FIG. 22 is a drawing showing the steps of a method of manufacturing the liquid crystal device shown in FIG. 20 according to an embodiment.

The subsequent manufacturing processes are the same as the embodiments shown in FIGS. 15 and 22. Namely, the protecting film 307 and the alignment film 308 shown in FIG. 11 are formed in turn, and the alignment film 308 is rubbed. Then, the back substrate 300 and the front substrate 200 with the alignment film 208 rubbed are aligned and bonded with each other with the sealing material 110 containing the conductive particles 114 appropriately dispersed therein, and then the liquid crystal 160 is added dropwise to the opening of the sealing material 110 in a near vacuum state. Then, the vacuum state is returned to the atmospheric pressure, and the opening is sealed with the sealant 112. Furthermore, the driver ICs 122 and 124, and the FPC board 150 are amounted to form the same liquid crystal panel 100 as the liquid crystal device 90 shown in FIG. 10.

In this embodiment, as described above, the second metal films 3122 and 3124 of the TFDs 320, and the reflective conductive films 3120 of the data lines 3100 are formed by using the same layer as the reflective conductive films 3320, and thus the manufacturing process is not so much complicated. The data lines 3100 comprise the reflective conductive films 3120 having low resistance, thereby decreasing the resistance of wiring.

Although, in this embodiment, the second metal films 3122 and 3124, and the reflective conductive films 3120 and 3320 are made of a silver alloy or the like, these films are covered with the transparent conductive films 3140 and 3340 of ITO without being exposed to the outside, like the reflective conductive films 352, 362 and 372 of the wirings 350, 360 and 370. Therefore, corrosion and peeling can be prevented, thereby permitting an improvement in reliability of the liquid crystal device.

In this embodiment, each of the TFDs 320 comprises the first TFD 320*a* and the second TFD 320*b* which are opposed to each other so that the current-voltage characteristics are symmetric in the positive and negative directions. However, if the symmetry of the current-voltage characteristic is not greatly required, of course, only one TFD may be used.

In this embodiment, the TFDs 320 is an example of two-terminal switching elements. Therefore, a single element comprising a ZnO (zinc oxide) varistor, MSI (metal Semi-Insulator) or the like, a two-terminal switching element comprising two elements connected opposite to each other in series or in parallel can be used as an active element. Besides these two-terminal elements, a TFT (Thin Film Transistor) element may be provided for driving, and wiring to the elements is partially or wholly formed by using the same conductive layer as the reflecting pattern.

In FIGS. 23 and 24, the transparent conductive film 3340 provided on each of the reflective conductive films 3320 is formed to be wider than the reflective conductive film 3320, and thus the edge portions 34 of the transparent conductive films 3340 extrude outward from the reflective conductive films 3320. Therefore, the bottoms of the edge portions 34 are in contact with the underlying film 303, as shown in FIG. 24. In this embodiment, as shown by arrow R in FIG. 24, the reflective conductive films 3320 provide a light reflecting region at the time of the reflective display. When a transparent display is performed using the light from the back light 25, as shown by arrow T in FIG. 24, the edge portions 34 act as a light transmitting region to lead the light to the liquid crystal 160.

As shown in FIG. 23, the edge portions 34 of the transparent conductive films 3340 are circularly provided in the rectangular region of one display dot divided by the black mask along both the longitudinal and transverse directions of the black mask 33. Therefore, even when a positional deviation between the reflective conductive films 3320 and the black mask 33 occurs in the longitudinal and/or transverse direction due to a production error or another cause, no change occurs in the ratio of the light reflecting area to the light transmitting area within one display dot.

Therefore, in this embodiment, even when the display system of the liquid crystal device is changed between the reflective type and the transmissive type, a change in display quality can be prevented.

In the embodiment shown in FIG. 11, conduction between the common electrodes 210 and the wiring 350 is achieved by the conductive particles 114 mixed in the sealing material 110. However, conduction may be achieved in a region separately provided outside the frame of the sealing material 110.

Also, in FIG. 11, the common electrodes 210 have a relative relation to the segment electrodes 310, and in FIG. 23, the scanning lines 2100 have a relative relation to the data lines 3100. Therefore, the segment electrodes 310 may be formed on the front substrate 200, and the common electrodes 210 may be formed on the back substrate 300; the data lines 3100 may be formed on the front substrate 200, and the scanning lines 2100 may be formed on the back substrate 300.

Although a liquid crystal device performing a color display by using a color filter has been described above as an example, the present invention can be applied to a liquid crystal device performing a monochrome display without using a color filter.

Although each of the above embodiments uses a TN type liquid crystal, a bi-stable type having a memory ability, such as a BNT (Bi-stable Twisted Nematic) type, a ferroelectric type, or the like, a polymer dispersion type, a GH (GuestHost) type in which a dye (i.e., a guest) having anisotropy of visible light absorption in the long axis direction and the short axis direction of a molecule is dissolved in a liquid crystal (i.e., a host) having a predetermined molecular orientation, and the dye molecules are arranged in parallel with the liquid crystal molecules, etc. may be used as the liquid crystal.

Also, the present invention can be applied to a vertical orientation (i.e., a homeotropic orientation) in which with no voltage applied, liquid crystal molecules are arranged perpendicularly to both substrates, while with the voltage applied, the liquid crystal molecules are arranged in the horizontal direction of both substrates, and a parallel or horizontal orientation, i.e., a homogeneous orientation, in which with no voltage applied, liquid crystal molecules are arranged in the horizontal direction of both substrates, while with the voltage applied, the liquid crystal molecules are arranged perpendicularly to both substrates. In this way, the present invention can be applied to various systems of liquid crystals and orientation systems.

Figure 28:
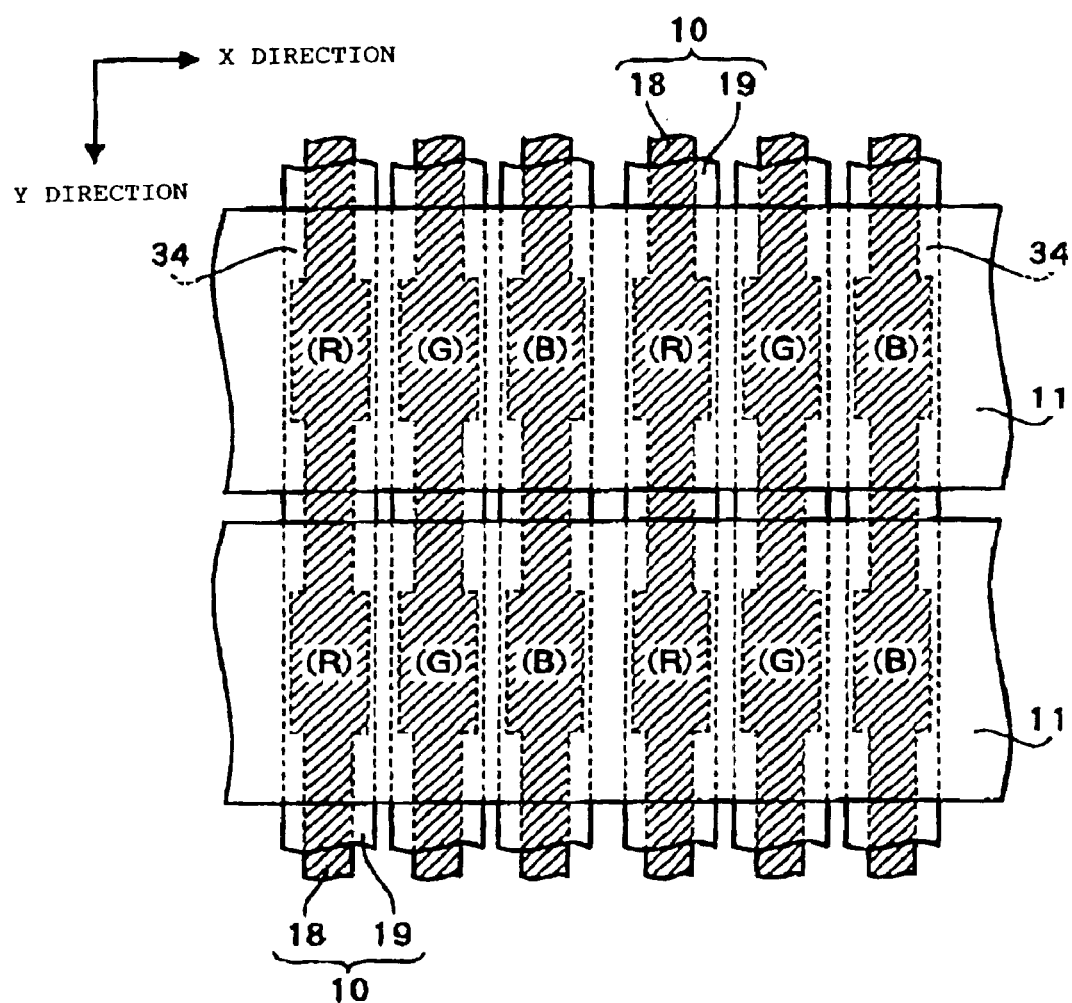
FIG. 28 is a plan view showing the planar structure of a principal portion of a liquid crystal device according to a further embodiment of the present invention.

FIG. 28 shows a principal portion of a liquid crystal device according to a further embodiment of the present invention. The liquid crystal shown in this figure is a simple matrix liquid crystal device. FIG. 28 shows the planar structure of the crossing portions of electrodes opposed to each other with a liquid crystal provided therebetween, i.e., display dots.

In FIG. 28, a plurality of common electrodes 11 are provided on the front side of the drawing to be arranged in the Y direction and extend in the X direction. Also, a plurality of segment electrodes 10 are provided on the back side of the drawing to be arranged in the X direction and extend in the Y direction. Each of the segment electrodes 10 comprises an APC film 18 serving as a reflective conductive film, and an ITO film 19 laminated as a metal oxide film on the APC film 18. The ITO film 19 covers all the upper and side surfaces of the APC film 18. The edge portions of the ITO films 19, in which the APC films 18 are absent, constitute light transmitting regions which transmit light to introduce it into the liquid crystal.

The whole structure of the liquid crystal device of this embodiment having the electrode structure shown in FIG. 28 is the same as the liquid crystal device 1 shown in FIG. 2, and the common electrodes 11 and the segment electrodes 10 shown in FIG. 28 are formed at the same positions by using the same material as those denoted by the same reference numerals in FIG. 2.

The crossing portions of the common electrodes 11 and the segment electrodes 10 respectively form display dots, and one of colorant layers 13r, 13g and 13b of the color filter 13 (refer to FIG. 2) is provided in correspondence with one display dot. In FIG. 28, red colorant layers, green colorant layers and blue colorant layers are denoted by "R", "G" and "B", respectively. In the color filer shown in FIG. 28, the color arrangement is a stripe arrangement, but other arrangements, for example, a delta arrangement, a mosaic arrangement, and the like can be used according to demand.

Figure 29:
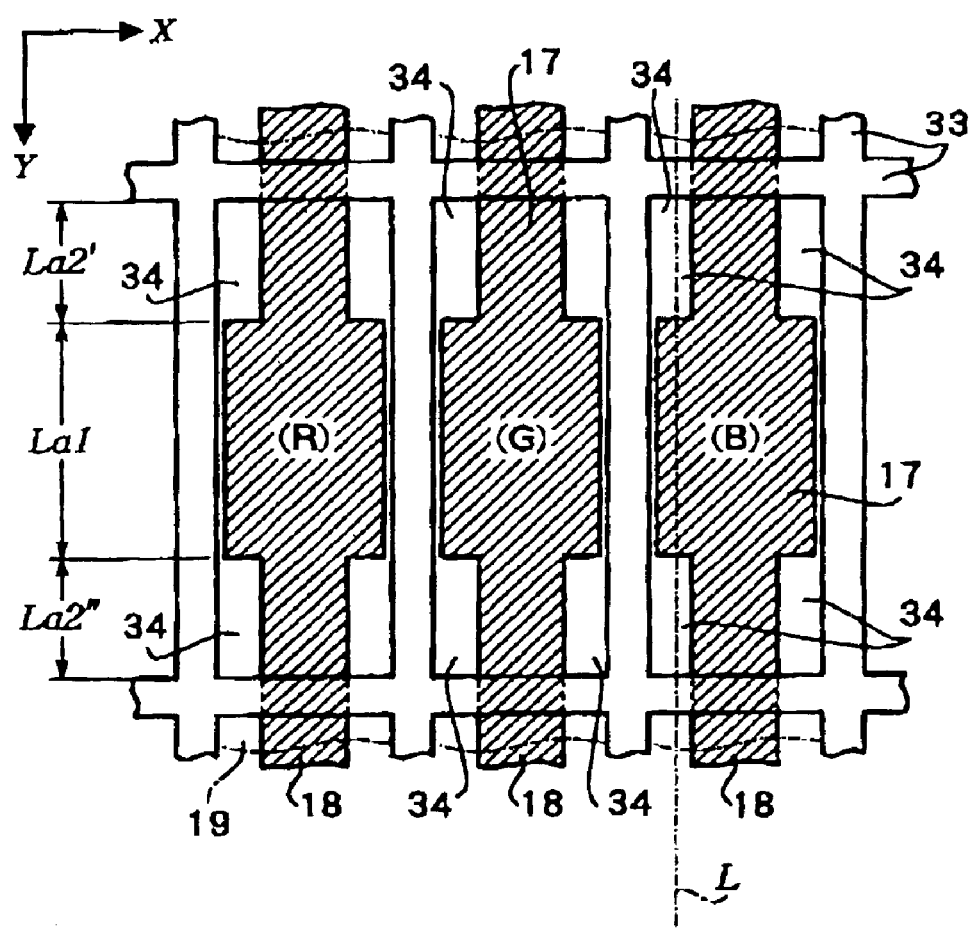
FIG. 29 is an enlarged partial plan view showing other components not shown in FIG. 28.

The display dots as minimum display units are possibly areas surrounded by the black mask 33 shown in FIG. 2. In this embodiment, as shown in FIG. 29, rectangular display dots are divided by the black mask 33, the APC film 18 being arranged in each of the display dots. FIG. 29 shows only the positional relation between the APC film 18 and the black mask 33, and the other optical components are not shown in the drawing.

As shown in FIG. 29, the APC film 18 is formed to a part of each of the display dots. As a result, the region where the APC film 18 is formed corresponding to a portion of each display dot, i.e., the light reflecting region 17, functions as a region for reflecting light incident on the upper substrate 3 (refer to FIG. 2) to perform a reflective display.

The regions other than the light reflecting regions 17 of the display dots, i.e., the regions other than the regions covered with the APC films 18, or the regions corresponding to the edge portions 34 of the ITO films 19, function as regions for transmitting light emitted from the illumination device 25 (refer to FIG. 2) as the back light and incident on the lower substrate 2 to perform a transmissive display, i.e., the light transmitting regions.

In this embodiment, the shape of the APC films 18 is determined so that the light reflecting regions 17 and the light transmitting regions 34 are adjacent to each other along the four sides which define the region corresponding to each of the display dots, i.e., the four sides which define each aperture region of the black mask 33.

For example, in FIG. 29, the APC film 18 positioned at substantially the center of each of the display dots is formed to be wide in the transverse direction so that the light transmitting region 34, the light reflecting region 17 and the light transmitting region 34 are adjacent to each other in that order in the direction from one end of each of the four sides of each display dot to the other end along the one side.

In other words, when a line L parallel to one of the sides of each display dot is assumed adjacent to the one side within the display dot, the line L passes through both the light reflecting region 17 and the light transmitting region 34.

In this embodiment, the shape of the APC films 18 is set so that the light reflecting region 17 and the light transmitting regions 34 adjacent along one of the sides of each display dot have substantially the same length along the one side. Specifically, the length La1 of the light reflecting region 17 along one side of each display dot in the Y direction is substantially the same as the length La2 (=La2'+La2") of the light transmitting regions 34 along the one side.

As described above, in this embodiment, the light reflecting region 17 and the light transmitting region 34 are adjacent to each other along the periphery of each of the display dots, and thus a variation in the area ratio of the light reflecting region 17 to the light transmitting region 34 in each display dot can be prevented from occurring due to a manufacturing error, as described below.

Figure 30:
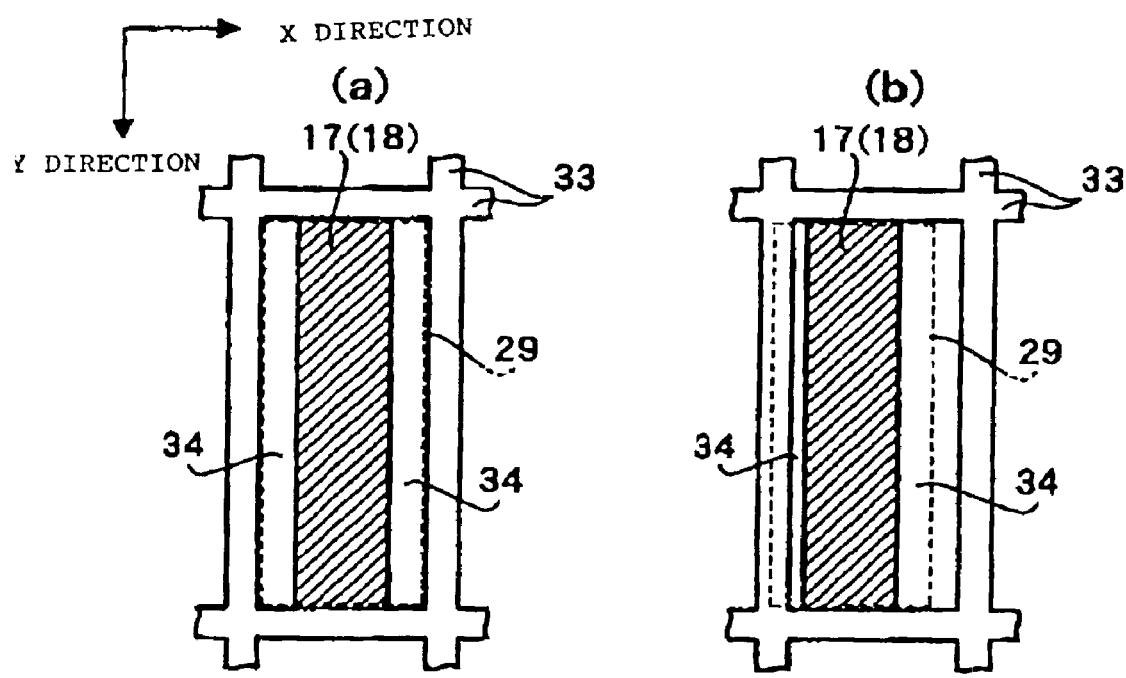
FIG. 30 is a plan view illustrating a technique related to the technique shown in FIG. 29.

Namely, an example of a conceivable construction for providing the light reflecting region and the light transmitting region in one display dot is the construction shown in FIG. 30. Namely, the light transmitting regions 34 are provided along the two sides of the display dot, which extend in the Y direction, while the light reflecting region 17 is provided to be held between the light transmitting regions 34. In FIG. 30, in design, a region functioning as a display dot is a region 29 surrounded by broken lines.

Namely, the regions 29 are designed as regions where the common electrodes 11 and the segment electrodes 10 (refer to FIG. 2) are respectively opposed to each other. Of course, the common electrodes 11, the APC films 18 and the segment electrodes 10 are obtained with high precision by photolithography and etching, and thus the regions 29 can be considered as the regions where the common electrodes 11 and the segment electrodes 10 are actually respectively opposed to each other.

In the process for manufacturing the liquid crystal, the step of aligning the lower substrate 2 having the APC films 18 formed thereon to the upper substrate 3 having the black mask 33 formed thereon as shown in FIG. 2 is considered. In this step, both substrates are generally aligned to each other while being relatively positioned. At this time, for example, if the relative positions of both substrate are deviated in the X direction due to the manufacturing technology or the like, the light transmitting region 34, more specifically, the left light transmitting region 34 shown in FIG. 30, of each of the regions 29 functioning as a display dot is covered with the black mask 33, as shown in FIG. 30(b).

Therefore, the light transmitting region 34 of each of the regions 29 functioning as a display dot cannot contribute to a display. Namely, the area of the light transmitting region of 34 of a display dot is decreased, as compared with a case in which the black mask 33 is appropriately arranged, i.e., the case shown in FIG. 30(a). On the other hand, even when such a positional deviation occurs in the substrates, the light reflecting regions 17 are not covered with the black mask 33. In other words, the area of the light reflecting region of each display dot is the same as the case shown in FIG. 30(a). In the construction shown in FIG. 30, the area of the light transmitting region 34 is decreased due to an error in alignment of both substrates, while the area of the light reflecting area 17 is constant. Therefore, the brightness of the transmissive display is decreased as compared with the reflective display, and brightness changes according to the display systems.

Figure 31:
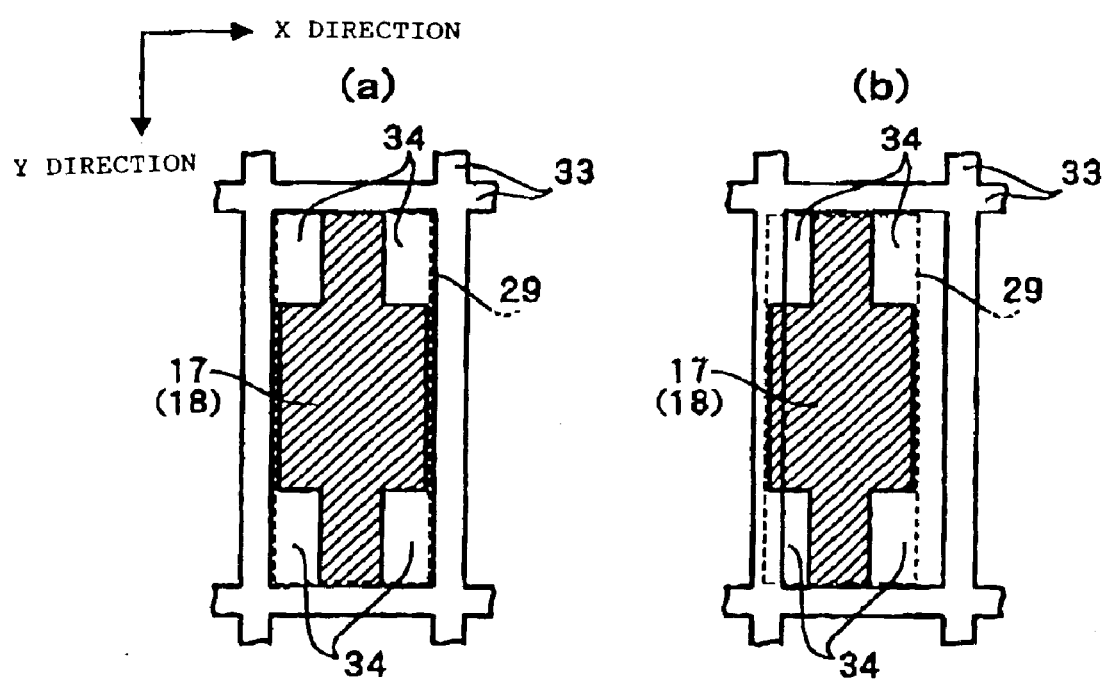
FIG. 31 is a plan view illustrating the function of the technique shown in FIG. 29.

However, in this embodiment, the light reflecting region 17 and the light transmitting region 34 are adjacent to each other along each of a plurality of sides of one display dot. Therefore, when the relative positions of the upper substrate 3 (refer to FIG. 2) and the lower substrate 2 are deviated from the proper positions shown in FIG. 31(a), i.e., the design positions, in the X direction, the areas of both the light transmitting region 34 and the light reflecting region 17 are decreased, as shown in FIG. 31(b). Namely, in this embodiment, even when the relative positions of the APC films 18 and the black mask 33 are deviated, it is possible to avoid a decrease in area of only one of the light transmitting region 34 and the light reflecting region 17, thereby preventing the occurrence of a difference in display quality between the transmissive and the reflective displays.

Furthermore, in this embodiment, the light reflecting region 17 and the light transmitting regions 34 adjacent along one of the sides of each display dot have substantially the same length along the one side. Therefore, when the relative positions of the APC films 18 and the black mask 33 are deviated, the areas of the light reflecting region 17 and the light transmitting regions 34 are decreased in substantially the same amount. Therefore, in this embodiment, it is possible to securely prevent the occurrence of a difference in display quality between the transmissive and the reflective displays.

Figure 32:
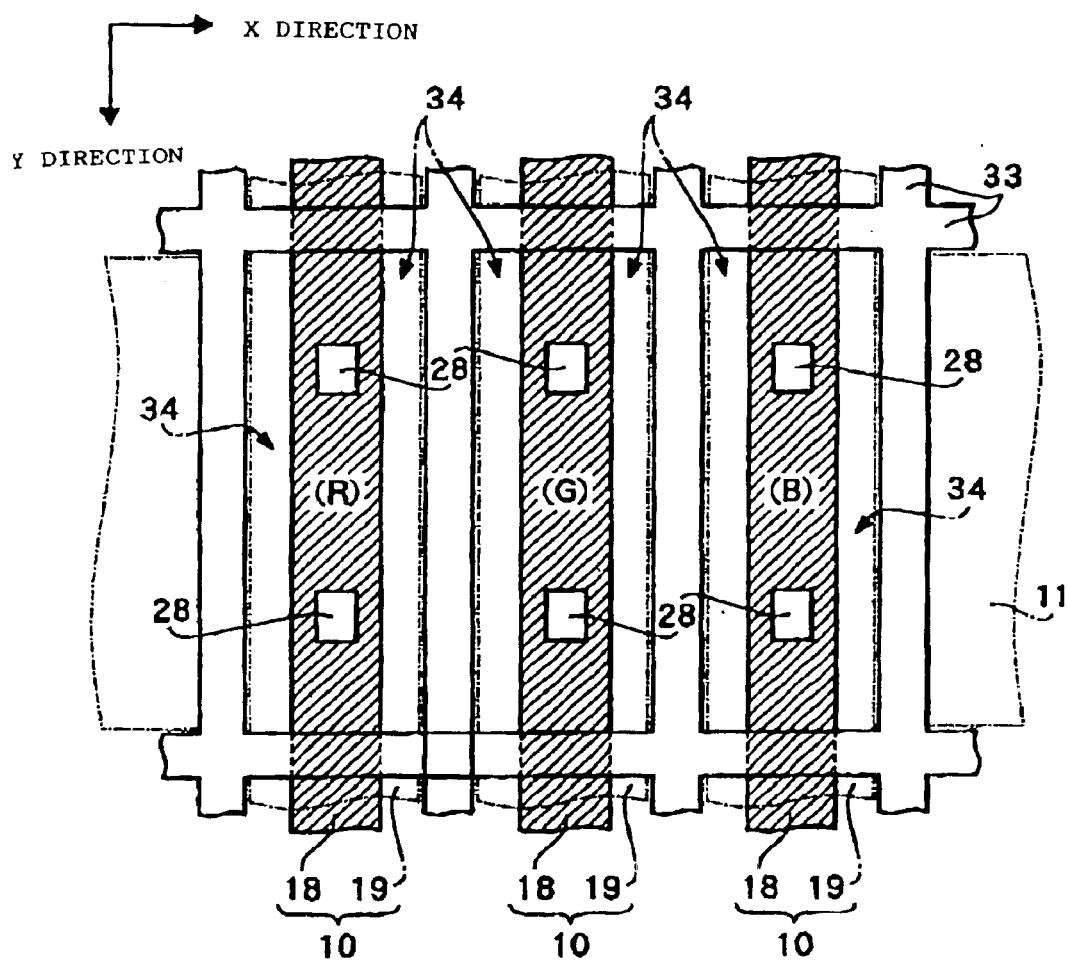
FIG. 32 is a plan view showing the planar structure of a principal portion of a liquid crystal device according to a further embodiment of the present invention.

FIG. 32 shows a principal portion of a liquid crystal device according to a further embodiment of the present invention. The liquid crystal device shown in this figure is a simple matrix liquid crystal device. FIG. 32 shows the planar structure of the crossing portions of common electrodes 11 and segment electrodes 10 opposed to each other with a liquid crystal held therebetween, i.e., display dot portions.

In this embodiment, an ITO film 19 serving as a metal oxide film, which covers an APC film 18 serving as a reflective conductive film, is formed to be wider than the APC film 18, and the edge portions 34 of the ITO film 19 are provided to cover the entire sides of the APC film 18. In this embodiment, the edge portions 34 are formed, on both sides of the APC film 18, as a rectangular region extending in parallel with the Y direction of the black mask 33.

When the liquid crystal device of this embodiment is used for a transmissive display, the edge portions 34 of the ITO films 19 function as light transmitting regions for transmitting light to introduce the light to a liquid crystal. In this embodiment, even when the position of the APC films 18 is deviated relative to the black mask 33, the APC films 18 are not superposed on the black mask 33 as long as the positional deviation is less than the width dimension of the edge portions 34. Therefore, even when the position of the APC films 18 is deviated, the areas of both the light reflecting regions and the light transmitting regions are less changed, thereby causing less difference in display quality between the reflective and the transmissive displays.

In this embodiment, unlike in the embodiment shown in FIG. 29, light transmission apertures 28 are formed in the APC films 18. This permits supply of a large quantity of light to the liquid crystal in the transmissive display. Therefore, when a bright display is desired in the transmissive display, the apertures 28 are preferably provided.

Figure 33:
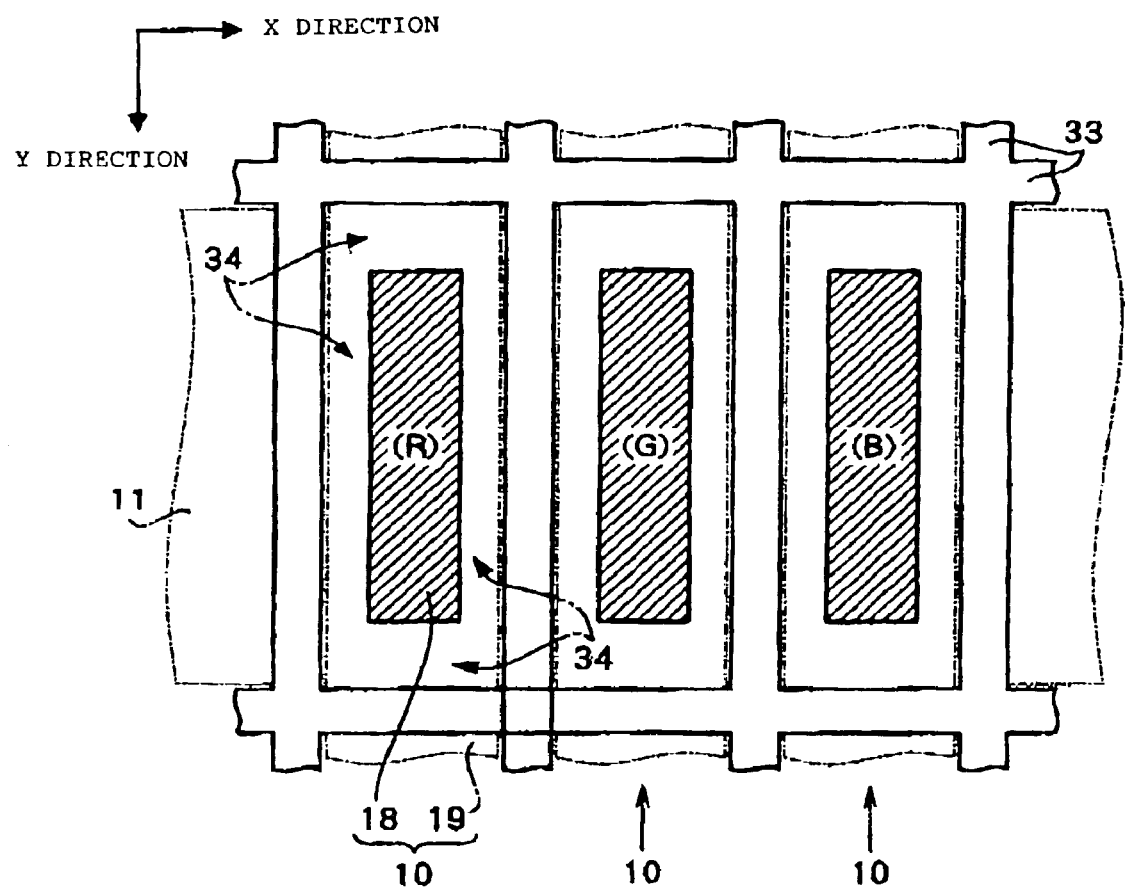
FIG. 33 is a plan view showing the planar structure of a principal portion of a liquid crystal device according to a further embodiment of the present invention.

FIG. 33 shows a principal portion of a liquid crystal device according to a further embodiment of the present invention. The liquid crystal device shown in this figure is a simple matrix liquid crystal device. FIG. 33 shows the planar structure of the crossing portions of common electrodes 11 and segment electrodes 10 opposed to each other with a liquid crystal held therebetween, i.e., display dot portions.

In this embodiment, an ITO film 19 serving as a metal oxide film, which covers an APC film 18 serving as a reflective conductive film, is formed to be wider than the APC film 18 in both the X and Y directions, and the edge portions 34 of the ITO film 19 are provided to cover the entire sides of the APC film 18. In this embodiment, the edge portions 34 are formed in a circular shape, i.e., a frame-like shape, around the APC film 18 inside of the black mask 33 in each of the display dots.

When the liquid crystal device of this embodiment is used for a transmissive display, the edge portions 34 of the ITO films 19 function as light transmitting regions for transmitting light to introduce the light to a liquid crystal. In this embodiment, even when the position of the APC films 18 is deviated relative to the black mask 33, the APC films 18 are not superposed on the black mask 33 as long as the positional deviation is less than the width dimension of the edge portions 34. Therefore, even when the position of the APC films 18 is deviated in both the X and Y directions, the areas of both the light reflecting regions and the light transmitting regions are less changed, thereby causing less difference in display quality between the reflective and the transmissive displays.

Figure 34:
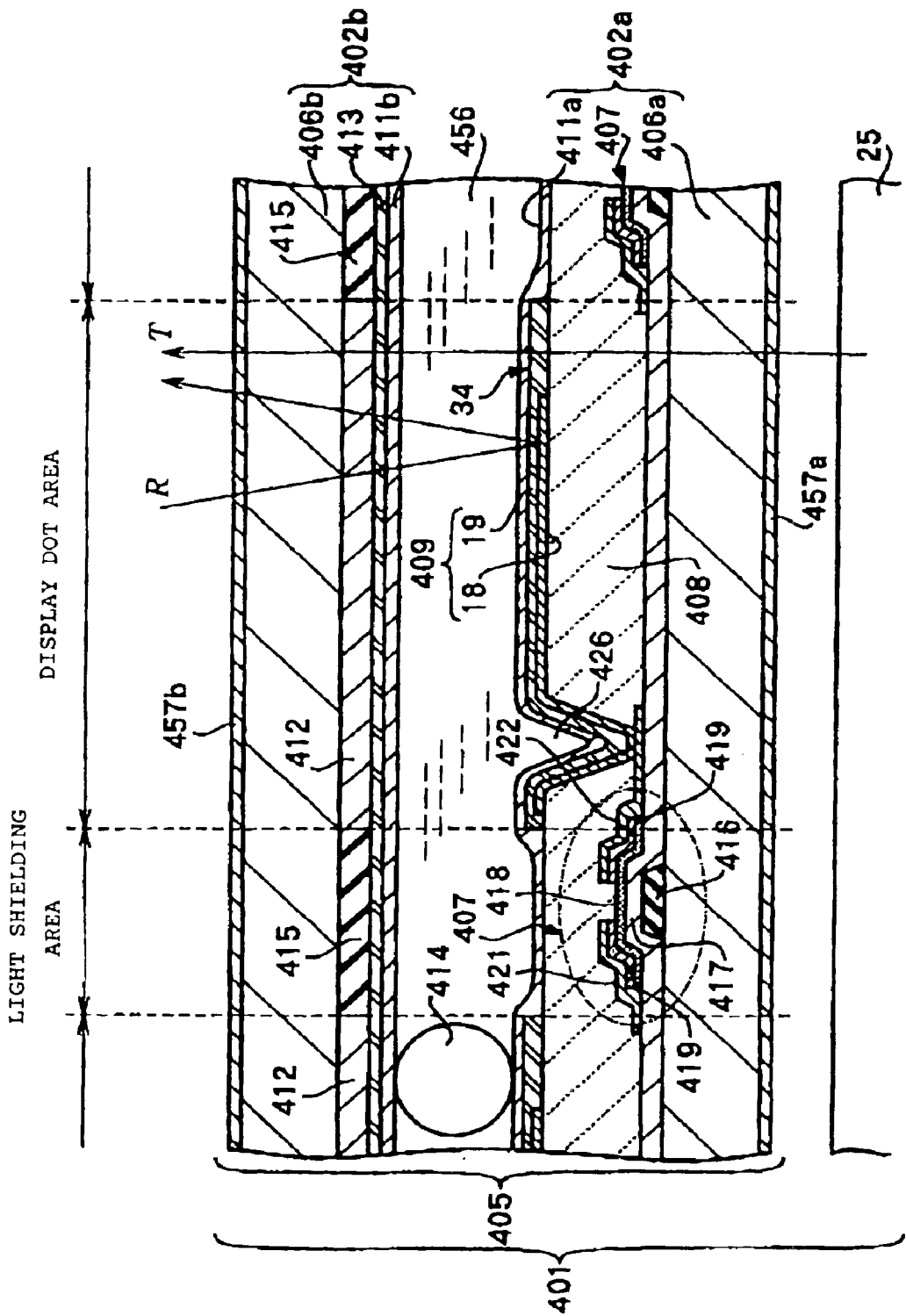
FIG. 34 is a sectional view showing the sectional structure of a principal portion of a liquid crystal device according to a further embodiment of the present invention.
Figure 35:
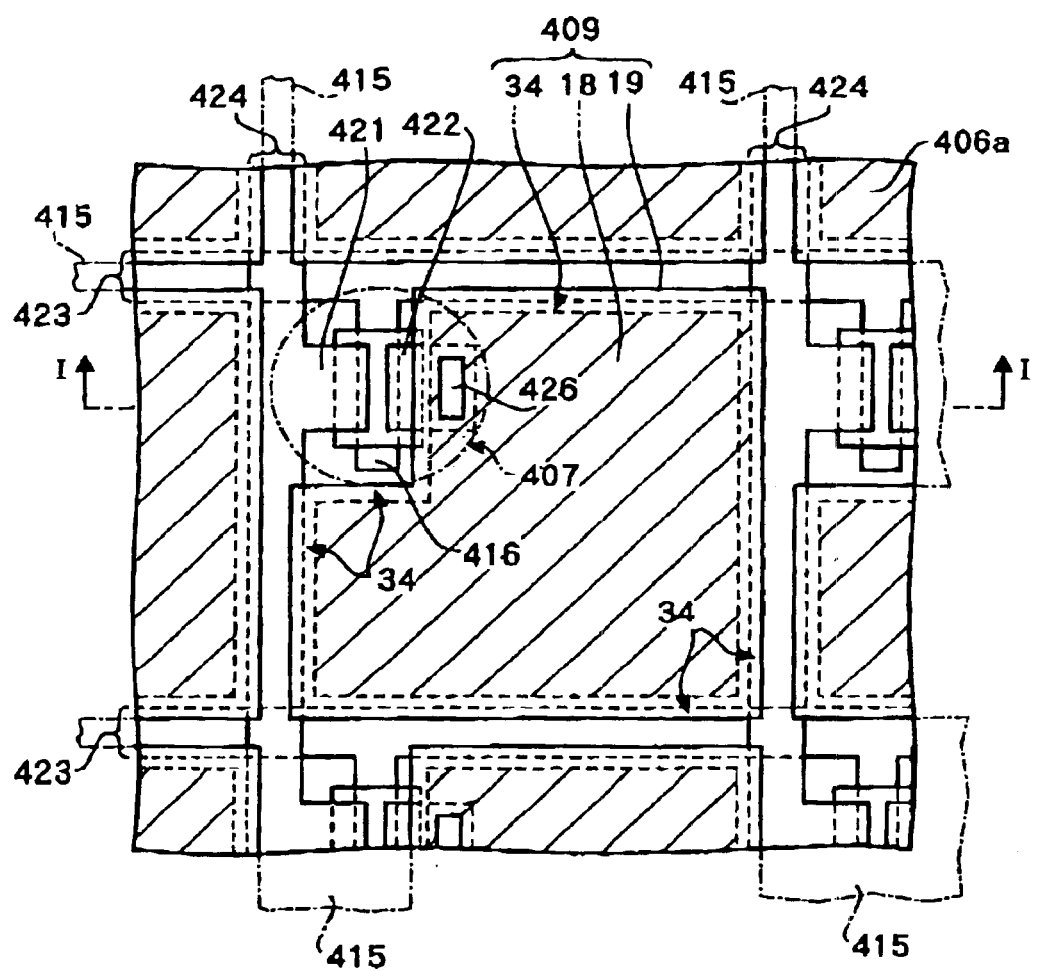
FIG. 35 is a plan view showing the structure shown in FIG. 34.
Figure 36:
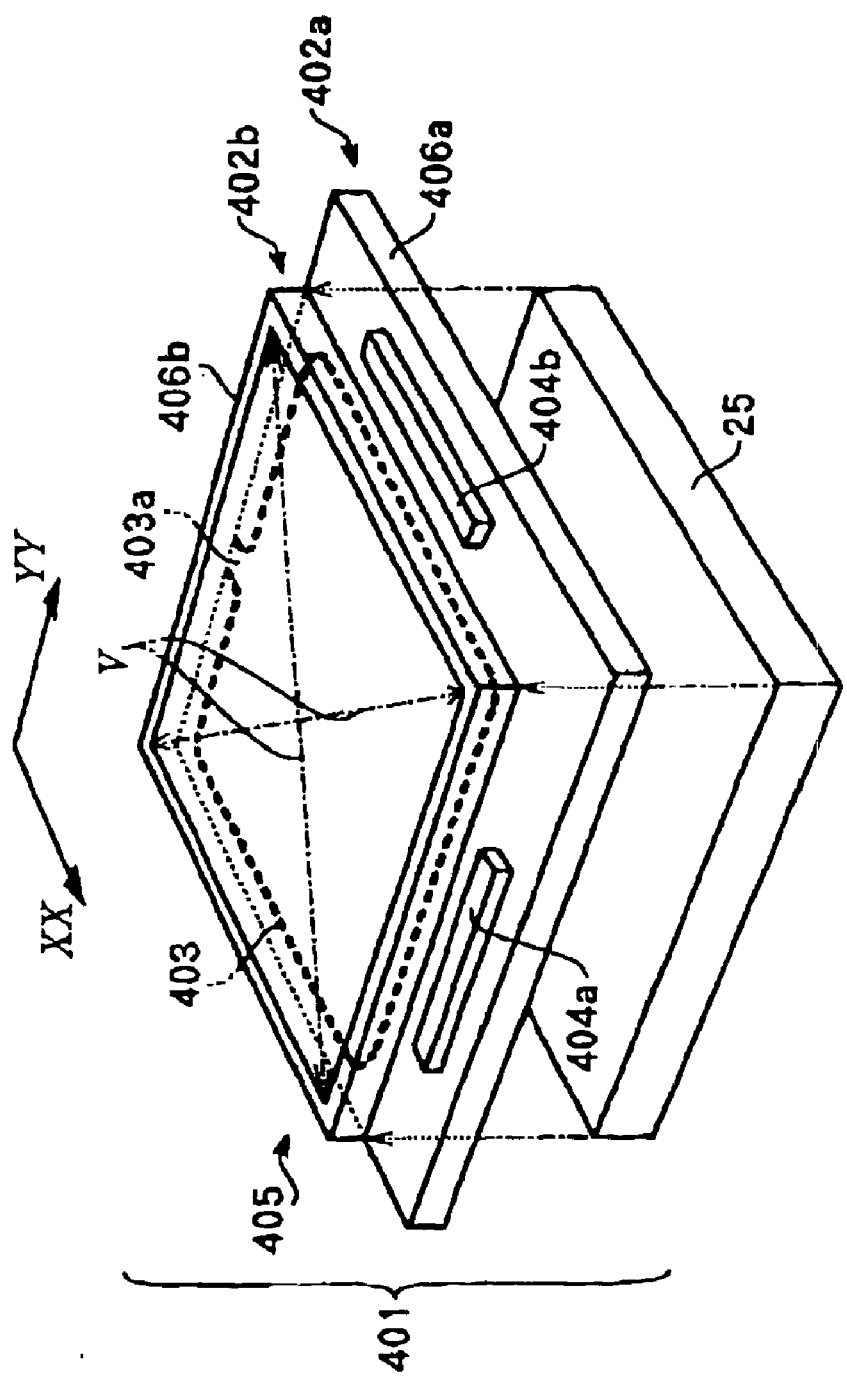
FIG. 36 is a perspective view showing the whole appearance of a liquid crystal device having the sectional structure shown in FIG. 34.

FIGS. 34 and 35 show a principal portion of a liquid crystal device according to a further embodiment of the present invention, and particularly show an enlarged display dot portion. The whole structure of the liquid crystal device can be set, for example, as shown in FIG. 36. In consideration of a full-color display having the three primary colors of R (red), G (green) and B (blue), the display dot shown in FIGS. 34 and 35 corresponds to each of the three primary colors, and a unit of the three display dots forms one pixel. In consideration of a monochrome display, one display dot corresponds to one pixel.

The liquid crystal device of this embodiment is an active matrix system transflective liquid crystal device using three-terminal active elements TFTs as active elements, and a COG (Chip On Glass) system liquid crystal device in which driver ICs are mounted directly on a substrate.

In FIG. 36, a liquid crystal device 401 comprises a liquid crystal panel 405, driver ICs 404a and 404b mounted thereon, and a back light 25 provided as an illumination device. The back light 25 is provided on the outer side of a first substrate unit 402a opposite to the observation side.

The liquid crystal panel 405 comprises the first substrate unit 402a and a second substrate unit 402b, which are aligned and bonded to each other with a circular sealing material 403 provided in the peripheries of both substrate units, and a liquid crystal 456 sealed in a gap between the first substrate unit 402a and the second substrate unit 402b, i.e., a cell gap.

In FIG. 36, a plurality of dot pixel electrodes are arranged in the line direction XX and column direction YY of a matrix within the region surrounded by the sealing material 403 of the first substrate unit 402a. Also, an unpatterned plane electrode is formed within the region surrounded by the sealing material 403 of the second substrate 402b so as to be arranged opposite to the plurality of pixel electrodes formed on the first substrate 402a.

The portion where the liquid crystal is held between one of the pixel electrodes on the first substrate 402a and the plane electrode on the second substrate 402b forms one display dot, and a plurality of the display dots are arranged in a dot matrix within the region surrounded by the sealing material 403 to form a display area V. The driver ICs 404a and 404b selectively apply a scanning signal and a data signal between the opposite electrodes which form a plurality of the display dots, to control the orientation of the liquid crystal for each display dot. By controlling the orientation of the liquid crystal; light transmitted through the liquid crystal is modulated to display an image such as a character, a numerical character, or the like in the display area V.

FIG. 34 is an enlarged view of the sectional structure of one of the plurality of display dots which constitute the display area V of the liquid crystal device 401. FIG. 35 shows the planar structure of the display dot shown in FIG. 34. FIG. 34 shows the sectional structure of the display dot taken along line I—I in FIG. 35.

In FIG. 34, the first substrate unit 402a comprises a first substrate 406a made of glass, plastic, or the like. Furthermore, active elements TFTs (Thin Film Transistor) 407 are formed as switching elements on the liquid crystal-side surface of the first substrate 406a, an organic insulating film 408 is formed on the TFTs 407, pixel electrodes 409 are formed on the organic insulating film 408, and an alignment film 411a is formed on the pixel electrodes 409. The alignment film 411a is subjected to rubbing as alignment treatment before the first substrate unit 402a and the second substrate unit 402b are aligned and bonded with each other. A polarizer plate 457a is mounted on the outer surface of the first substrate 406a by bonding.

Each of the pixel electrodes 409 has a laminated structure comprising a reflective conductive film 18 formed on the organic insulating film 408, and a metal oxide film 19 laminated thereon. The reflective conductive film 18 is made of, for example, a single silver material or an alloy composed of silver as a main component, for example, an APC alloy. The metal oxide film 19 is made of, for example, ITO. The metal oxide film 19 is wider than the reflective conductive film 18, and the edge portions 34 project outward from the periphery of the reflective conductive film 18. The edge portions 34 are formed along the entire outer periphery of the reflective conductive film 18, as shown in FIG. 35.

In FIG. 34, the second substrate unit 402b opposed to the first substrate unit 402a comprises a second substrate 406b made of glass, plastic, or the like. Furthermore, a color filter 412 is formed in a predetermined pattern on the liquid crystal-side surface of the second substrate 406b, and a black mask 415 is formed to fill the spaces of the color filter 412. Furthermore, a transparent electrode 413 is formed on the color filter 412 and the black mask 415, and an alignment film 411b is formed on the electrode 413. The electrode 413 is a plane electrode made of ITO (Indium Tin Oxide) and formed over the entire surface of the second substrate 406b. Furthermore, a polarizer 457b is mounted on the outer surface of the second substrate 406b by bonding.

The color filter 412 comprises units of colorant films of the three primary colors including R (red), G (green) and B (blue) or C (cyan), M (magenta) and Y (yellow), which are arranged in a matrix in a plane, the colorant films of each color being provided in a predetermined planar arrangement, for example, a stripe arrangement, a delta arrangement, or a mosaic arrangement. The colorant films of the three primary colors are formed in one-to-one correspondence with the display dots, namely, in one-to-one correspondence with the pixel electrodes 409 formed on the first substrate 406a. The black mask 415 is formed in correspondence with the regions without the pixel electrodes 409.

In FIG. 34, the dimension of the gap, i.e., the cell gap, between the first substrate unit 402a and the second substrate unit 402b is maintained by the spherical spacers 414 dispersed on the surface of one of the substrates, and the liquid crystal 456 is sealed in the cell gap.

Each of the TFTs 407 comprises a gate electrode 416 formed on the first substrate 406a, a gate insulating film 417 formed over the entire surface of the first substrate 406a on the gate electrode 416, a semiconductor layer 418 formed above the gate electrode 416 with the gate insulating film 417 formed therebetween, a source electrode 421 formed on one side of the semiconductor layer 418 through a contact electrode 419, and a drain electrode 422 formed on the other side of the semiconductor layer 418 through the contact electrode 419.

As shown in FIG. 35, the gate electrode 416 is extended from gate bus wiring 423. The source electrode 421 is extended from source bus wiring 424. A plurality of lines of the gate bus wiring 423 are formed at equal intervals in parallel with the longitudinal direction to extend in the transverse direction of the first substrate 406a. A plurality of lines of the source bus wiring 424 are formed at equal intervals in parallel with the transverse direction to extend in the longitudinal direction of the first substrate 406a and cross the gate bus wiring 423 with the gate insulating film 417 provided therebetween (refer to FIG. 349.

The gate bus wiring 423 is connected to one of the driver ICs 404a and 404b shown in FIG. 36 to function as, for example, scanning lines. On the other hand, the source bus wiring 424 is connected to the other IC to function as, for example, signal lines.

The pixel electrodes 409 are formed to cover the square regions partitioned by the gate bus wiring 423 and the source bus wiring 424 crossing each other, except the portions corresponding to the TFTs 407.

The periphery of each of the pixel electrodes 409 is determined by the metal oxide film 19, and the edge portions 34 of the metal oxide film 19 are projected outward from the reflective conductive film 18. In design, the spaces between the adjacent pixel electrodes 409 are filled with the black mask 415, and thus the edge portions 34 are arranged outside the reflective conductive film inward of the black mask 415. In FIG. 34, light emitted from the back light 25 is transmitted through the edge portions 34 and then supplied to the liquid crystal 456.

The gate bus wiring 423 and the gate electrodes 416 shown in FIG. 35 are made of, for example, chromium, tantalum, or the like. The gate insulating film 417 shown in FIG. 34 is made of, for example, silicon nitride ($SiN_x$), silicon oxide ($SiO_x$), or the like.

The semiconductor layer 418 is made of, for example, a-Si, polycrystalline silicon, CdSe, or the like. The contact electrode 419 is made of, for example, a-Si or the like. The source electrode 422, the source bus wiring 424 shown in FIG. 35, which is formed integrally with the source electrode 421, and the drain electrode 422 shown in FIG. 34 are made of, for example, titanium, molybdenum, aluminum, or the like.

The organic insulating film 408 shown in FIG. 34 is formed over the entire region of the first substrate 406a to cover the gate bus wiring 423, the source bus wiring 424 and the TFTs 407 shown in FIG. 35. However, a contact hole 426 is formed in a portion of the organic insulating film 408, which corresponds to each of the drain electrodes 422, to achieve conduction between the pixel electrode 409 and the drain electrode 422 of each TFT 407 by the contact hole 426.

In this embodiment, each of the pixel electrodes 409 comprises the reflective conductive film 18, and thus light reaching the pixel 409 can be reflected by the reflective conductive film 18. In the case in which a defect occurs in mirror reflection, many fine crests and/or troughs are formed in the surface of the reflective conductive film 18 to form appropriately scattered light.

In the liquid crystal device 401 constructed as described above, in a reflective display using external light, external light incident on the liquid crystal device 401 from the second substrate unit 402 on the observation side passes through the liquid crystal 456, reaches the reflective conductive films 18 of the pixel electrodes 409, and is reflected by the conductive films 18 and again introduced into the liquid crystal 456, as shown by arrow R in FIG. 34. On the other hand, in a transmissive display using light emitted from the back light 25, the light from the back light 25 passes through the first substrate 406a, and the edge portions 34 of the metal oxide films 19 of the pixel electrodes 409 to be supplied to the liquid crystal 456.

The orientation of the liquid crystal 456 is controlled for each display dot by the voltage applied between the pixel electrode 409 selected by the scanning signal and data signal and the counter electrode 413. In both the reflective and transmissive displays, when the orientation of the liquid crystal 456 is controlled, the light supplied to the liquid crystal 456 is modulated by the liquid crystal 456 having the controlled orientation for each display dot, to display an image such as a character, a numerical character, or the like on the observation side.

As described above, in this embodiment, the edge portions 34 provided in the peripheries of the pixel electrodes 409 form light transmitting regions to realize the transmissive display using the light transmitting regions. Since the edge portions 34 are provided, even when the relative positions of the reflective conductive films 18 of the pixel electrodes 409 and the black mask 415 are deviated, the reflective conductive films 18 are not hidden by the black mask 415 as long as the positional deviation is less than the width dimension of the edge portions 34. As a result, even when the positions of the pixel electrodes 409 are deviated due to an error in alignment of the first substrate unit 402a and the second substrate unit 402b, or another error in manufacturing, the occurrence of a difference in display quality between the transmissive and the reflective displays can be prevented.

Electronic apparatuses using any one of the above-described liquid crystal devices according to embodiments are described below.

Figure 37:
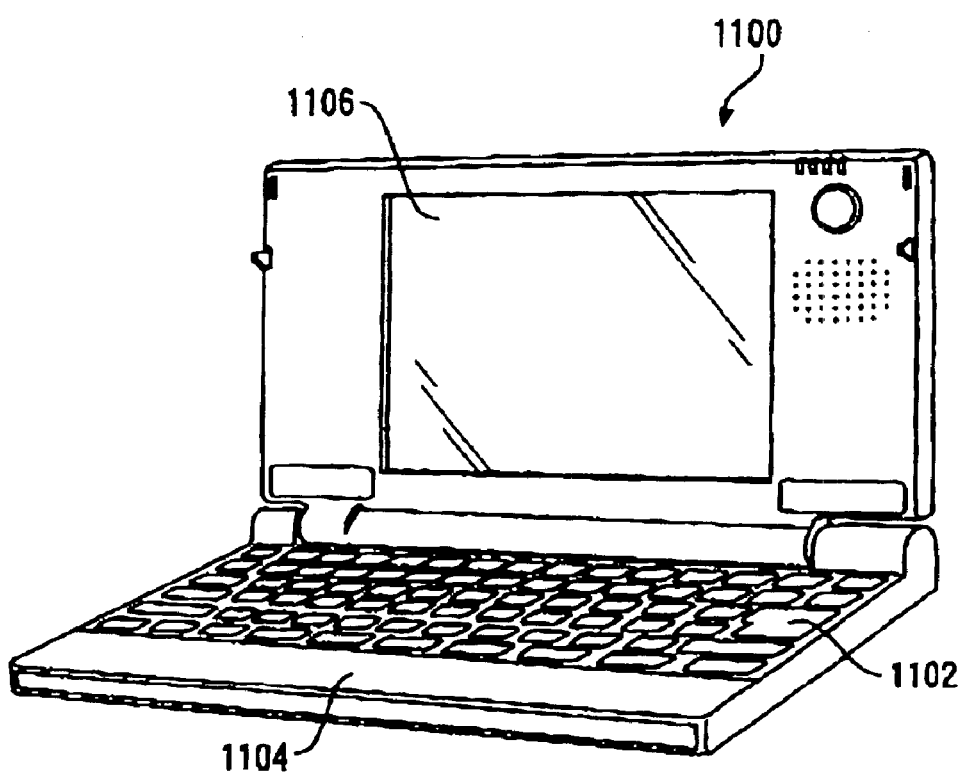
FIG. 37 is a perspective view showing an electronic apparatus according to an embodiment of the present invention.

FIG. 37 shows a mobile personal computer as an electronic apparatus according to an embodiment of the present invention. The personal computer 1100 shown in FIG. 37 comprises a body 1104 comprising a keyboard 1102, and a liquid crystal display unit 1106. The liquid crystal display unit 1106 comprises, for example, the liquid crystal device 90 shown in FIG. 11.

In the computer 1100 of this embodiment having the above-described construction, with external light, a reflective display can be seen, while with insufficient external light, a transmissive display can be seen by turning on a back light. Furthermore, edge portions of transparent metal oxide films positioned outside light reflecting films are used as light transmitting regions to prevent a difference in display quality between the reflective and transmissive types, thereby permitting a display without a feel of discomfort.

Figure 38:
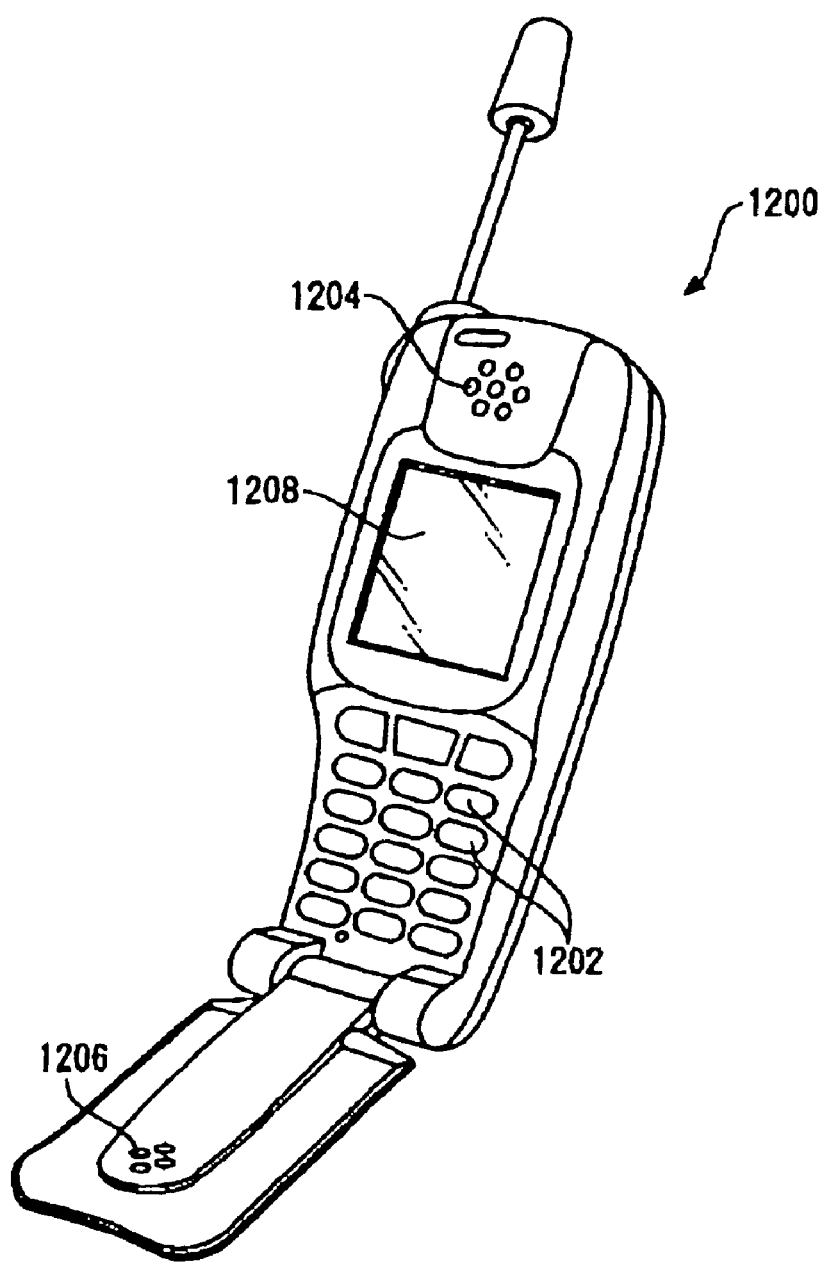
FIG. 38 is a perspective view showing an electronic apparatus according to another embodiment of the present invention.

FIG. 38 shows a cell phone as an electronic apparatus according to another embodiment of the present invention. The cell phone 1200 shown in FIG. 38 comprises a plurality of operation buttons 1202, receiving holes 1204, transmission holes 1206, and a liquid crystal display unit 1208. The liquid crystal display unit 1208 comprises, for example, the liquid crystal device 90 shown in FIG. 11. The cell phone 1200 also can prevent a difference in display quality between the reflective and transmissive displays, thereby permitting a display without a feel of discomfort.

Figure 39:
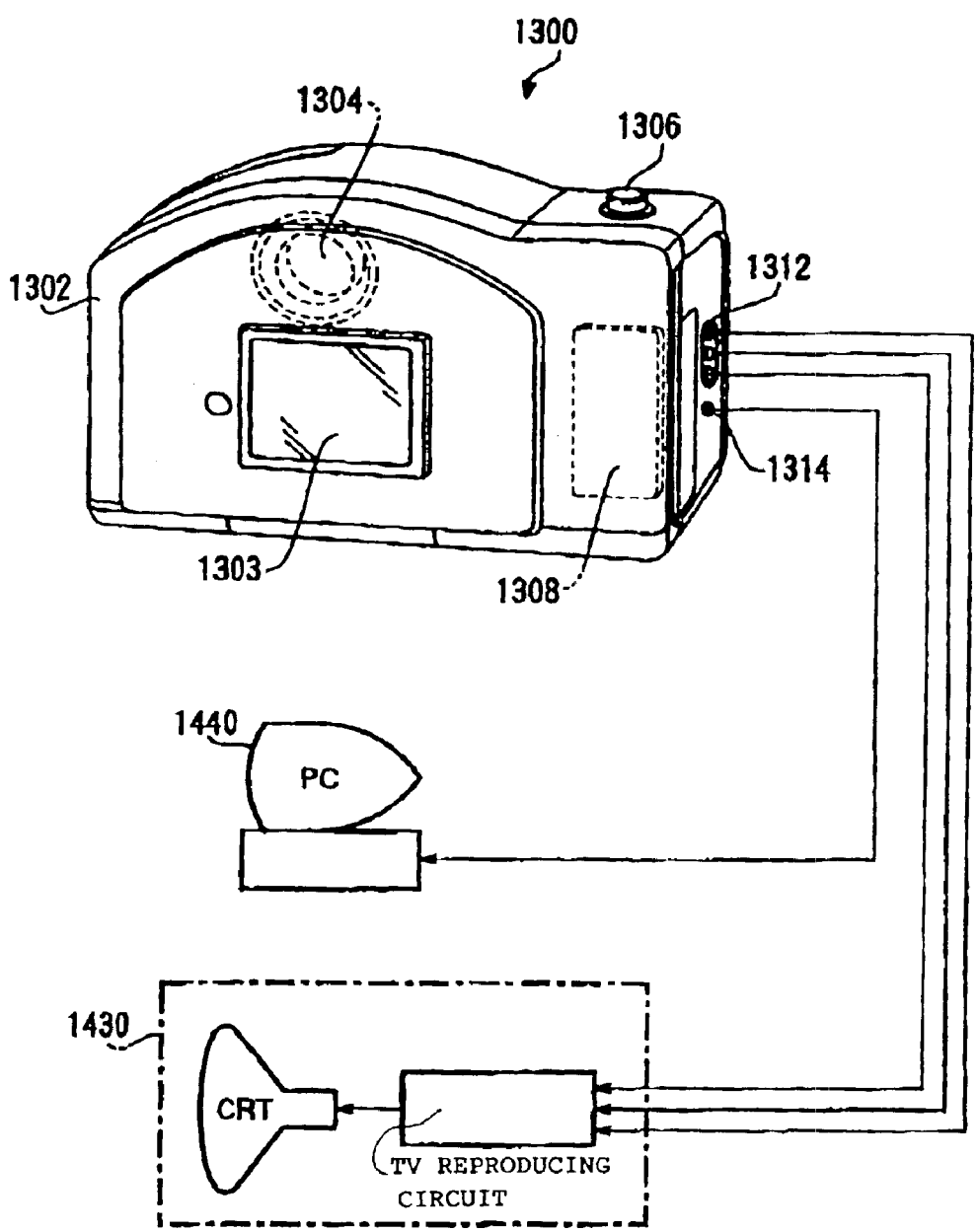
FIG. 39 is a perspective view showing an electronic apparatus according to a further embodiment of the present invention.

FIG. 39 shows a digital camera as an electronic apparatus according to a further embodiment of the present invention, which uses a liquid crystal device as a finder. In a general camera, a film is exposed to light by a light image of an object, while in the digital camera 1300, a light image of an object is subjected to photo-electric conversion by an imaging device such as CCD (Charge Coupled Device) or the like to produce imaging signals.

The digital camera 1300 comprises a liquid crystal display unit 1303 provided on the back of a case 1302 to execute a display based on the imaging signals produced by the CCD. Therefore, the liquid crystal display unit 1303 functions as a finder for displaying an object. The liquid crystal display unit 1303 can be formed by, for example, using the liquid crystal device 90 shown in FIG. 11.

Furthermore, a light receiving unit 1304 including an optical lens, CCD, etc. is provided on the front side (the back side shown in the drawing) of the case 1302. When a photographer recognizes an object image displayed on the liquid crystal display unit 1303 and presses a shutter button 1306, the imaging signals of the CCD at this time are transmitted to the memory of a circuit board 1308 and stored therein. In the digital camera 1300, a video signal output terminal 1312 and a data communication input/output terminal 1314 are provided on a side surface of the case 1302. As shown in FIG. 39, a television monitor 1430 and a personal computer 1440 are connected to the video signal output terminal 1312 and the data communication input/output terminal 1314, respectively, according to demand. The imaging signals stored in the memory of the circuit board 1308 are output to the television monitor 1430 and the personal computer 1440 by a predetermined operation.

Figure 40:
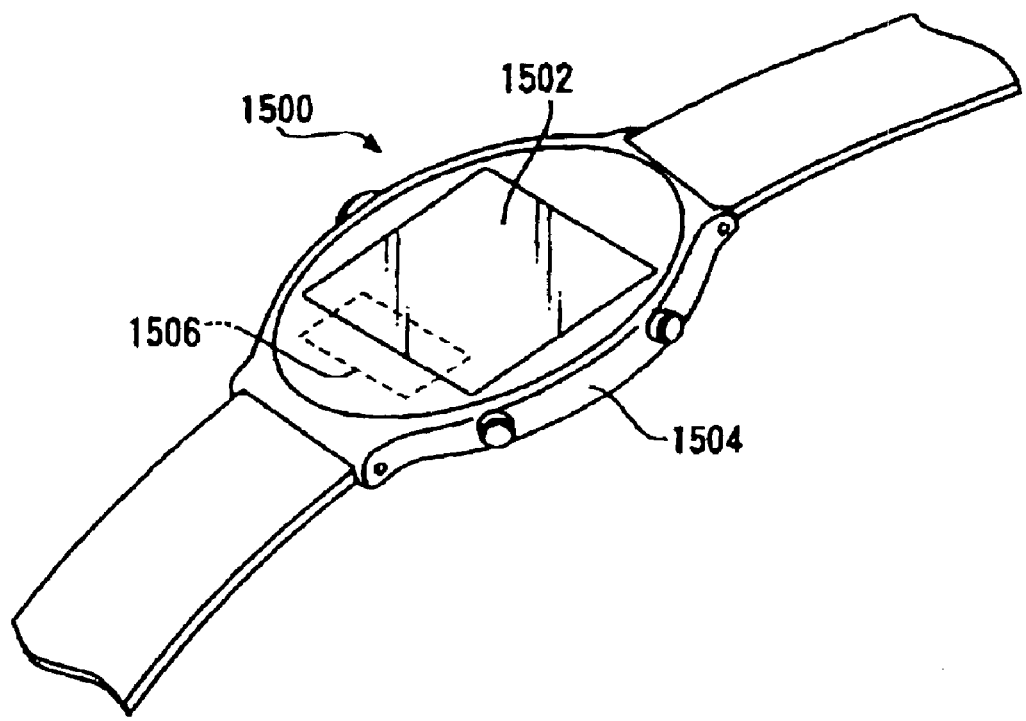
FIG. 40 is a perspective view showing an electronic apparatus according to a still further embodiment of the present invention.

FIG. 40 shows a wristwatch-type electronic apparatus as an electronic apparatus according to a further embodiment of the present invention. The wristwatch-type electronic apparatus 1500 shown in this figure comprises a liquid crystal display unit 1502 as a display section supported by a watch body 1504. The liquid crystal display unit 1502 can be formed by using, for example, the liquid crystal device 90 shown in FIG. 11. The liquid crystal display unit 1502 is controlled by a control circuit 1506 provided in the watch body 1504 to display a time, a date, etc. as information.

Besides the above-described personal computer, cell phone, digital camera, and wristwatch-type electronic apparatus, examples of electronic apparatuses include liquid crystal televisions, viewfinder type or monitor direct-viewing-type video tape recorders, car navigation devices, pagers, electronic notebooks, electric calculators, word processors, workstations, television telephones, POS terminals, apparatus comprising a touch panel, and the like. Of course, the liquid crystal device of the present invention can be applied to the display sections of these various electronic apparatuses.

As described above, the present invention can suppress the occurrence of a variation in the area ratio of a light transmitting region to a light reflecting region of a transflective film even when various types of error occur in manufacturing a liquid crystal device, thereby preventing the occurrence of a variation in display quality even when the display system of the liquid crystal device is changed.

The entire disclosure of Japanese Patent Application No. 2001-029747 filed Feb. 6, 2001 and Japanese Patent Application No. 2001-357706 filed Nov. 22, 2001 is incorporated by reference herein.

What is claimed is:

1. A liquid crystal device comprising:
   a liquid crystal arranged between first and second substrates;
   a plurality of dot areas;

a reflective conductive film formed on or above the first substrate;

a light-transmitting metal oxide film laminated on the reflective conductive film so that an outer edge of the metal oxide film is in contact with the first substrate; and a black mask formed on the second substrate, the black mask overlapping the interval between the adjacent portions of the dot areas as viewed in plan, the black mask having a width equal to the interval between the adjacent portions of the dot areas and narrower than the interval between the adjacent portions of the reflective conductive film.

2. A liquid crystal device according to claim 1, wherein the edge in contact with the first substrate constitutes a light-transmitting portion in one display dot in a transflective system liquid crystal display.

3. A liquid crystal device according to claim 1, wherein the reflective conductive film and the metal oxide film form a first electrode for applying a voltage to the liquid crystal.

4. A liquid crystal device according to claim 3, further comprising a second electrode formed on the second substrate opposite to the first electrode, and a color layer provided corresponding to the crossing regions between the first and second electrodes.

5. A liquid crystal device according to claim 3, wherein the first electrode comprises a stripe electrode constituting a simple matrix system liquid crystal device.

6. A liquid crystal device according to claim 3, wherein the first electrode is a dot electrode constituting an active matrix system liquid crystal device.

7. A liquid crystal device according to claim 1, wherein the reflective conductive film is made of a single silver material or an alloy containing silver.

8. A liquid crystal device according to claim 1, wherein the metal oxide film is made of ITO (Indium Tin Oxide).

9. A liquid crystal device according to claim 1, wherein the area of the edge in contact with the first substrate is 10 to 70%, preferably 30 to 50%, of the area of one display dot to which the edge belongs.

10. An electronic apparatus comprising a liquid crystal device according to claim 1.

11. A liquid crystal device comprising:

a liquid crystal arranged between first and second substrates;

a plurality of dot areas;

an underlying film provided on the first substrate;

a reflective conductive film formed on or above the underlying film, and reflecting light from outside of the second substrate; and a light-transmitting metal oxide film laminated on the reflective conductive film so that the outer edge of the metal oxide film is in contact with the underlying film;

wherein the outer edge of the metal oxide film transmits light from outside the first substrate, while the reflective conductive film reflects light from the outside of the second substrate, in each of the dot areas.

12. A liquid crystal device according to claim 11, wherein the edge in contact with the underlying film constitutes a light-transmitting portion in one display dot in a transflective system liquid crystal display.

13. A liquid crystal device according to claim 11, wherein the underlying film contains a metal oxide.

14. A liquid crystal device according to claim 11, wherein the area of the edge in contact with the underlying film is 10 to 70% of the area of one display dot to which the edge belongs.

15. A liquid crystal device comprising:

a liquid crystal arranged between first and second substrates;

a reflective conductive film formed on the first substrate;

a light-transmitting metal oxide film laminated on the reflective conductive film so that the edge of the metal oxide film is in contact with the first substrate;

an illumination means for irradiating the liquid crystal with light from outside the first substrate; and a reflecting layer provided on the reflective conductive film, for reflecting blue component light.

16. A liquid crystal device comprising:

a liquid crystal arranged between first and second substrates;

a reflective conductive film formed on the first substrate;

a light-transmitting metal oxide film laminated on the reflective conductive film so that the edge of the metal oxide film is in contact with the first substrate, the reflective conductive film and the metal oxide film forming a first electrode for applying a voltage to the liquid crystal;

an illumination means for irradiating the liquid crystal with light from outside the first substrate; and a second electrode formed on the second substrate opposite to the first electrode, wiring connected to the first electrode, and wiring connected to the second electrode, wherein a display area comprises a collection of the crossing regions of the first and second electrodes, the wiring connected to the first electrode and the wiring connected to the second electrode are present outside the display area, and at least one of the wirings comprises a metal oxide to eliminate the reflective conductive film.

17. A method of manufacturing a liquid crystal device comprising a liquid crystal arranged between first and second substrates and a plurality of dot areas, the method comprising:

forming a reflective conductive film on or above the first substrate;

forming a light-transmitting metal oxide film on the reflective conductive film so that an outer edge of the metal oxide film contacts the first substrate; and forming a black mask on the second substrate, the black mask is overlapping the interval between the adjacent portions of the dot areas as viewed in plan and has a width equal to the interval between the adjacent portions of the dot areas and is narrower than the interval between the adjacent portions of the reflective conductive film.

18. A method of manufacturing a liquid crystal device comprising a liquid crystal arranged between first and second substrates and a plurality of dot areas, the method comprising:

the step of forming an underlying film on the first substrate;

the step of forming a reflective conductive film on or above the underlying film, the reflective conductive film being adapted to reflect light from outside of the second substrate; and the step of forming a light-transmitting metal oxide film on the reflective conductive film so that an outer edge of the metal oxide film contacts the underlying film;

wherein the outer edge of the metal oxide film is adapted to transmit light from outside the first substrate, while the reflective conductive film reflects light from the outside of the second substrate, in each of the dot areas.

19. A liquid crystal device comprising:

a liquid crystal arranged between first and second substrates;

a reflective conductive film formed on or above the first substrate, the reflective conductive film being separated into adjacent portions by an interval and having an edge;

a light-transmitting metal oxide film over the reflective conductive film, the metal oxide film being separated into adjacent portions by an interval, the metal oxide film having an edge that protrudes beyond the edge of the reflective conductive film;

a shading film formed on the second substrate, the shading film being opposite the interval between the adjacent portions of the metal oxide film, the shading film having a width equal to the interval between the adjacent portions of the metal oxide film and narrower than the interval between the adjacent portions of the reflective conductive film; and an illuminator that irradiates the liquid crystal with light from outside the first substrate.

20. A method of manufacturing a liquid crystal device including a liquid crystal arranged between first and second substrates, the method comprising:

forming a reflective conductive film on or above the first substrate, so that reflective conductive film is separated into adjacent portions by an interval and has an edge;

forming a light-transmitting metal oxide film over the reflective conductive film, so that metal oxide film is separated into adjacent portions by an interval and so that the metal oxide film has an edge that protrudes from the edge of the reflective conductive film;

forming a shading film on the second substrate so that the shading film is opposite the interval between the adjacent portions of the metal oxide film and so that the shading film has a width equal to the interval between the adjacent portions of the metal oxide film and narrower than the interval between the adjacent portions of the reflective conductive film; and providing an illuminator that irradiates the liquid crystal with light from outside the first substrate.

* * * * *

UNITED STATES PATENT AND TRADEMARK OFFICE
CERTIFICATE OF CORRECTION

PATENT NO. : 6,927,818 B2
APPLICATION NO. : 10/068304
DATED : August 9, 2005
INVENTOR(S) : Shoji Hinata, Manabu Hanakawa and Takeshi Hagiwara It is certified that error appears in the above-identified patent and that said Letters Patent is hereby corrected as shown below:

| | |
|---|---|
| Title Page, Item -54-: | Title should be --TRANSFLECTIVE LIQUID CRYSTAL DEVICE, METHOD OF MANUFACTURING A TRANSFLECTIVE LIQUID CRYSTAL DEVICE AND ELECTRONIC APPARATUS-- |
| Column 1, Lines 1-5: | Title should be --TRANSFLECTIVE LIQUID CRYSTAL DEVICE, METHOD OF MANUFACTURING A TRANSFLECTIVE LIQUID CRYSTAL DEVICE AND ELECTRONIC APPARATUS-- |
| Column 10, Line 5: | "filer" should be --filter--. |
| Column 13, Line 18: | Delete second occurrence of "be" |
| Column 14, Line 51: | "amounted" should be --mounted-- |
| Column 15, Line 30: | "back" should be --black-- |
| Column 22, Line 63: | "inn" should be --in-- |
| Column 24, Line 1: | "parenthesis" should be --parentheses -- |
| Column 28, Line 37: | "pattering" should be --patterning-- |
| Column 29, Line 8: | "amounted" should be --mounted-- |
| Column 31, Line 16: | "filer" should be --filter-- |

UNITED STATES PATENT AND TRADEMARK OFFICE
CERTIFICATE OF CORRECTION

PATENT NO. : 6,927,818 B2
APPLICATION NO. : 10/068304
DATED : August 9, 2005
INVENTOR(S) : Shoji Hinata, Manabu Hanakawa and Takeshi Hagiwara It is certified that error appears in the above-identified patent and that said Letters Patent is hereby corrected as shown below:

Column 38, Line 14: "349." should be --349).--

Signed and Sealed this

Eighth Day of May, 2007

JON W. DUDAS
*Director of the United States Patent and Trademark Office*